(12) United States Patent
Resch

(10) Patent No.: US 9,898,373 B2
(45) Date of Patent: Feb. 20, 2018

(54) PRIORITIZING REBUILDING OF STORED DATA IN A DISPERSED STORAGE NETWORK

(71) Applicant: CLEVERSAFE, INC., Chicago, IL (US)

(72) Inventor: Jason K. Resch, Chicago, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 210 days.

(21) Appl. No.: 14/215,335

(22) Filed: Mar. 17, 2014

(65) Prior Publication Data

US 2014/0331086 A1 Nov. 6, 2014
US 2017/0161157 A9 Jun. 8, 2017

Related U.S. Application Data

(63) Continuation-in-part of application No. 13/916,138, filed on Jun. 12, 2013, now Pat. No. 8,819,516, which is a continuation of application No. 12/767,404, filed on Apr. 26, 2010, now Pat. No. 8,489,915.

(60) Provisional application No. 61/819,025, filed on May 3, 2013.

(51) Int. Cl.
*G06F 11/00* (2006.01)
*G06F 11/14* (2006.01)

(52) U.S. Cl.
CPC .............. *G06F 11/1458* (2013.01)

(58) Field of Classification Search
CPC ............. G06F 11/1458; G06F 11/2094; G06F 11/1076; G06F 11/1092

USPC ....................... 714/6.2, 6.22, 6.24
See application file for complete search history.

(56) References Cited

U.S. PATENT DOCUMENTS

| 4,092,732 A | 5/1978 | Ouchi |
| 5,454,101 A | 9/1995 | Mackay et al. |
| 5,485,474 A | 1/1996 | Rabin |
| 5,774,643 A | 6/1998 | Lubbers et al. |

(Continued)

FOREIGN PATENT DOCUMENTS

EP 2365439 A1 12/1899

OTHER PUBLICATIONS

International Searching Authority; International Search Report and Written Opinion; International Application No. PCT/US2014/035494; dated Sep. 23, 2014; 8 pgs.

(Continued)

*Primary Examiner* — Elmira Mehrmanesh
(74) *Attorney, Agent, or Firm* — Garlick & Markison; Timothy W. Markison; Bruce E. Stuckman

(57) ABSTRACT

A method begins by a dispersed storage (DS) processing module of a dispersed storage network (DSN), when in a rebuilding mode, determining a level of rebuilding urgency, where the level of rebuilding urgency is based on an inversely proportional function of a level of error encoded redundancy for error encoded data giving rise to the rebuilding mode. When the level of rebuilding urgency is at or above a critical level, the method continues with the DS processing module placing a set of storage units of the DSN in a critical rebuilding mode, where, when in the critical rebuilding mode, the set of storage units prioritize rebuilding of the error encoded data giving rise to the rebuilding mode over other error encoded data operations.

14 Claims, 58 Drawing Sheets

(56) References Cited

U.S. PATENT DOCUMENTS

| | | | |
|---|---|---|---|
| 5,802,364 A | 9/1998 | Senator et al. | |
| 5,809,285 A | 9/1998 | Hilland | |
| 5,890,156 A | 3/1999 | Rekieta et al. | |
| 5,987,622 A | 11/1999 | Lo Verso et al. | |
| 5,991,414 A | 11/1999 | Garay et al. | |
| 6,012,159 A | 1/2000 | Fischer et al. | |
| 6,058,454 A | 5/2000 | Gerlach et al. | |
| 6,092,215 A | 7/2000 | Hodges et al. | |
| 6,128,277 A | 10/2000 | Bruck et al. | |
| 6,175,571 B1 | 1/2001 | Haddock et al. | |
| 6,192,472 B1 | 2/2001 | Garay et al. | |
| 6,256,688 B1 | 7/2001 | Suetaka et al. | |
| 6,272,658 B1 | 8/2001 | Steele et al. | |
| 6,301,604 B1 | 10/2001 | Nojima | |
| 6,356,949 B1 | 3/2002 | Katsandres et al. | |
| 6,366,995 B1 | 4/2002 | Vilkov et al. | |
| 6,374,336 B1 | 4/2002 | Peters et al. | |
| 6,415,373 B1 | 7/2002 | Peters et al. | |
| 6,418,539 B1 | 7/2002 | Walker | |
| 6,449,688 B1 | 9/2002 | Peters et al. | |
| 6,516,425 B1 | 2/2003 | Belhadj et al. | |
| 6,567,948 B2 | 5/2003 | Steele et al. | |
| 6,571,282 B1 | 5/2003 | Bowman-Amuah | |
| 6,609,223 B1 | 8/2003 | Wolfgang | |
| 6,718,361 B1 | 4/2004 | Basani et al. | |
| 6,760,808 B2 | 7/2004 | Peters et al. | |
| 6,785,768 B2 | 8/2004 | Peters et al. | |
| 6,785,783 B2 | 8/2004 | Buckland | |
| 6,826,711 B2 | 11/2004 | Moulton et al. | |
| 6,879,596 B1 | 4/2005 | Dooply | |
| 7,003,688 B1 | 2/2006 | Pittelkow et al. | |
| 7,024,451 B2 | 4/2006 | Jorgenson | |
| 7,024,609 B2 | 4/2006 | Wolfgang et al. | |
| 7,080,101 B1 | 7/2006 | Watson et al. | |
| 7,103,824 B2 | 9/2006 | Halford | |
| 7,103,915 B2 | 9/2006 | Redlich et al. | |
| 7,111,115 B2 | 9/2006 | Peters et al. | |
| 7,140,044 B2 | 11/2006 | Redlich et al. | |
| 7,146,644 B2 | 12/2006 | Redlich et al. | |
| 7,171,493 B2 | 1/2007 | Shu et al. | |
| 7,222,133 B1 | 5/2007 | Raipurkar et al. | |
| 7,240,236 B2 | 7/2007 | Cutts et al. | |
| 7,272,613 B2 | 9/2007 | Sim et al. | |
| 7,636,724 B2 | 12/2009 | de la Torre et al. | |
| 8,464,096 B2* | 6/2013 | Thornton | G06F 11/1076 714/6.24 |
| 8,495,466 B2* | 7/2013 | Cilfone | G06F 11/1076 714/47.1 |
| 8,555,109 B2* | 10/2013 | Dhuse | G06F 11/1076 714/6.22 |
| 2002/0062422 A1 | 5/2002 | Butterworth et al. | |
| 2002/0166079 A1 | 11/2002 | Ulrich et al. | |
| 2003/0018927 A1 | 1/2003 | Gadir et al. | |
| 2003/0037261 A1 | 2/2003 | Meffert et al. | |
| 2003/0065617 A1 | 4/2003 | Watkins et al. | |
| 2003/0084020 A1 | 5/2003 | Shu | |
| 2004/0024963 A1 | 2/2004 | Talagala et al. | |
| 2004/0059958 A1 | 3/2004 | Umberger et al. | |
| 2004/0122917 A1 | 6/2004 | Menon et al. | |
| 2004/0215998 A1 | 10/2004 | Buxton et al. | |
| 2004/0228493 A1 | 11/2004 | Ma et al. | |
| 2005/0100022 A1 | 5/2005 | Ramprashad | |
| 2005/0114594 A1 | 5/2005 | Corbett et al. | |
| 2005/0125593 A1 | 6/2005 | Karpoff et al. | |
| 2005/0131993 A1 | 6/2005 | Fatula, Jr. | |
| 2005/0132070 A1 | 6/2005 | Redlich et al. | |
| 2005/0144382 A1 | 6/2005 | Schmisseur | |
| 2005/0229069 A1 | 10/2005 | Hassner | |
| 2006/0010343 A1* | 1/2006 | Tanaka | G06F 11/1084 714/6.24 |
| 2006/0047907 A1 | 3/2006 | Shiga et al. | |
| 2006/0136448 A1 | 6/2006 | Cialini et al. | |
| 2006/0156059 A1 | 7/2006 | Kitamura | |
| 2006/0224603 A1 | 10/2006 | Correll, Jr. | |
| 2007/0079081 A1 | 4/2007 | Gladwin et al. | |
| 2007/0079082 A1 | 4/2007 | Gladwin et al. | |
| 2007/0079083 A1 | 4/2007 | Gladwin et al. | |
| 2007/0088970 A1 | 4/2007 | Buxton et al. | |
| 2007/0174192 A1 | 7/2007 | Gladwin et al. | |
| 2007/0214285 A1 | 9/2007 | Au et al. | |
| 2007/0234110 A1 | 10/2007 | Soran et al. | |
| 2007/0283167 A1 | 12/2007 | Venters, III et al. | |
| 2008/0183975 A1 | 7/2008 | Foster et al. | |
| 2009/0094251 A1 | 4/2009 | Gladwin et al. | |
| 2009/0094318 A1 | 4/2009 | Gladwin et al. | |
| 2009/0265360 A1* | 10/2009 | Bachwani | G06F 11/008 |
| 2010/0023524 A1 | 1/2010 | Gladwin et al. | |
| 2011/0029809 A1* | 2/2011 | Dhuse | G06F 11/1076 714/6.1 |
| 2011/0029836 A1 | 2/2011 | Dhuse et al. | |
| 2011/0225453 A1* | 9/2011 | Spry | G06F 11/1092 714/15 |
| 2011/0228931 A1* | 9/2011 | Grube | G06F 11/1076 380/201 |
| 2012/0311403 A1 | 12/2012 | Gladwin et al. | |

OTHER PUBLICATIONS

Shamir; How to Share a Secret; Communications of the ACM; vol. 22, No. 11; Nov. 1979; pp. 612-613.

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

Kubiatowicz, et al.; OceanStore: An Architecture for Global-Scale Persistent Storage; Proceedings of the Ninth International Confer-

(56) References Cited

OTHER PUBLICATIONS ence on Architectural Support for Programming Languages and Operating Systems (ASPLOS 2000); Nov. 2000, pp. 1-12.
European Patent Office; Extended European Search Report; EP Application No. 14791412.1; dated Nov. 17, 2016; 10 pgs.
European Patent Office; Extended European Search Report; EP 10804922; Sep. 15, 2017; 8 pgs.

\* cited by examiner distributed computing system 10

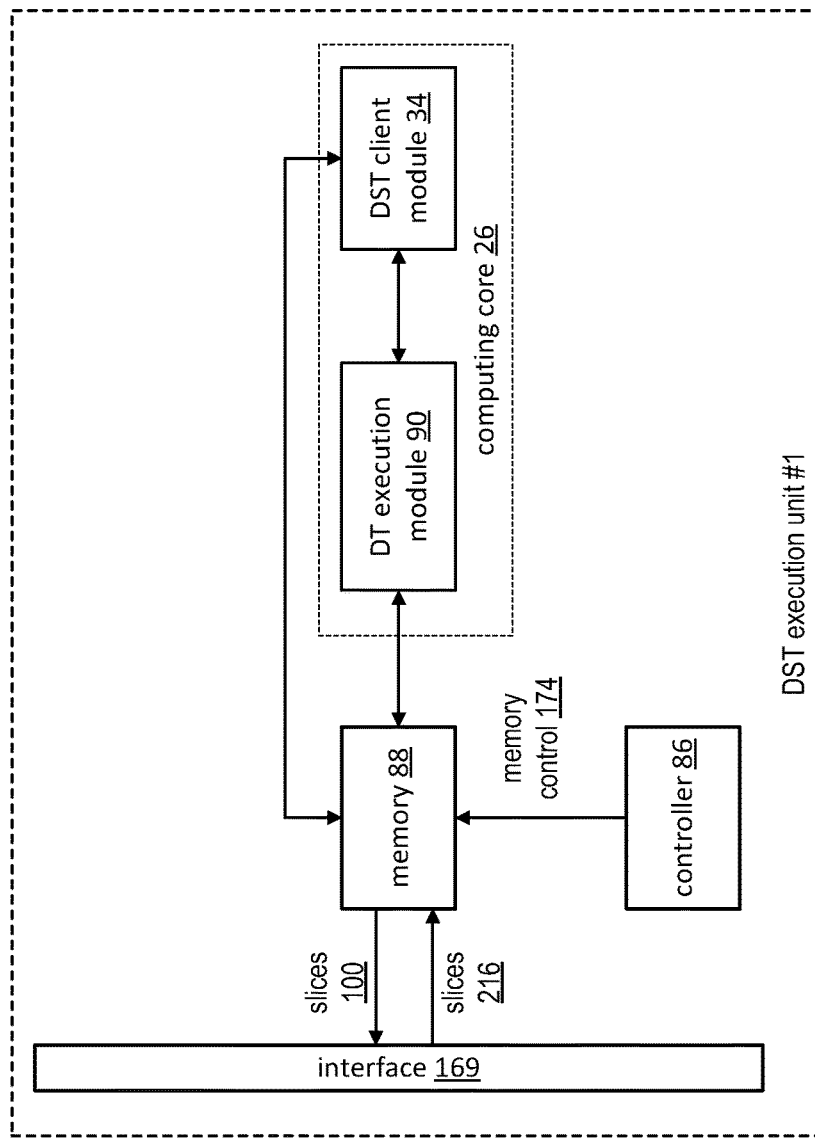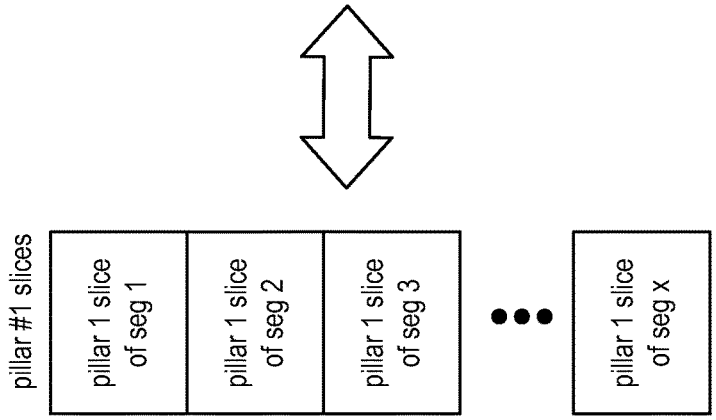
FIG. 24

DST allocation info 242 data partition info 320: data ID; No. of partitions; Addr. info for each partition; format conversion indication

| | task execution info 322 | | | | intermediate result info 324 | | |
|---|---|---|---|---|---|---|---|
| task 326 | task ordering 328 | data partition 330 | set of DT EX mods 332 | Name 334 | interm. result processing 336 | scratch pad storage 338 | intermediate result storage 340 |
| 1_1 | none | 2_1 - 2_z | 1_1, 2_1, 3_1, 4_1, & 5_1 | R1-1 | DST unit 1 | DST unit 1 | DST units 1-5 |
| 1_2 | none | 2_1 - 2_4 | 1_1, 2_1, 3_1, 4_1, & 5_1 | R1-2 | DST unit 1 | DST unit 1 | DST units 1-5 |
| 1_3 | none | 2_1 - 2_4<br>2_5 - 2_z | 1_1, 2_1, 3_1, 4_1, & 5_1<br>1_2, 2_2, 3_2, 4_2, & 5_2 | R1-3 | DST unit 2 | DST unit 2 | DST units 2-6 |
| 1_4 | after 1_3 | R1-3_1 - R1-3_4<br>R1-3_5 - R1-3_z | 1_1, 2_1, 3_1, 4_1, & 5_1<br>1_2, 2_2, 6_1, 7_1, & 7_2 | R1_4 | DST unit 3 | DST unit 3 | DST units 3-7 |
| 1_5 | after 1_4 | R1-4_1 - R1-4_z &<br>2_1 - 2_z | 1_1, 2_1, 3_1, 4_1, & 5_1 | R1-5 | DST unit 1 | DST unit 1 | DST units 1-5 |
| 1_6 | after 1_1 &<br>1_5 | R1-1_1 - R1-1_z &<br>R1-5_1 - R1-5_z | 1_2, 2_2, 3_2, 4_2, & 5_2 | R1-6 | DST unit 2 | DST unit 2 | DST units 2-6 |
| 1_7 | after 1_2 &<br>1_5 | R1-2_1 - R1-2_z &<br>R1-5_1 - R1-5_z | 1_2, 2_2, 3_2, 4_2, & 5_2 | R1-7 | DST unit 3 | DST unit 3 | DST units 3-7 |
| 2 | none | 2_1 - 2_z | 3_1, 4_1, 5_1, 6_1, & 7_1 | R2 | DST unit 7 | DST unit 7 | DST units 7, 1-4 |
| 3_1 | none (same as 1_3) | use R1_3 | | R1-1 | | | |
| 3_2 | after 3_1 | R1-3_1 - R1-3_z | 1_2, 2_2, 3_2, 4_2, & 5_2 | R3-2 | DST unit 5 | DST unit 5 | DST units 5,6, 1-3 |

FIG. 32

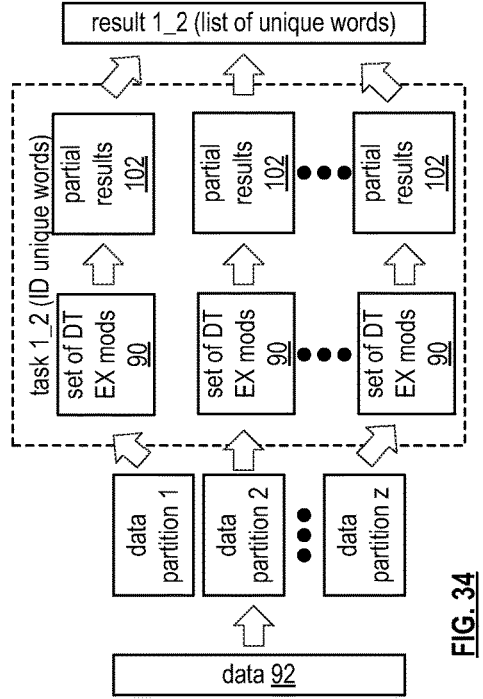
FIG. 34
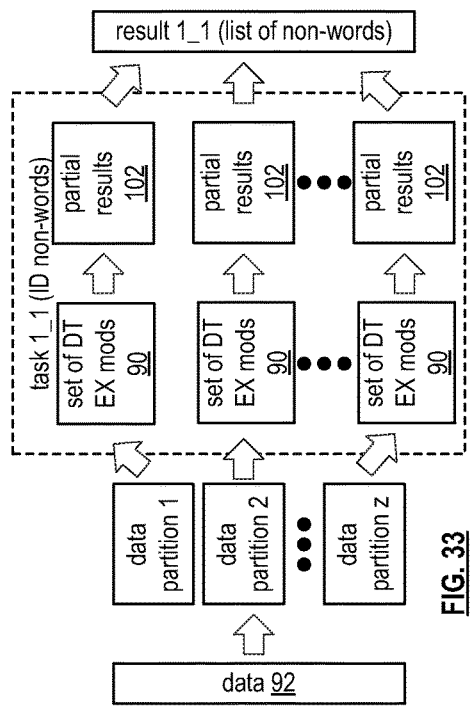
FIG. 33
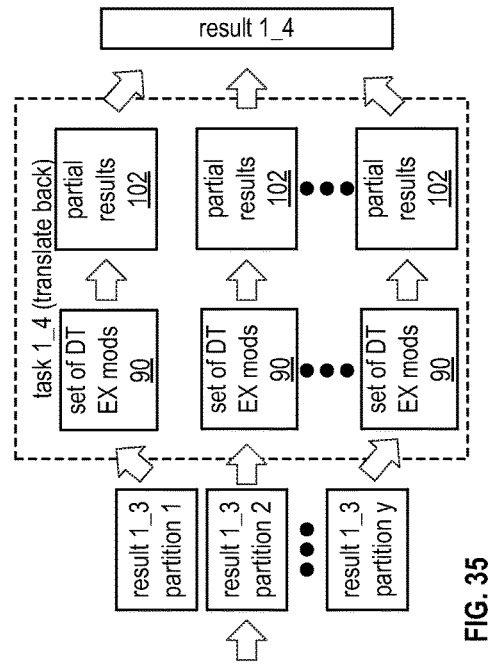
FIG. 35
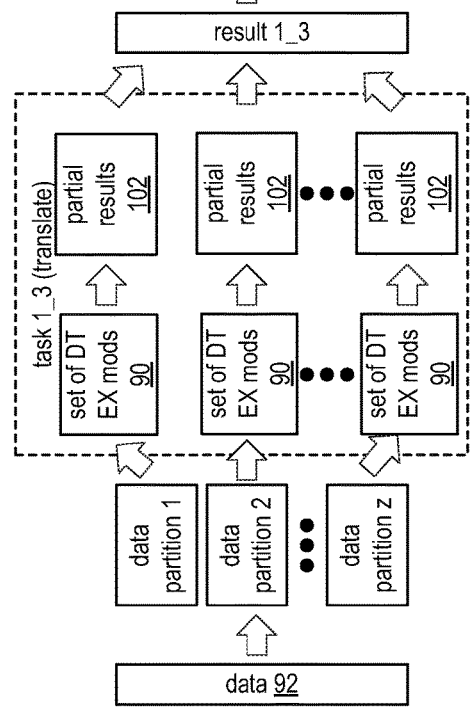

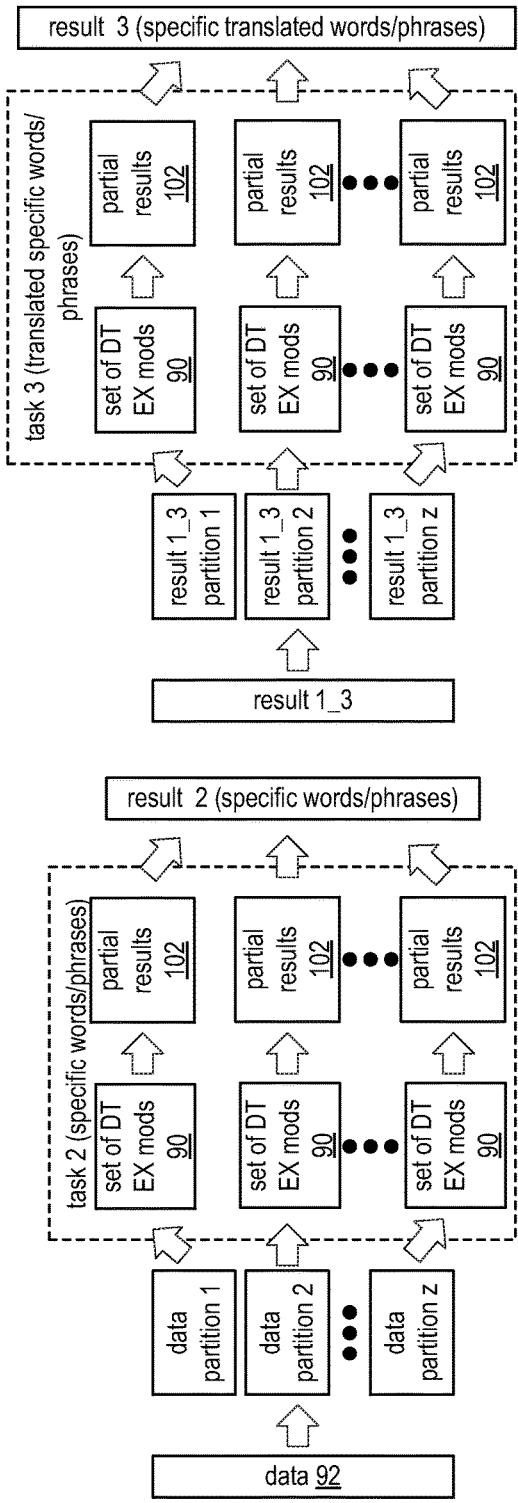
FIG. 38
FIG. 37
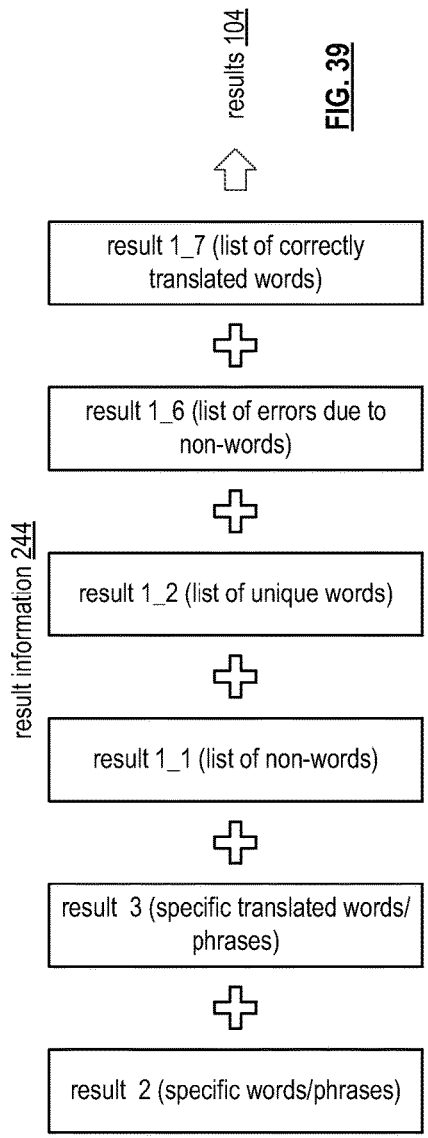
FIG. 39

| vault config 398 | ACL 392 | | group permisssions 396 | | | |
|---|---|---|---|---|---|---|
| | vault ID 394 | vault access 400 | group 1 | group 2 | group 3 | group 4 |
| AF123 | | 00000-8FFFF | N | N | Y | Y |
| | | 90000-FFFFF | N | Y | Y | N |
| CD437 | | 00000-FFFFF | N | N | Y | N |
| EA555 | | 00000-3FFFF | Y | N | N | N |
| | | 40000-8FFFF | N | Y | Y | Y |
| | | 90000-FFFFF | N | N | N | N |

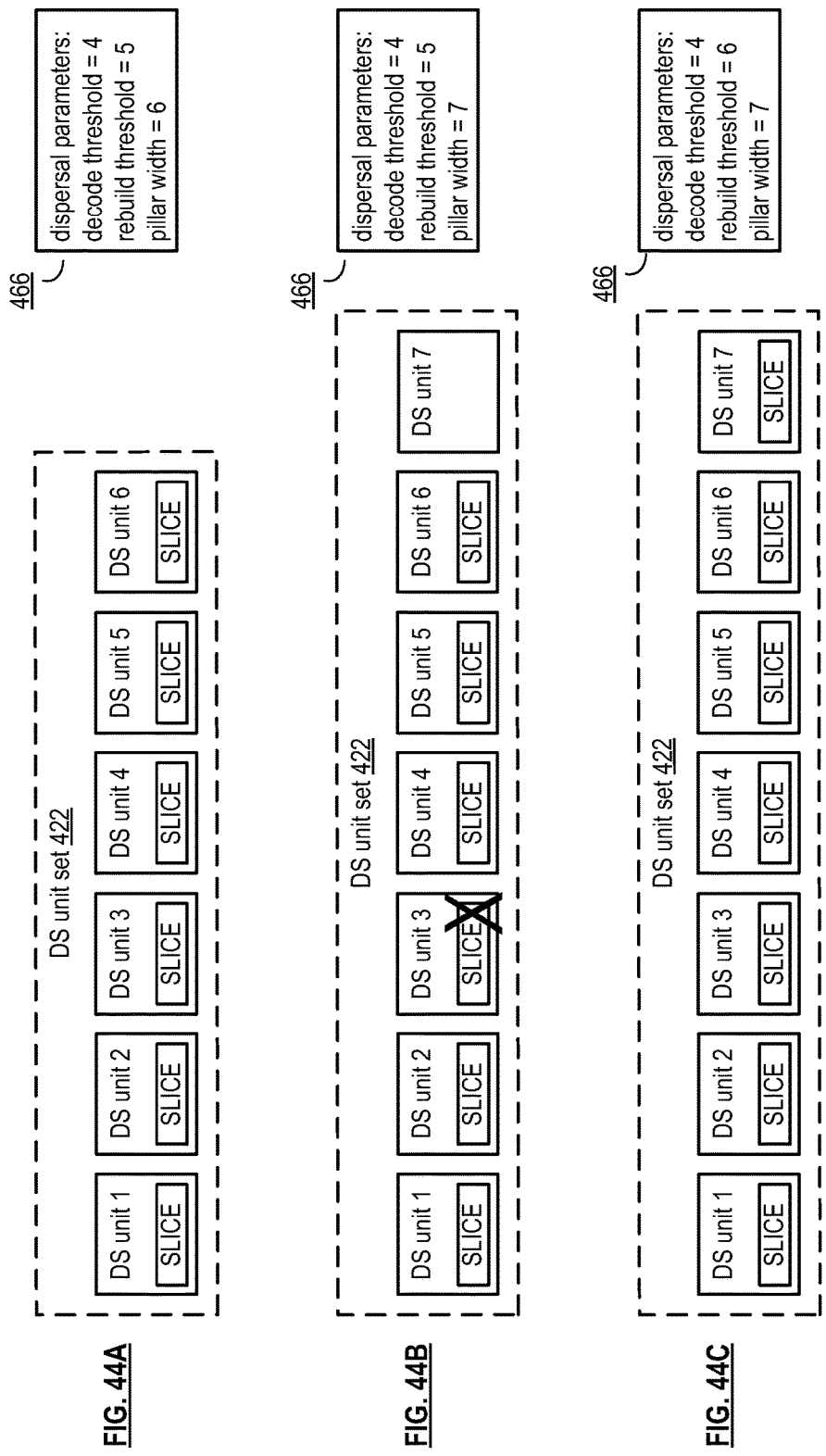

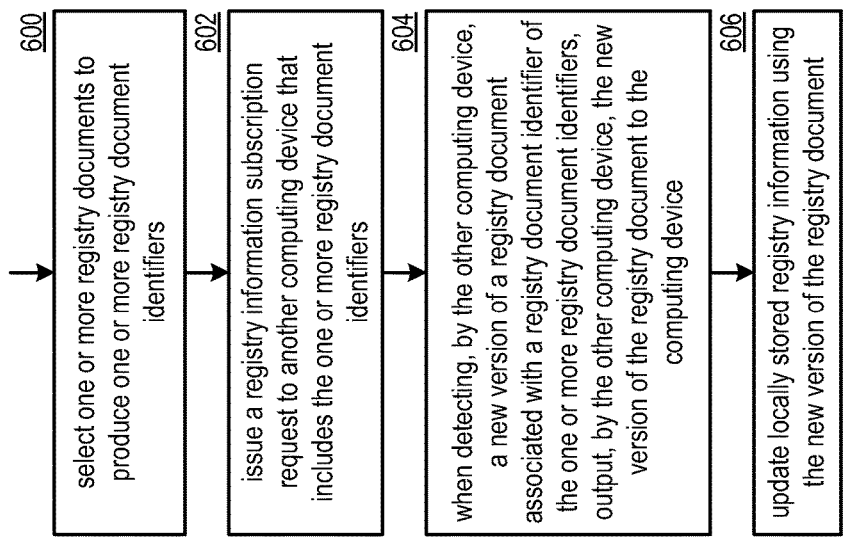

PRIORITIZING REBUILDING OF STORED DATA IN A DISPERSED STORAGE NETWORK

CROSS REFERENCE TO RELATED PATENTS

The present U.S. Utility patent application claims priority pursuant to 35 U.S.C. §119(e) to U.S. Provisional Application No. 61/819,025, entitled "STORING A SPARSE DATA OBJECT IN A DISPERSED STORAGE NETWORK", filed May 3, 2013, which is hereby incorporated herein by reference in its entirety and made part of the present U.S. Utility patent application for all purposes.

The present U.S. Utility Patent Application also claims priority pursuant to 35 U.S.C. § 120 as a continuation-in-part of U.S. Utility application Ser. No. 13/916,138, entitled "METHOD AND APPARATUS FOR STORAGE INTEGRITY PROCESSING BASED ON ERROR TYPES IN A DISPERSED STORAGE NETWORK", filed Jun. 12, 2013, issued as U.S. Pat. No. 8,819,516 on Aug. 26, 2014, which claims priority under 35 U.S.C. § 120 as a continuation application to U.S. patent application Ser. No. 12/767,404, entitled, "METHOD AND APPARATUS FOR STORAGE INTEGRITY PROCESSING BASED ON ERROR TYPES IN A DISPERSED STORAGE NETWORK," filed Apr. 26, 2010, issued as U.S. Pat. No. 8,489,915 on Jul. 16, 2013.

U.S. patent application Ser. No. 12/767,404 also claims priority under 35 U.S.C. § 120 as a continuation in part application to U.S. patent application Ser. No. 12/716,106, entitled, "METHOD AND APPARATUS FOR REBUILDING DATA IN A DISPERSED DATA STORAGE NETWORK," filed Mar. 2, 2010, issued as U.S. Pat. No. 8,560,822 on Oct. 15, 2013.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

Technical Field of the Invention

This invention relates generally to computer networks and more particularly to dispersed storage of data and distributed task processing of data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 24 is a schematic block diagram of an example of a storage operation of a DST execution unit in accordance with the present invention;

FIG. 32 is a diagram of an example of DST allocation information for the example of FIG. 30 in accordance with the present invention;

FIGS. 33-38 are schematic block diagrams of the DSTN module performing the example of FIG. 30 in accordance with the present invention;

FIG. 39 is a diagram of an example of combining result information into final results for the example of FIG. 30 in accordance with the present invention;

FIG. 41A is a diagram representing an example structure of an access control list (ACL) in accordance with the present invention;

Figure 44D:
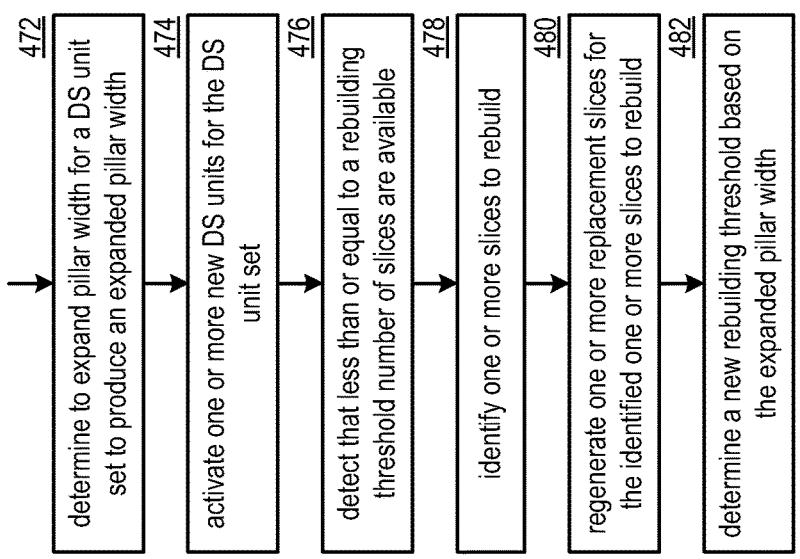
Figure 45A:
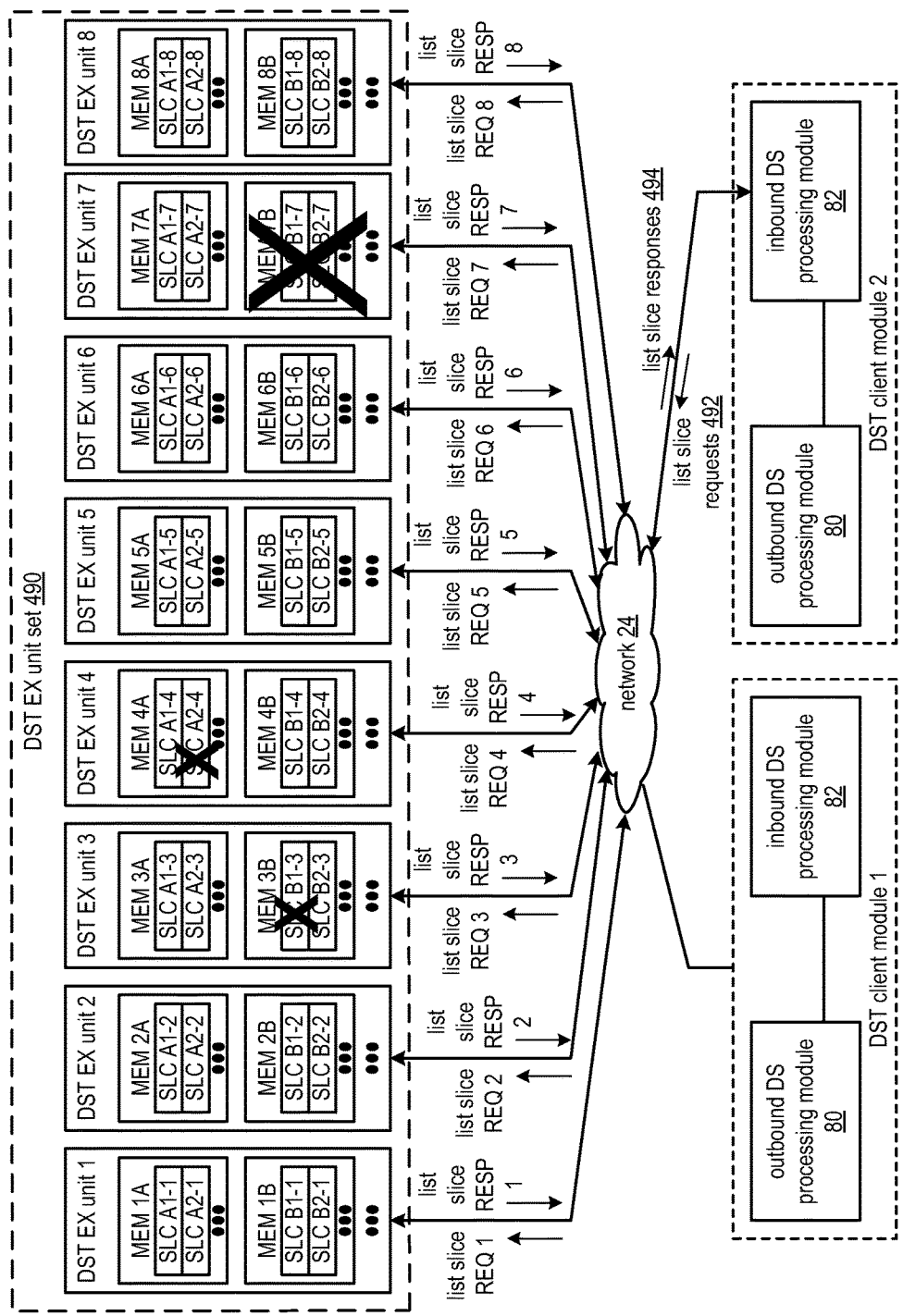
Figure 45B:
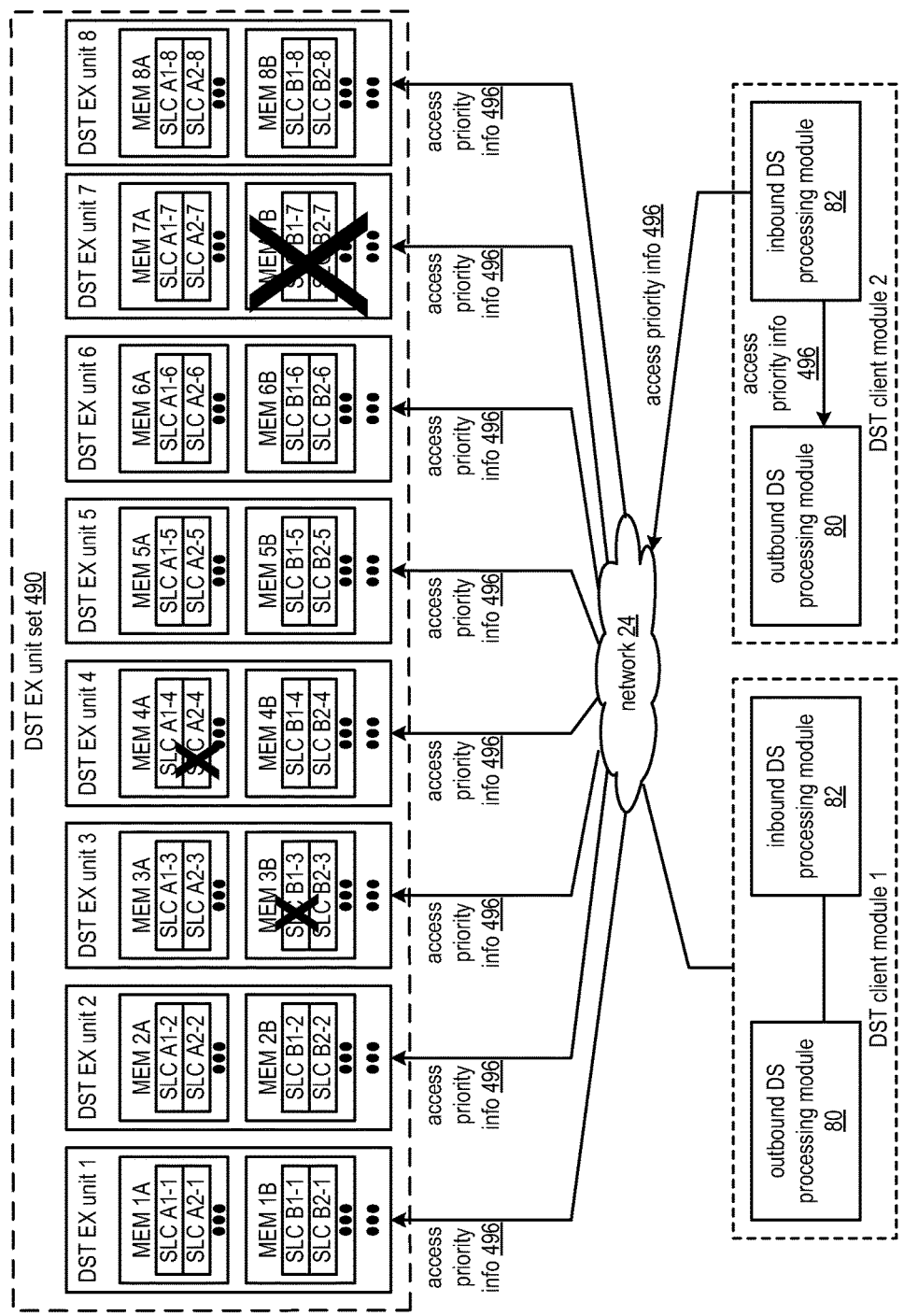
Figure 45C:
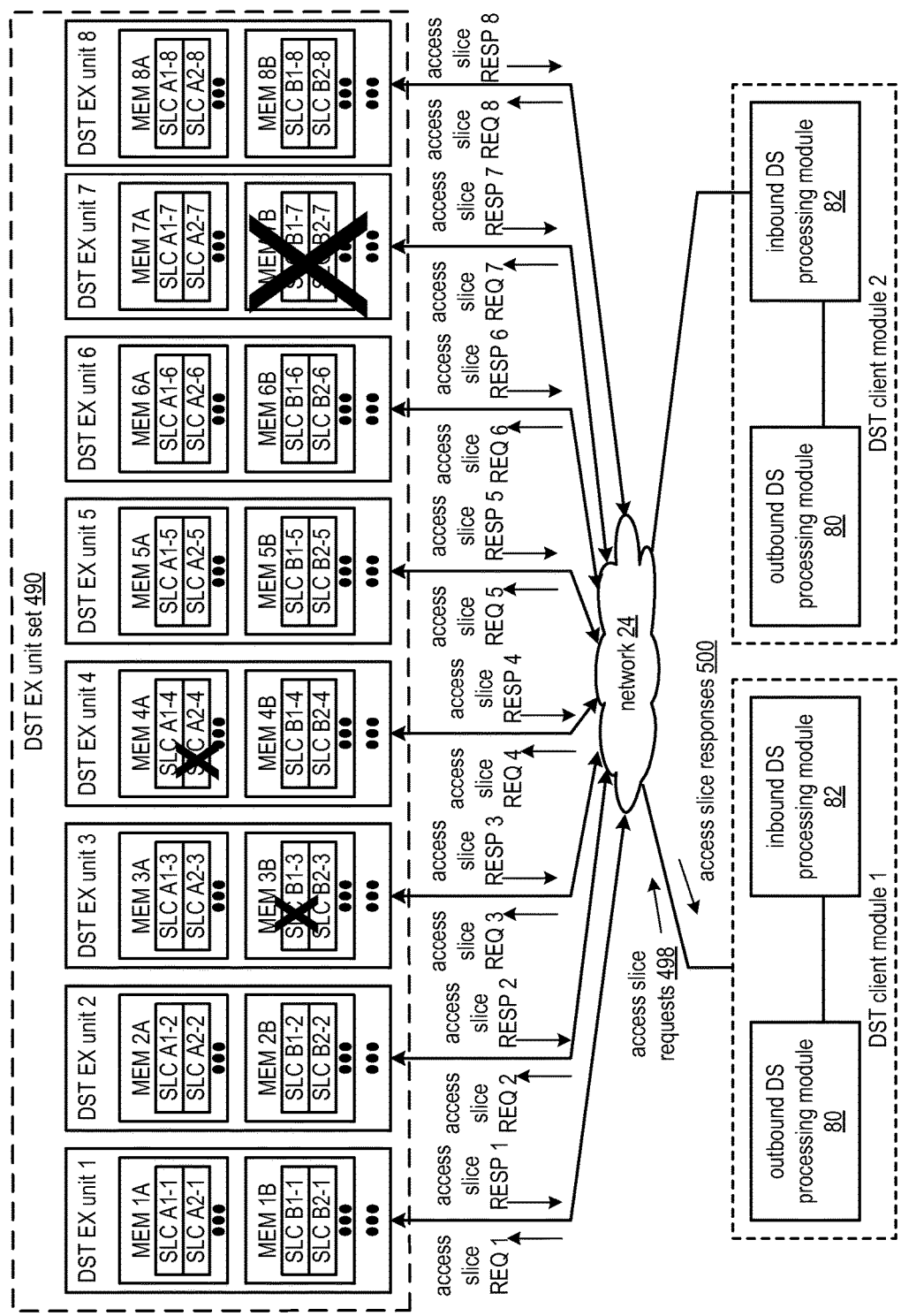
Figure 45D:
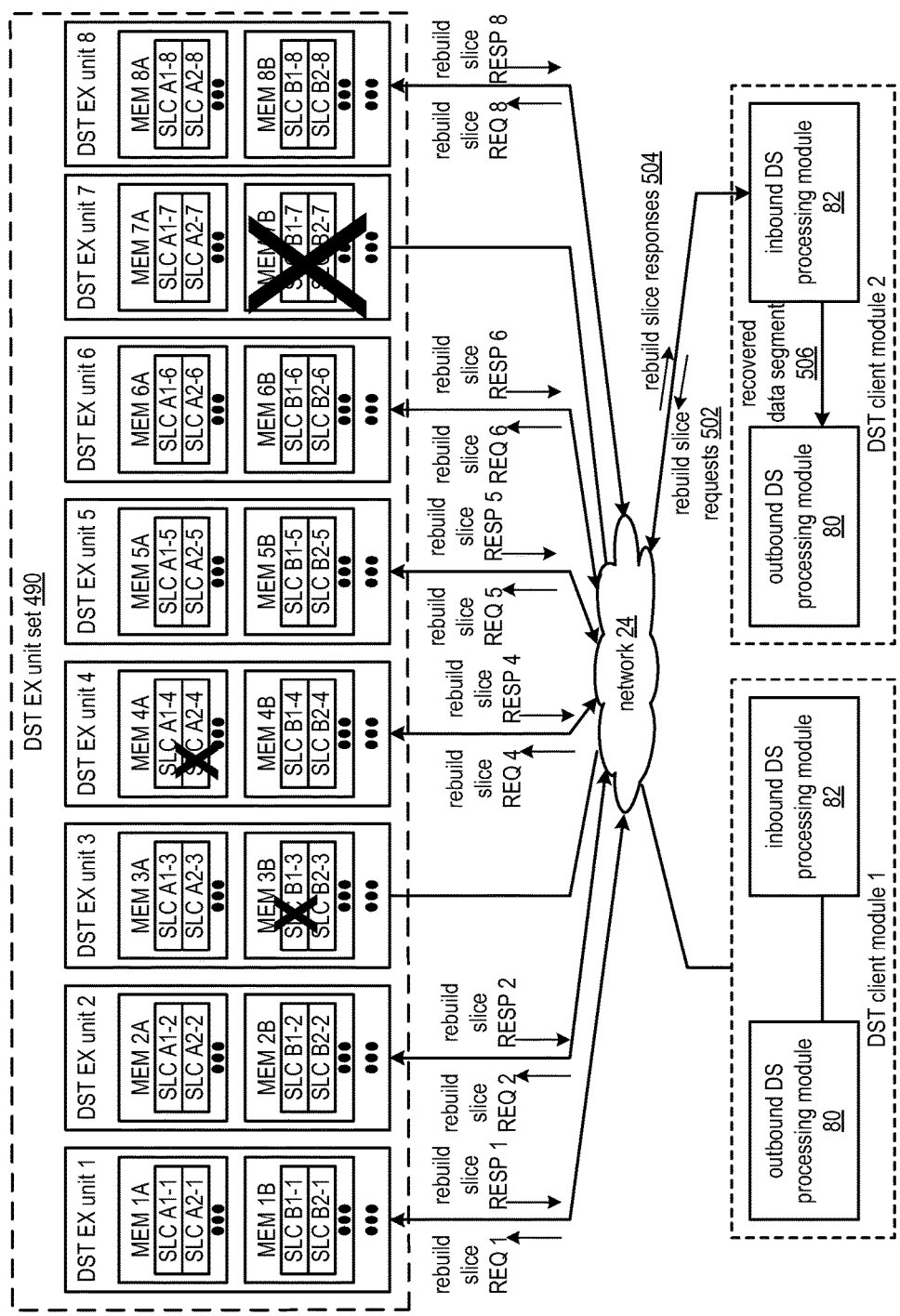
Figure 45E:
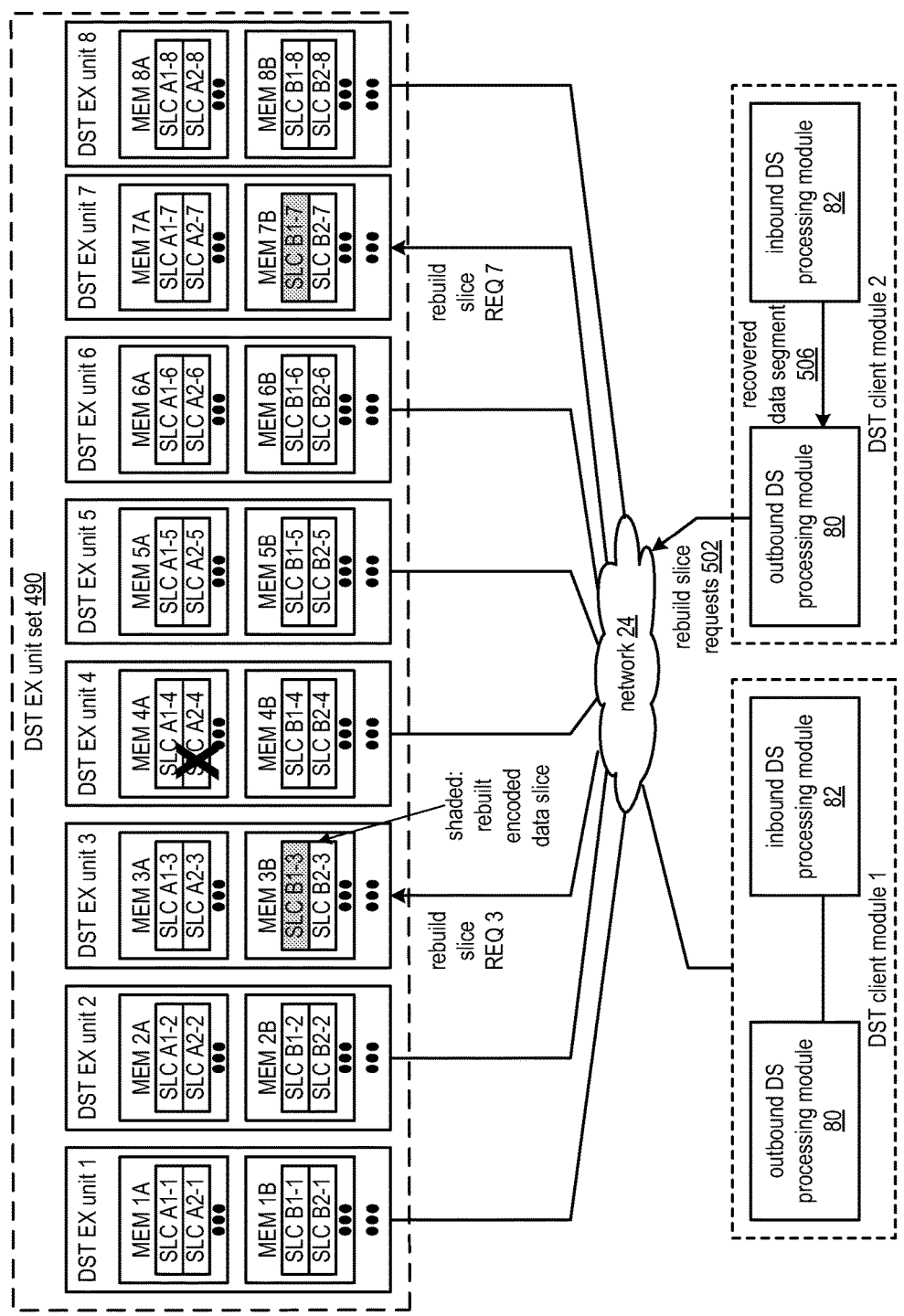
Figure 45F:
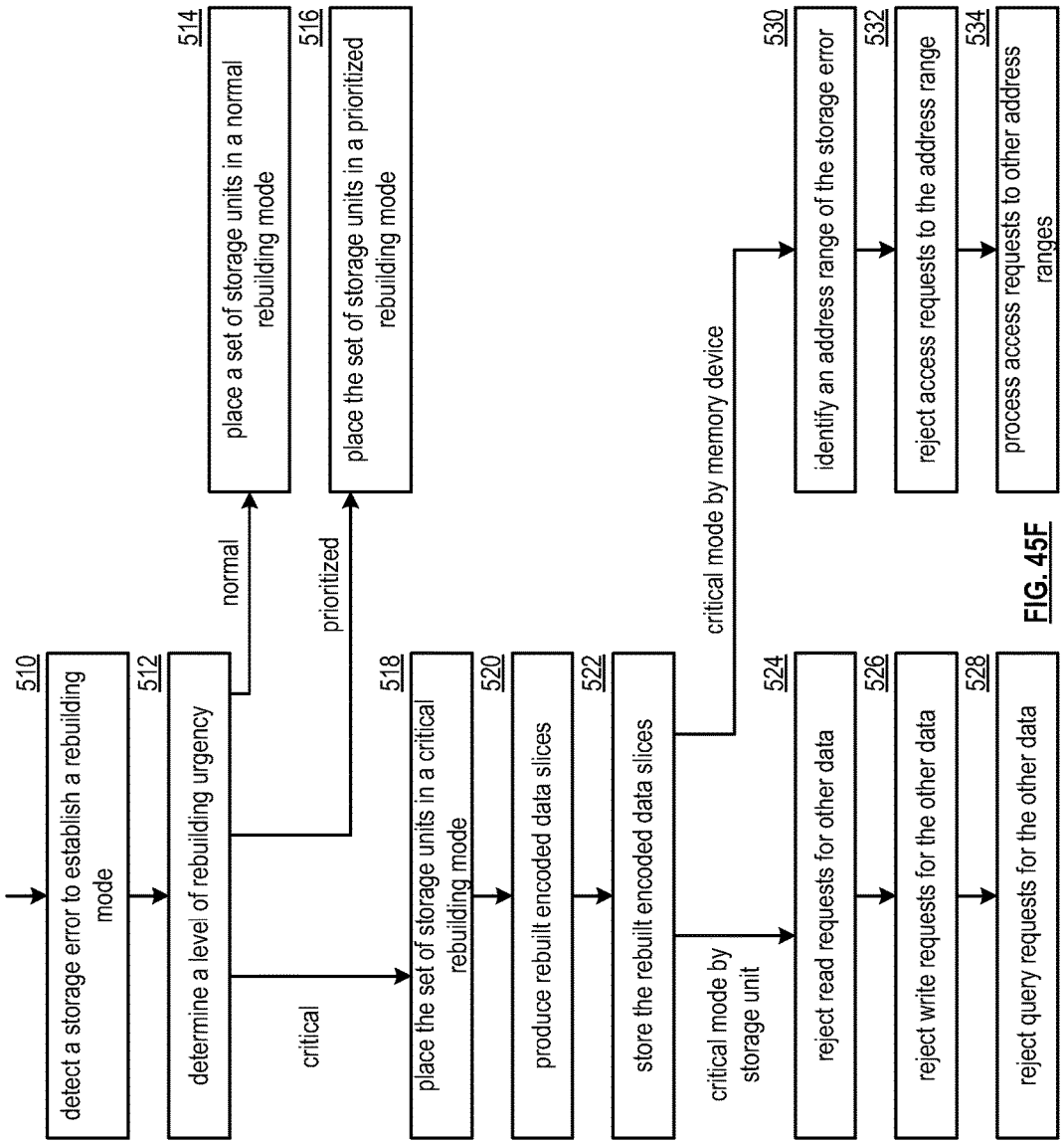
Figure 46A:
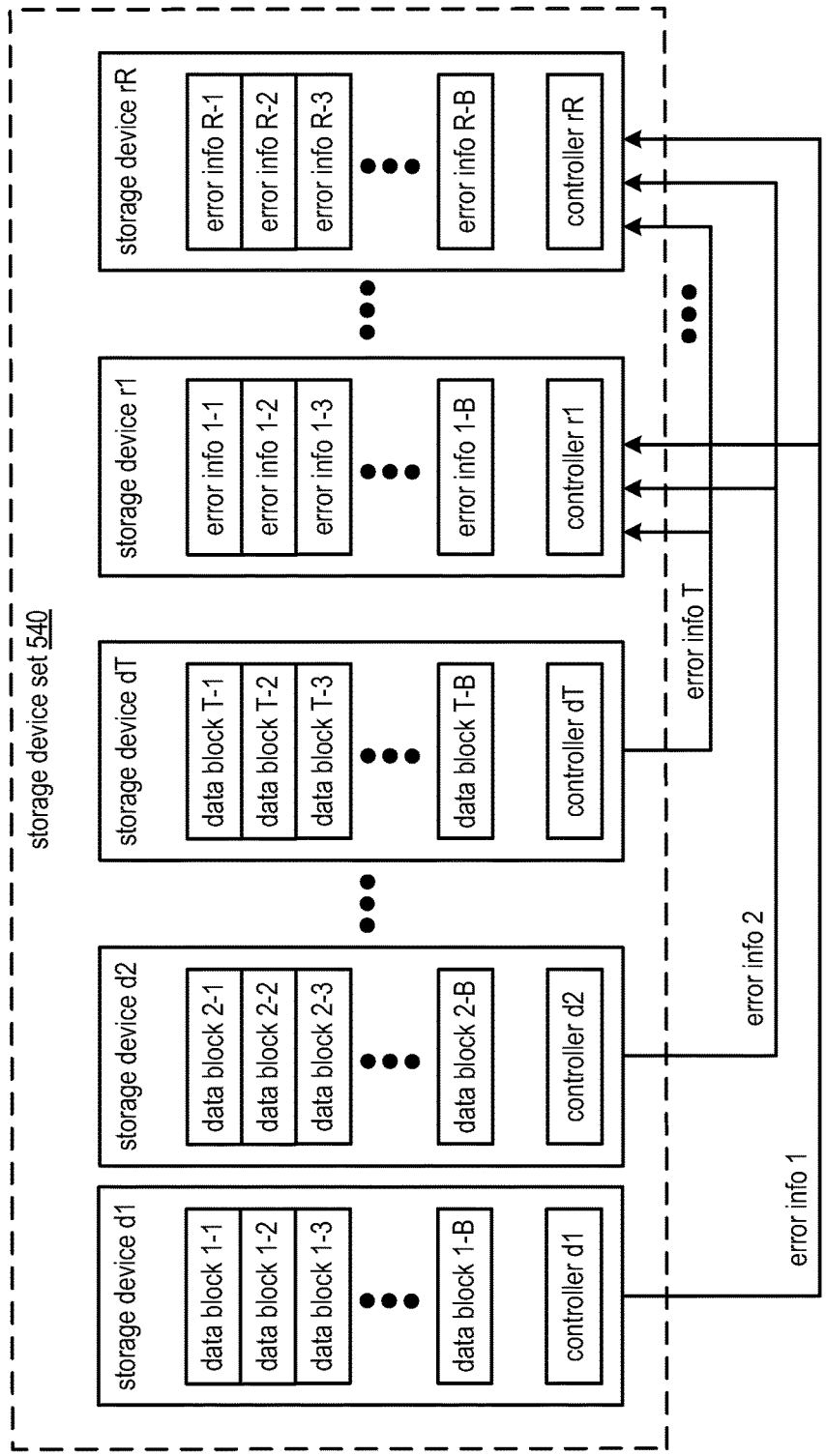
Figure 46B:
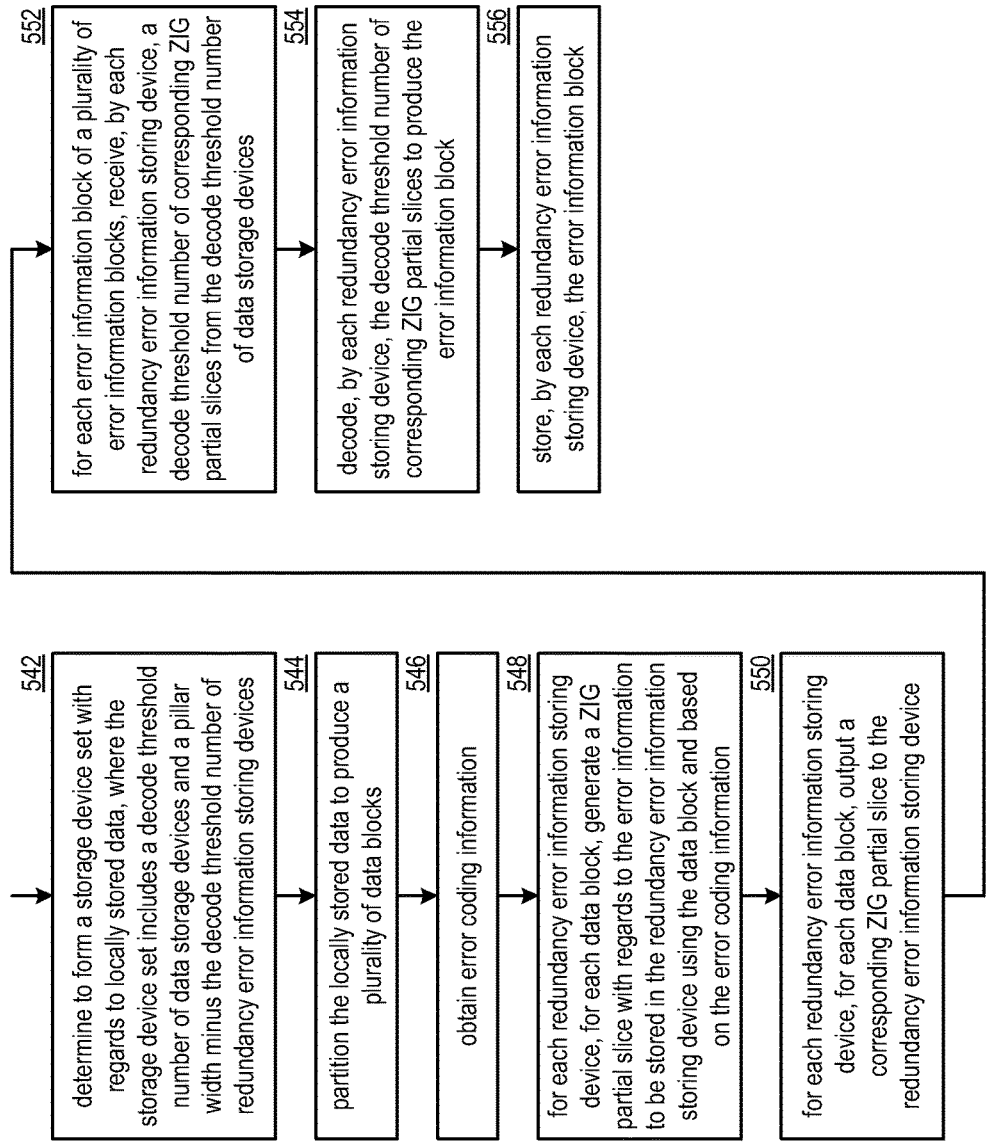
Figure 47A:
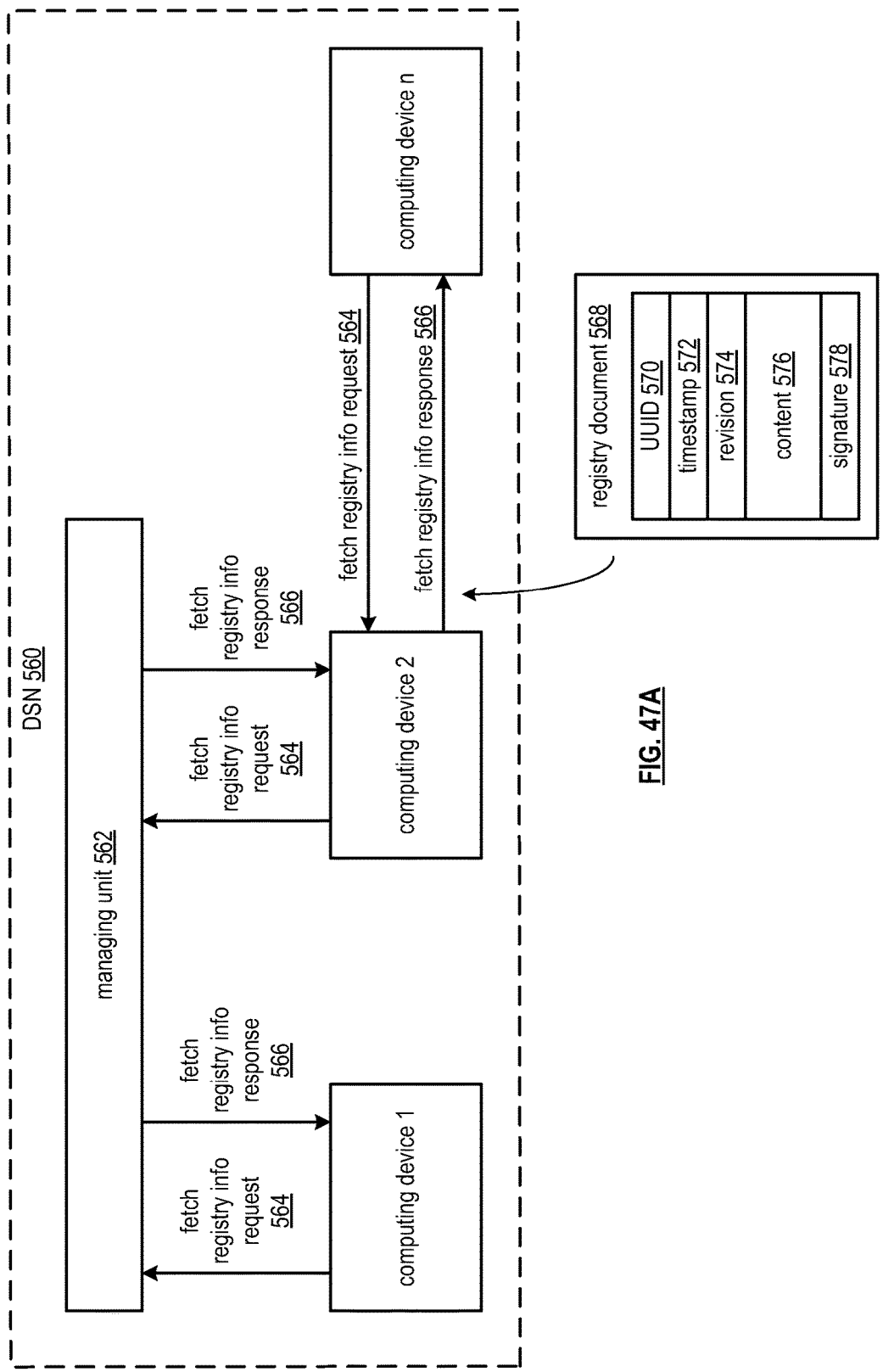
Figure 47B:
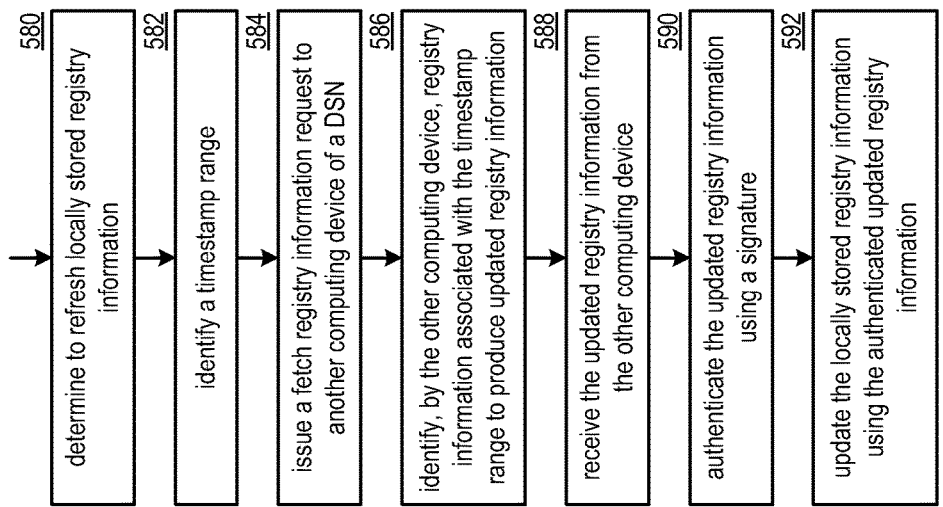
Figure 48A:
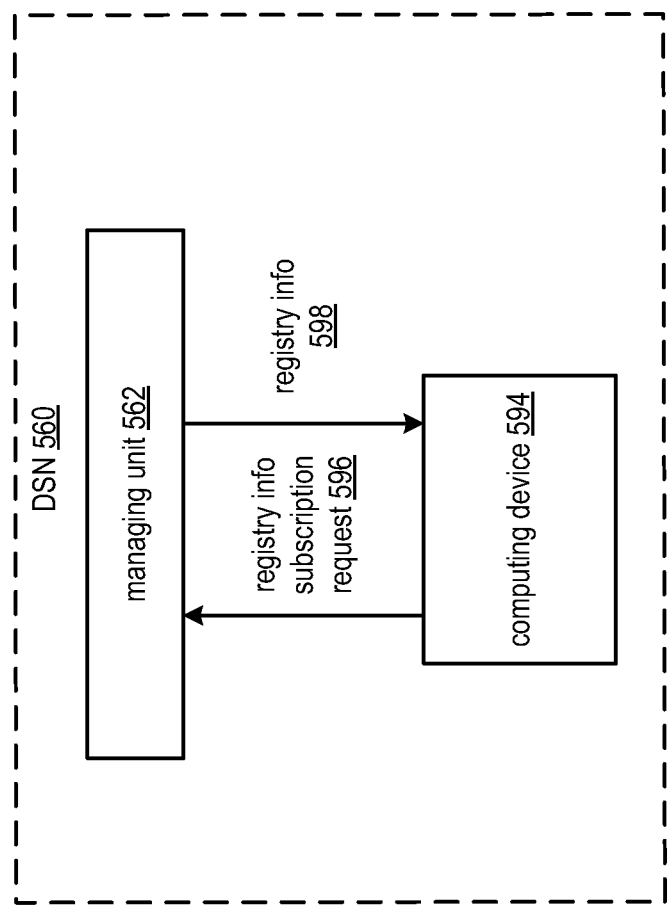
Figure 49A:
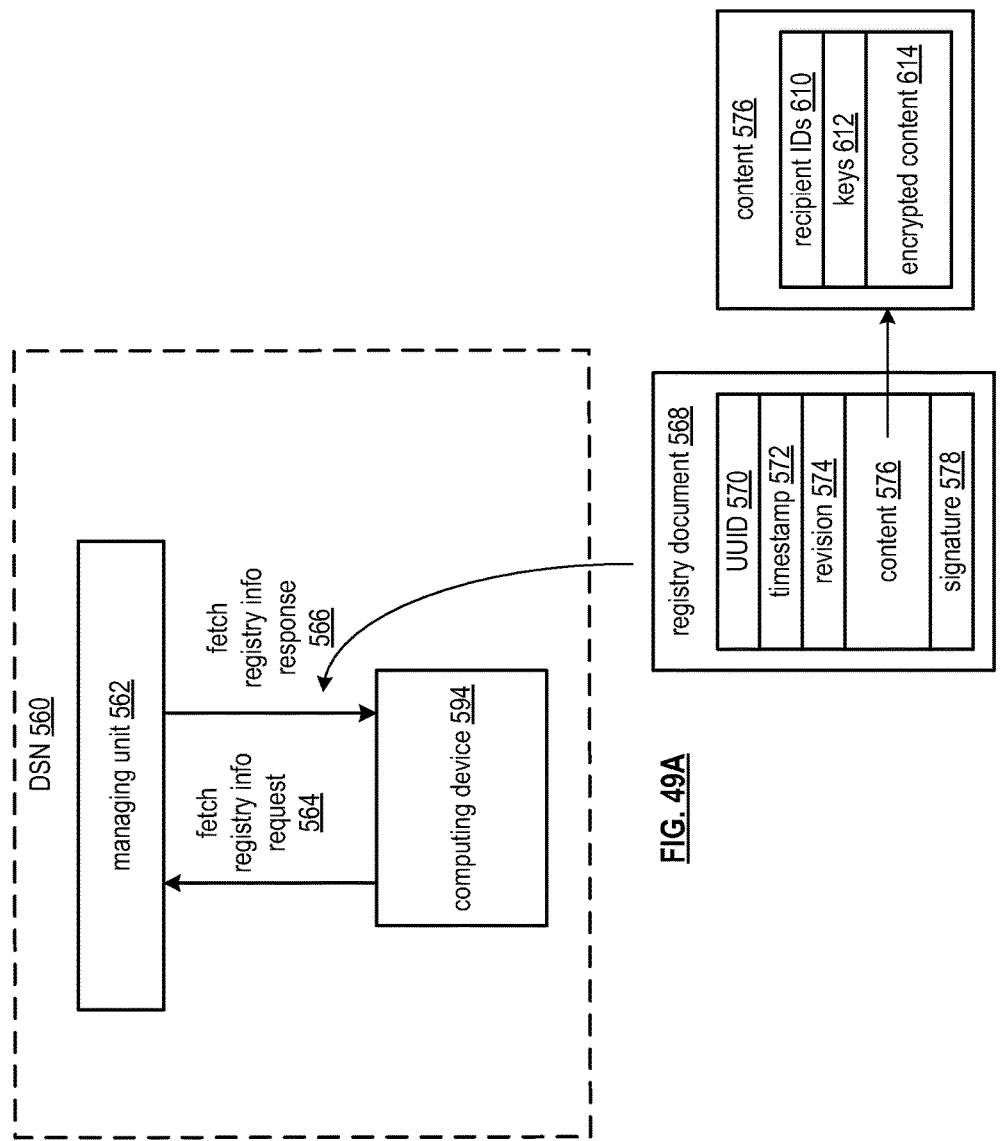
Figure 49B:
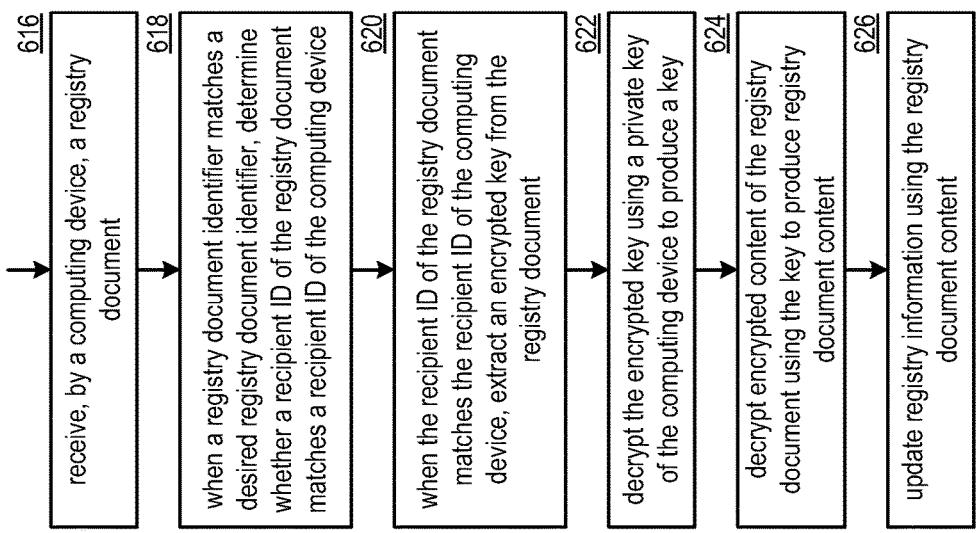

FIGS. 44A-C illustrates schematic block diagrams of the embodiments of a dispersed storage unit set for a rebuilding sequence in accordance with the present invention;

FIG. 44D is a flowchart illustrating an example of modifying dispersal parameters in accordance with the present invention;

FIGS. 45A-E are schematic block diagrams of another embodiment of a dispersed storage network (DSN) illustrating prioritizing rebuilding of stored data in accordance with the present invention;

FIG. 45F is a flowchart illustrating an example of prioritizing rebuilding of stored data in accordance with the present invention;

FIG. 46A is a schematic block diagram of an embodiment of a storage device set in accordance with the present invention;

FIG. 46B is a flowchart illustrating an example of modifying storage of previously stored data in accordance with the present invention;

FIG. 47A is a schematic block diagram of another embodiment of a dispersed storage network (DSN) in accordance with the present invention;

FIG. 47B is a flowchart illustrating an example of updating dispersed storage network (DSN) registry information in accordance with the present invention;

FIG. 48A is a schematic block diagram of another embodiment of a dispersed storage network (DSN) in accordance with the present invention;

FIG. 48B is a flowchart illustrating another example of updating dispersed storage network (DSN) registry information in accordance with the present invention;

FIG. 49A is a schematic block diagram of another embodiment of a dispersed storage network (DSN) in accordance with the present invention; and FIG. 49B is a flowchart illustrating another example of updating dispersed storage network (DSN) registry information in accordance with the present invention.

DETAILED DESCRIPTION OF THE INVENTION

Figure 1:
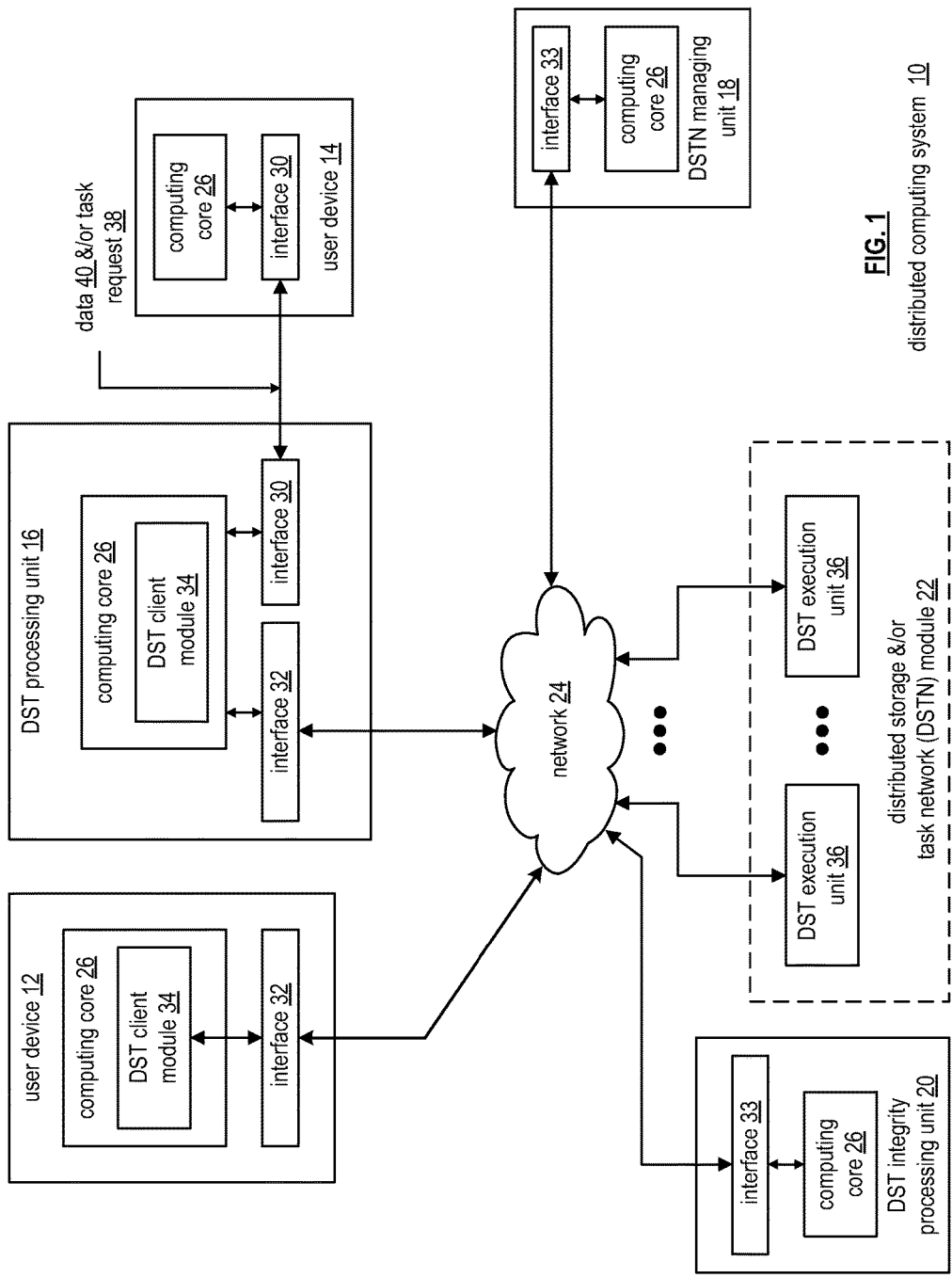
FIG. 1 is a schematic block diagram of an embodiment of a distributed computing system in accordance with the present invention.

FIG. 1 is a schematic block diagram of an embodiment of a distributed computing system 10 that includes a user device 12 and/or a user device 14, a distributed storage and/or task (DST) processing unit 16, a distributed storage and/or task network (DSTN) managing unit 18, a DST integrity processing unit 20, and a distributed storage and/or task network (DSTN) module 22. The components of the distributed computing system 10 are coupled via a network 24, which may include one or more wireless and/or wire lined communication systems; one or more private intranet systems and/or public internet systems; and/or one or more local area networks (LAN) and/or wide area networks (WAN).

The DSTN module 22 includes a plurality of distributed storage and/or task (DST) execution units 36 that may be located at geographically different sites (e.g., one in Chicago, one in Milwaukee, etc.). Each of the DST execution units is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc.

Each of the user devices 12-14, the DST processing unit 16, the DSTN managing unit 18, and the DST integrity processing unit 20 include a computing core 26 and may be a portable computing device and/or a fixed computing device. A portable computing device may be a social networking device, a gaming device, a cell phone, a smart phone, a personal digital assistant, a digital music player, a digital video player, a laptop computer, a handheld computer, a tablet, a video game controller, and/or any other portable device that includes a computing core. A fixed computing device may be a personal computer (PC), a computer server, a cable set-top box, a satellite receiver, a television set, a printer, a fax machine, home entertainment equipment, a video game console, and/or any type of home or office computing equipment. User device 12 and DST processing unit 16 are configured to include a DST client module 34.

With respect to interfaces, each interface 30, 32, and 33 includes software and/or hardware to support one or more communication links via the network 24 indirectly and/or directly. For example, interface 30 supports a communication link (e.g., wired, wireless, direct, via a LAN, via the network 24, etc.) between user device 14 and the DST processing unit 16. As another example, interface 32 supports communication links (e.g., a wired connection, a wireless connection, a LAN connection, and/or any other type of connection to/from the network 24) between user device 12 and the DSTN module 22 and between the DST processing unit 16 and the DSTN module 22. As yet another example, interface 33 supports a communication link for each of the DSTN managing unit 18 and DST integrity processing unit 20 to the network 24.

The distributed computing system 10 is operable to support dispersed storage (DS) error encoded data storage and retrieval, to support distributed task processing on received data, and/or to support distributed task processing on stored data. In general and with respect to DS error encoded data storage and retrieval, the distributed computing system 10 supports three primary operations: storage management, data storage and retrieval (an example of which will be discussed with reference to FIGS. 20-26), and data storage integrity verification. In accordance with these three primary functions, data can be encoded, distributedly stored in physically different locations, and subsequently retrieved in a reliable and secure manner. Such a system is tolerant of a significant number of failures (e.g., up to a failure level, which may be greater than or equal to a pillar width minus a decode threshold minus one) that may result from individual storage device failures and/or network equipment failures without loss of data and without the need for a redundant or backup copy. Further, the system allows the data to be stored for an indefinite period of time without data loss and does so in a secure manner (e.g., the system is very resistant to attempts at hacking the data).

The second primary function (i.e., distributed data storage and retrieval) begins and ends with a user device 12-14. For instance, if a second type of user device 14 has data 40 to store in the DSTN module 22, it sends the data 40 to the DST processing unit 16 via its interface 30. The interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data 40.

To support storage management, the DSTN managing unit 18 performs DS management services. One such DS management service includes the DSTN managing unit 18 establishing distributed data storage parameters (e.g., vault creation, distributed storage parameters, security parameters, billing information, user profile information, etc.) for a user device 12-14 individually or as part of a group of user devices. For example, the DSTN managing unit 18 coordinates creation of a vault (e.g., a virtual memory block) within memory of the DSTN module 22 for a user device, a group of devices, or for public access and establishes per vault dispersed storage (DS) error encoding parameters for a vault. The DSTN managing unit 18 may facilitate storage of DS error encoding parameters for each vault of a plurality of vaults by updating registry information for the distributed computing system 10. The facilitating includes storing updated registry information in one or more of the DSTN module 22, the user device 12, the DST processing unit 16, and the DST integrity processing unit 20.

The DS error encoding parameters (e.g., or dispersed storage error coding parameters) include data segmenting information (e.g., how many segments data (e.g., a file, a group of files, a data block, etc.) is divided into), segment security information (e.g., per segment encryption, compression, integrity checksum, etc.), error coding information (e.g., pillar width, decode threshold, read threshold, write threshold, etc.), slicing information (e.g., the number of encoded data slices that will be created for each data segment); and slice security information (e.g., per encoded data slice encryption, compression, integrity checksum, etc.).

The DSTN managing unit 18 creates and stores user profile information (e.g., an access control list (ACL)) in local memory and/or within memory of the DSTN module 22. The user profile information includes authentication information, permissions, and/or the security parameters. The security parameters may include encryption/decryption scheme, one or more encryption keys, key generation scheme, and/or data encoding/decoding scheme.

The DSTN managing unit 18 creates billing information for a particular user, a user group, a vault access, public vault access, etc. For instance, the DSTN managing unit 18 tracks the number of times a user accesses a private vault and/or public vaults, which can be used to generate a per-access billing information. In another instance, the DSTN managing unit 18 tracks the amount of data stored and/or retrieved by a user device and/or a user group, which can be used to generate a per-data-amount billing information.

Another DS management service includes the DSTN managing unit 18 performing network operations, network administration, and/or network maintenance. Network operations includes authenticating user data allocation requests (e.g., read and/or write requests), managing creation of vaults, establishing authentication credentials for user devices, adding/deleting components (e.g., user devices, DST execution units, and/or DST processing units) from the distributed computing system 10, and/or establishing authentication credentials for DST execution units 36. Network administration includes monitoring devices and/or units for failures, maintaining vault information, determining device and/or unit activation status, determining device and/or unit loading, and/or determining any other system level operation that affects the performance level of the system 10. Network maintenance includes facilitating replacing, upgrading, repairing, and/or expanding a device and/or unit of the system 10.

To support data storage integrity verification within the distributed computing system 10, the DST integrity processing unit 20 performs rebuilding of 'bad' or missing encoded data slices. At a high level, the DST integrity processing unit 20 performs rebuilding by periodically attempting to retrieve/list encoded data slices, and/or slice names of the encoded data slices, from the DSTN module 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in memory of the DSTN module 22. Note that the DST integrity processing unit 20 may be a separate unit as shown, it may be included in the DSTN module 22, it may be included in the DST processing unit 16, and/or distributed among the DST execution units 36.

To support distributed task processing on received data, the distributed computing system 10 has two primary operations: DST (distributed storage and/or task processing) management and DST execution on received data (an example of which will be discussed with reference to FIGS. 3-19). With respect to the storage portion of the DST management, the DSTN managing unit 18 functions as previously described. With respect to the tasking processing of the DST management, the DSTN managing unit 18 performs distributed task processing (DTP) management services. One such DTP management service includes the DSTN managing unit 18 establishing DTP parameters (e.g., user-vault affiliation information, billing information, user-task information, etc.) for a user device 12-14 individually or as part of a group of user devices.

Another DTP management service includes the DSTN managing unit 18 performing DTP network operations, network administration (which is essentially the same as described above), and/or network maintenance (which is essentially the same as described above). Network operations include, but are not limited to, authenticating user task processing requests (e.g., valid request, valid user, etc.), authenticating results and/or partial results, establishing DTP authentication credentials for user devices, adding/deleting components (e.g., user devices, DST execution units, and/or DST processing units) from the distributed computing system, and/or establishing DTP authentication credentials for DST execution units.

To support distributed task processing on stored data, the distributed computing system 10 has two primary operations: DST (distributed storage and/or task) management and DST execution on stored data. With respect to the DST execution on stored data, if the second type of user device 14 has a task request 38 for execution by the DSTN module 22, it sends the task request 38 to the DST processing unit 16 via its interface 30. An example of DST execution on stored data will be discussed in greater detail with reference to FIGS. 27-39. With respect to the DST management, it is substantially similar to the DST management to support distributed task processing on received data.

Figure 2:
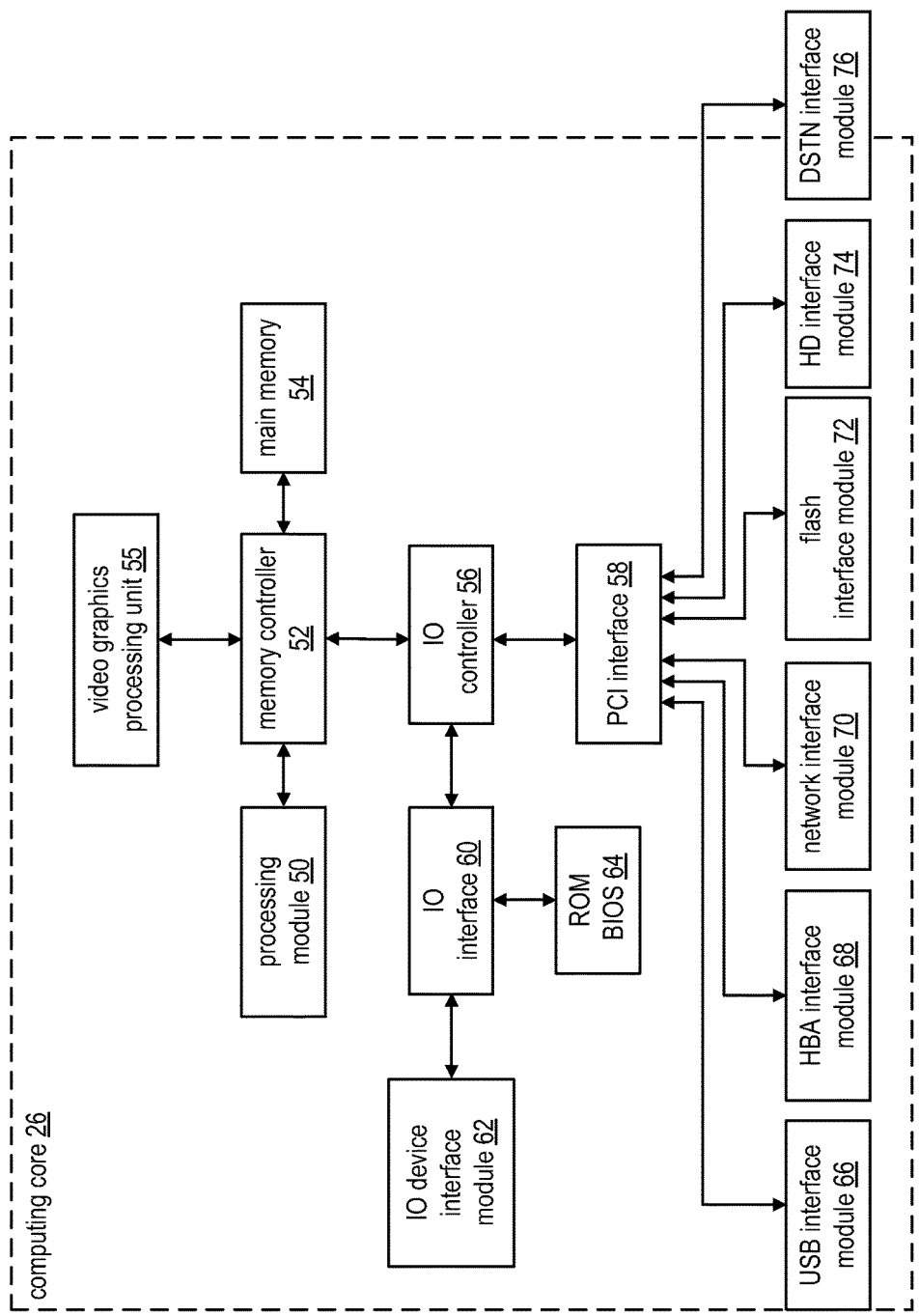
FIG. 2 is a schematic block diagram of an embodiment of a computing core in accordance with the present invention.

FIG. 2 is a schematic block diagram of an embodiment of a computing core 26 that includes a processing module 50, a memory controller 52, main memory 54, a video graphics processing unit 55, an input/output (TO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSTN interface module 76.

The DSTN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSTN interface module 76 and/or the network interface module 70 may function as the interface 30 of the user device 14 of FIG. 1. Further note that the IO device interface module 62 and/or the memory interface modules may be collectively or individually referred to as IO ports.

Figure 3:
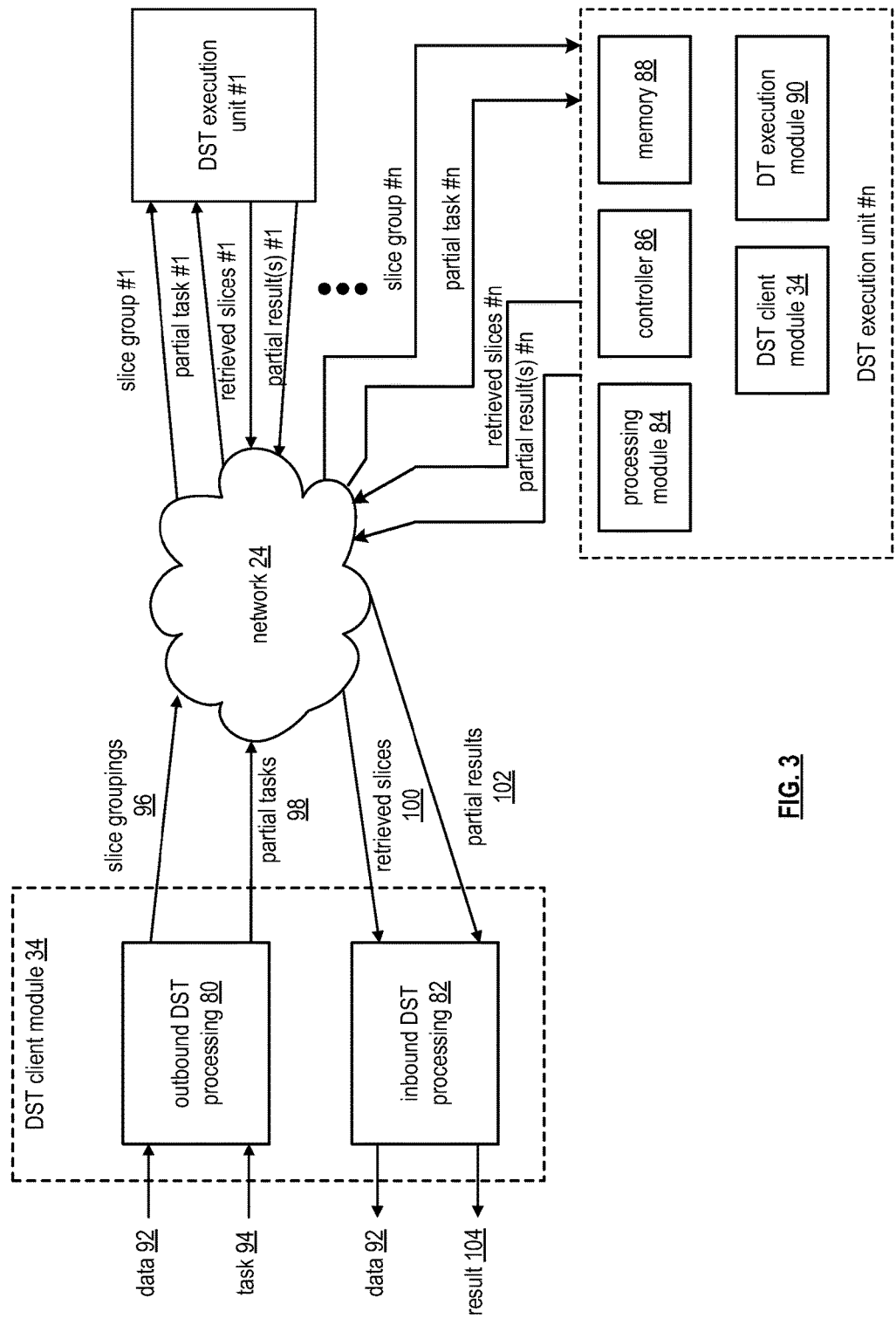
FIG. 3 is a diagram of an example of a distributed storage and task processing in accordance with the present invention.

FIG. 3 is a diagram of an example of the distributed computing system performing a distributed storage and task processing operation. The distributed computing system includes a DST (distributed storage and/or task) client module 34 (which may be in user device 14 and/or in DST processing unit 16 of FIG. 1), a network 24, a plurality of DST execution units 1-n that includes two or more DST execution units 36 of FIG. 1 (which form at least a portion of DSTN module 22 of FIG. 1), a DST managing module (not shown), and a DST integrity verification module (not shown). The DST client module 34 includes an outbound DST processing section 80 and an inbound DST processing section 82. Each of the DST execution units 1-n includes a controller 86, a processing module 84, memory 88, a DT (distributed task) execution module 90, and a DST client module 34.

In an example of operation, the DST client module 34 receives data 92 and one or more tasks 94 to be performed upon the data 92. The data 92 may be of any size and of any content, where, due to the size (e.g., greater than a few Terabytes), the content (e.g., secure data, etc.), and/or task(s) (e.g., MIPS intensive), distributed processing of the task(s) on the data is desired. For example, the data 92 may be one or more digital books, a copy of a company's emails, a large-scale Internet search, a video security file, one or more entertainment video files (e.g., television programs, movies, etc.), data files, and/or any other large amount of data (e.g., greater than a few Terabytes).

Within the DST client module 34, the outbound DST processing section 80 receives the data 92 and the task(s) 94. The outbound DST processing section 80 processes the data 92 to produce slice groupings 96. As an example of such processing, the outbound DST processing section 80 partitions the data 92 into a plurality of data partitions. For each data partition, the outbound DST processing section 80 dispersed storage (DS) error encodes the data partition to produce encoded data slices and groups the encoded data slices into a slice grouping 96. In addition, the outbound DST processing section 80 partitions the task 94 into partial tasks 98, where the number of partial tasks 98 may correspond to the number of slice groupings 96.

The outbound DST processing section 80 then sends, via the network 24, the slice groupings 96 and the partial tasks 98 to the DST execution units 1-n of the DSTN module 22 of FIG. 1. For example, the outbound DST processing section 80 sends slice group 1 and partial task 1 to DST execution unit 1. As another example, the outbound DST processing section 80 sends slice group #n and partial task #n to DST execution unit #n.

Each DST execution unit performs its partial task 98 upon its slice group 96 to produce partial results 102. For example, DST execution unit #1 performs partial task #1 on slice group #1 to produce a partial result #1, for results. As a more specific example, slice group #1 corresponds to a data partition of a series of digital books and the partial task #1 corresponds to searching for specific phrases, recording where the phrase is found, and establishing a phrase count. In this more specific example, the partial result #1 includes information as to where the phrase was found and includes the phrase count.

Upon completion of generating their respective partial results 102, the DST execution units send, via the network 24, their partial results 102 to the inbound DST processing section 82 of the DST client module 34. The inbound DST processing section 82 processes the received partial results 102 to produce a result 104. Continuing with the specific example of the preceding paragraph, the inbound DST processing section 82 combines the phrase count from each of the DST execution units 36 to produce a total phrase count. In addition, the inbound DST processing section 82 combines the 'where the phrase was found' information from each of the DST execution units 36 within their respective data partitions to produce 'where the phrase was found' information for the series of digital books.

In another example of operation, the DST client module 34 requests retrieval of stored data within the memory of the DST execution units 36 (e.g., memory of the DSTN module). In this example, the task 94 is retrieve data stored in the memory of the DSTN module. Accordingly, the outbound DST processing section 80 converts the task 94 into a plurality of partial tasks 98 and sends the partial tasks 98 to the respective DST execution units 1-n.

In response to the partial task 98 of retrieving stored data, a DST execution unit 36 identifies the corresponding encoded data slices 100 and retrieves them. For example, DST execution unit #1 receives partial task #1 and retrieves, in response thereto, retrieved slices #1. The DST execution units 36 send their respective retrieved slices 100 to the inbound DST processing section 82 via the network 24.

The inbound DST processing section 82 converts the retrieved slices 100 into data 92. For example, the inbound DST processing section 82 de-groups the retrieved slices 100 to produce encoded slices per data partition. The inbound DST processing section 82 then DS error decodes the encoded slices per data partition to produce data partitions. The inbound DST processing section 82 de-partitions the data partitions to recapture the data 92.

Figure 4:
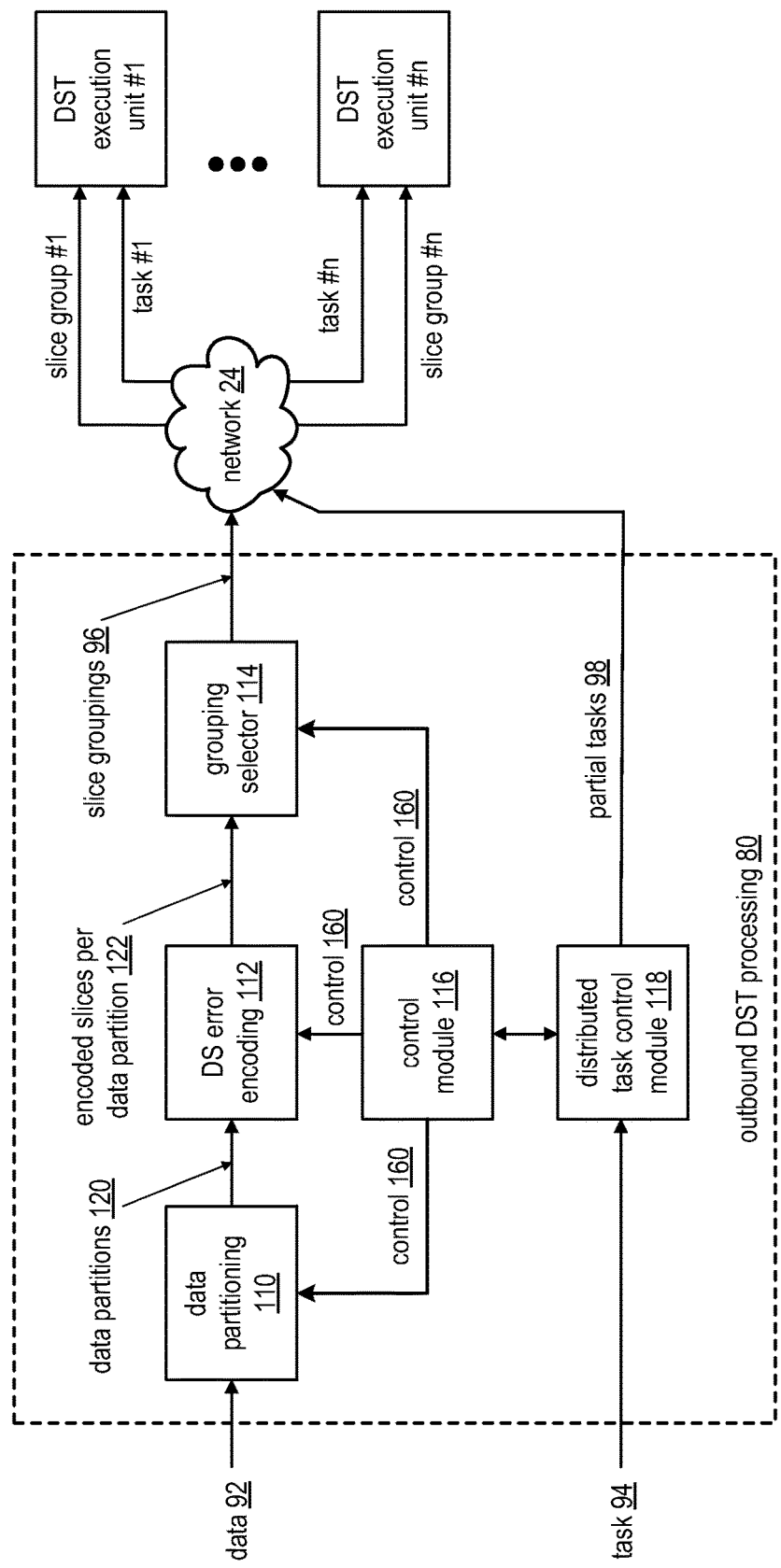
FIG. 4 is a schematic block diagram of an embodiment of an outbound distributed storage and/or task (DST) processing in accordance with the present invention.

FIG. 4 is a schematic block diagram of an embodiment of an outbound distributed storage and/or task (DST) processing section 80 of a DST client module 34 FIG. 1 coupled to a DSTN module 22 of a FIG. 1 (e.g., a plurality of n DST execution units 36) via a network 24. The outbound DST processing section 80 includes a data partitioning module 110, a dispersed storage (DS) error encoding module 112, a grouping selector module 114, a control module 116, and a distributed task control module 118.

In an example of operation, the data partitioning module 110 partitions data 92 into a plurality of data partitions 120. The number of partitions and the size of the partitions may be selected by the control module 116 via control 160 based on the data 92 (e.g., its size, its content, etc.), a corresponding task 94 to be performed (e.g., simple, complex, single step, multiple steps, etc.), DS encoding parameters (e.g., pillar width, decode threshold, write threshold, segment security parameters, slice security parameters, etc.), capabilities of the DST execution units 36 (e.g., processing resources, availability of processing recourses, etc.), and/or as may be inputted by a user, system administrator, or other operator (human or automated). For example, the data partitioning module 110 partitions the data 92 (e.g., 100 Terabytes) into 100,000 data segments, each being 1 Gigabyte in size. Alternatively, the data partitioning module 110 partitions the data 92 into a plurality of data segments, where some of data segments are of a different size, are of the same size, or a combination thereof.

The DS error encoding module 112 receives the data partitions 120 in a serial manner, a parallel manner, and/or a combination thereof. For each data partition 120, the DS error encoding module 112 DS error encodes the data partition 120 in accordance with control information 160 from the control module 116 to produce encoded data slices 122. The DS error encoding includes segmenting the data partition into data segments, segment security processing (e.g., encryption, compression, watermarking, integrity check (e.g., CRC), etc.), error encoding, slicing, and/or per slice security processing (e.g., encryption, compression, watermarking, integrity check (e.g., CRC), etc.). The control information 160 indicates which steps of the DS error encoding are active for a given data partition and, for active steps, indicates the parameters for the step. For example, the control information 160 indicates that the error encoding is active and includes error encoding parameters (e.g., pillar width, decode threshold, write threshold, read threshold, type of error encoding, etc.).

The grouping selector module 114 groups the encoded slices 122 of a data partition into a set of slice groupings 96. The number of slice groupings corresponds to the number of DST execution units 36 identified for a particular task 94. For example, if five DST execution units 36 are identified for the particular task 94, the grouping selector module groups the encoded slices 122 of a data partition into five slice groupings 96. The grouping selector module 114 outputs the slice groupings 96 to the corresponding DST execution units 36 via the network 24.

The distributed task control module 118 receives the task 94 and converts the task 94 into a set of partial tasks 98. For example, the distributed task control module 118 receives a task to find where in the data (e.g., a series of books) a phrase occurs and a total count of the phrase usage in the data. In this example, the distributed task control module 118 replicates the task 94 for each DST execution unit 36 to produce the partial tasks 98. In another example, the distributed task control module 118 receives a task to find where in the data a first phrase occurs, where in the data a second phrase occurs, and a total count for each phrase usage in the data. In this example, the distributed task control module 118 generates a first set of partial tasks 98 for finding and counting the first phrase and a second set of partial tasks for finding and counting the second phrase. The distributed task control module 118 sends respective first and/or second partial tasks 98 to each DST execution unit 36.

Figure 5:
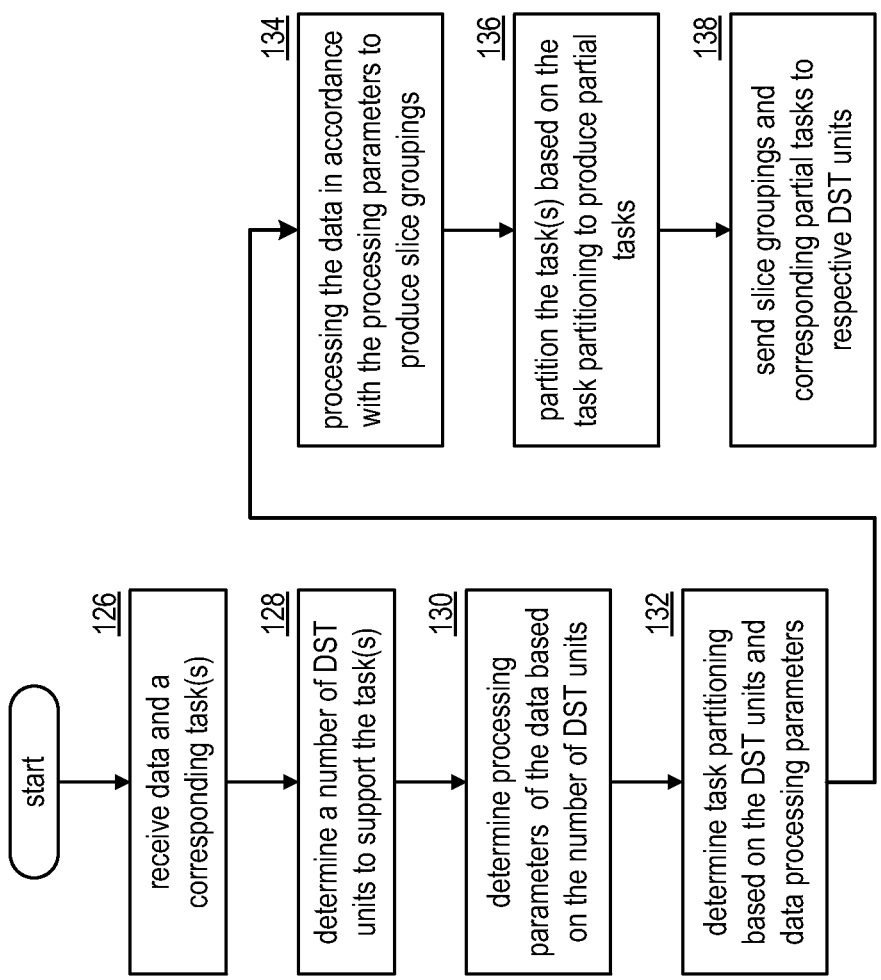
FIG. 5 is a logic diagram of an example of a method for outbound DST processing in accordance with the present invention.

FIG. 5 is a logic diagram of an example of a method for outbound distributed storage and task (DST) processing that begins at step 126 where a DST client module receives data and one or more corresponding tasks. The method continues at step 128 where the DST client module determines a number of DST units to support the task for one or more data partitions. For example, the DST client module may determine the number of DST units to support the task based on the size of the data, the requested task, the content of the data, a predetermined number (e.g., user indicated, system administrator determined, etc.), available DST units, capability of the DST units, and/or any other factor regarding distributed task processing of the data. The DST client module may select the same DST units for each data partition, may select different DST units for the data partitions, or a combination thereof.

The method continues at step 130 where the DST client module determines processing parameters of the data based on the number of DST units selected for distributed task processing. The processing parameters include data partitioning information, DS encoding parameters, and/or slice grouping information. The data partitioning information includes a number of data partitions, size of each data partition, and/or organization of the data partitions (e.g., number of data blocks in a partition, the size of the data blocks, and arrangement of the data blocks). The DS encoding parameters include segmenting information, segment security information, error encoding information (e.g., dispersed storage error encoding function parameters including one or more of pillar width, decode threshold, write threshold, read threshold, generator matrix), slicing information, and/or per slice security information. The slice grouping information includes information regarding how to arrange the encoded data slices into groups for the selected DST units. As a specific example, if the DST client module determines that five DST units are needed to support the task, then it determines that the error encoding parameters include a pillar width of five and a decode threshold of three.

The method continues at step 132 where the DST client module determines task partitioning information (e.g., how to partition the tasks) based on the selected DST units and data processing parameters. The data processing parameters include the processing parameters and DST unit capability information. The DST unit capability information includes the number of DT (distributed task) execution units, execution capabilities of each DT execution unit (e.g., MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, memory information (e.g., type, size, availability, etc.)), and/or any information germane to executing one or more tasks.

The method continues at step 134 where the DST client module processes the data in accordance with the processing parameters to produce slice groupings. The method continues at step 136 where the DST client module partitions the task based on the task partitioning information to produce a set of partial tasks. The method continues at step 138 where the DST client module sends the slice groupings and the corresponding partial tasks to respective DST units.

Figure 6:
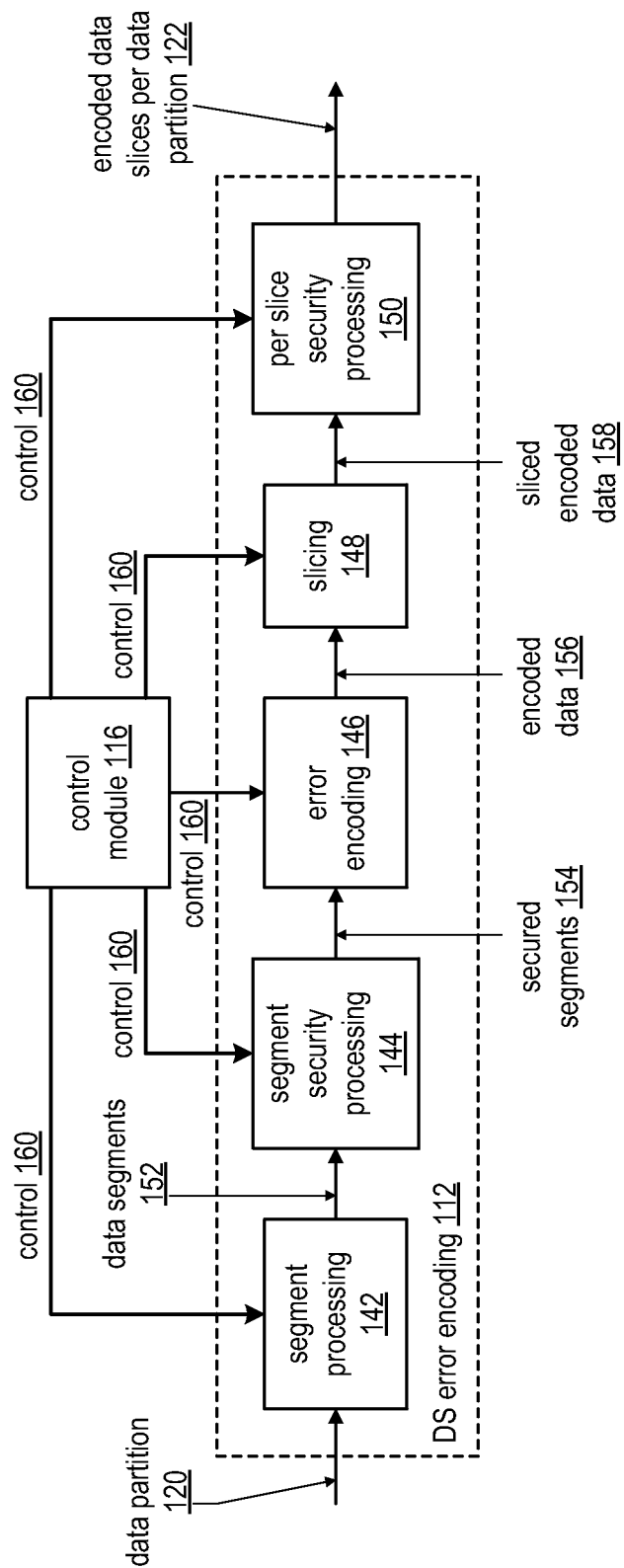
FIG. 6 is a schematic block diagram of an embodiment of a dispersed error encoding in accordance with the present invention.

FIG. 6 is a schematic block diagram of an embodiment of the dispersed storage (DS) error encoding module 112 of an outbound distributed storage and task (DST) processing section. The DS error encoding module 112 includes a segment processing module 142, a segment security processing module 144, an error encoding module 146, a slicing module 148, and a per slice security processing module 150. Each of these modules is coupled to a control module 116 to receive control information 160 therefrom.

In an example of operation, the segment processing module 142 receives a data partition 120 from a data partitioning module and receives segmenting information as the control information 160 from the control module 116. The segmenting information indicates how the segment processing module 142 is to segment the data partition 120. For example, the segmenting information indicates how many rows to segment the data based on a decode threshold of an error encoding scheme, indicates how many columns to segment the data into based on a number and size of data blocks within the data partition 120, and indicates how many columns to include in a data segment 152. The segment processing module 142 segments the data 120 into data segments 152 in accordance with the segmenting information.

The segment security processing module 144, when enabled by the control module 116, secures the data segments 152 based on segment security information received as control information 160 from the control module 116. The segment security information includes data compression, encryption, watermarking, integrity check (e.g., cyclic redundancy check (CRC), etc.), and/or any other type of digital security. For example, when the segment security processing module 144 is enabled, it may compress a data segment 152, encrypt the compressed data segment, and generate a CRC value for the encrypted data segment to produce a secure data segment 154. When the segment security processing module 144 is not enabled, it passes the data segments 152 to the error encoding module 146 or is bypassed such that the data segments 152 are provided to the error encoding module 146.

The error encoding module 146 encodes the secure data segments 154 in accordance with error correction encoding parameters received as control information 160 from the control module 116. The error correction encoding parameters (e.g., also referred to as dispersed storage error coding parameters) include identifying an error correction encoding scheme (e.g., forward error correction algorithm, a Reed-Solomon based algorithm, an online coding algorithm, an information dispersal algorithm, etc.), a pillar width, a decode threshold, a read threshold, a write threshold, etc. For example, the error correction encoding parameters identify a specific error correction encoding scheme, specifies a pillar width of five, and specifies a decode threshold of three. From these parameters, the error encoding module 146 encodes a data segment 154 to produce an encoded data segment 156.

The slicing module 148 slices the encoded data segment 156 in accordance with the pillar width of the error correction encoding parameters received as control information 160. For example, if the pillar width is five, the slicing module 148 slices an encoded data segment 156 into a set of five encoded data slices. As such, for a plurality of encoded data segments 156 for a given data partition, the slicing module outputs a plurality of sets of encoded data slices 158.

The per slice security processing module 150, when enabled by the control module 116, secures each encoded data slice 158 based on slice security information received as control information 160 from the control module 116. The slice security information includes data compression, encryption, watermarking, integrity check (e.g., CRC, etc.), and/or any other type of digital security. For example, when the per slice security processing module 150 is enabled, it compresses an encoded data slice 158, encrypts the compressed encoded data slice, and generates a CRC value for the encrypted encoded data slice to produce a secure encoded data slice 122. When the per slice security processing module 150 is not enabled, it passes the encoded data slices 158 or is bypassed such that the encoded data slices 158 are the output of the DS error encoding module 112. Note that the control module 116 may be omitted and each module stores its own parameters.

Figure 7:
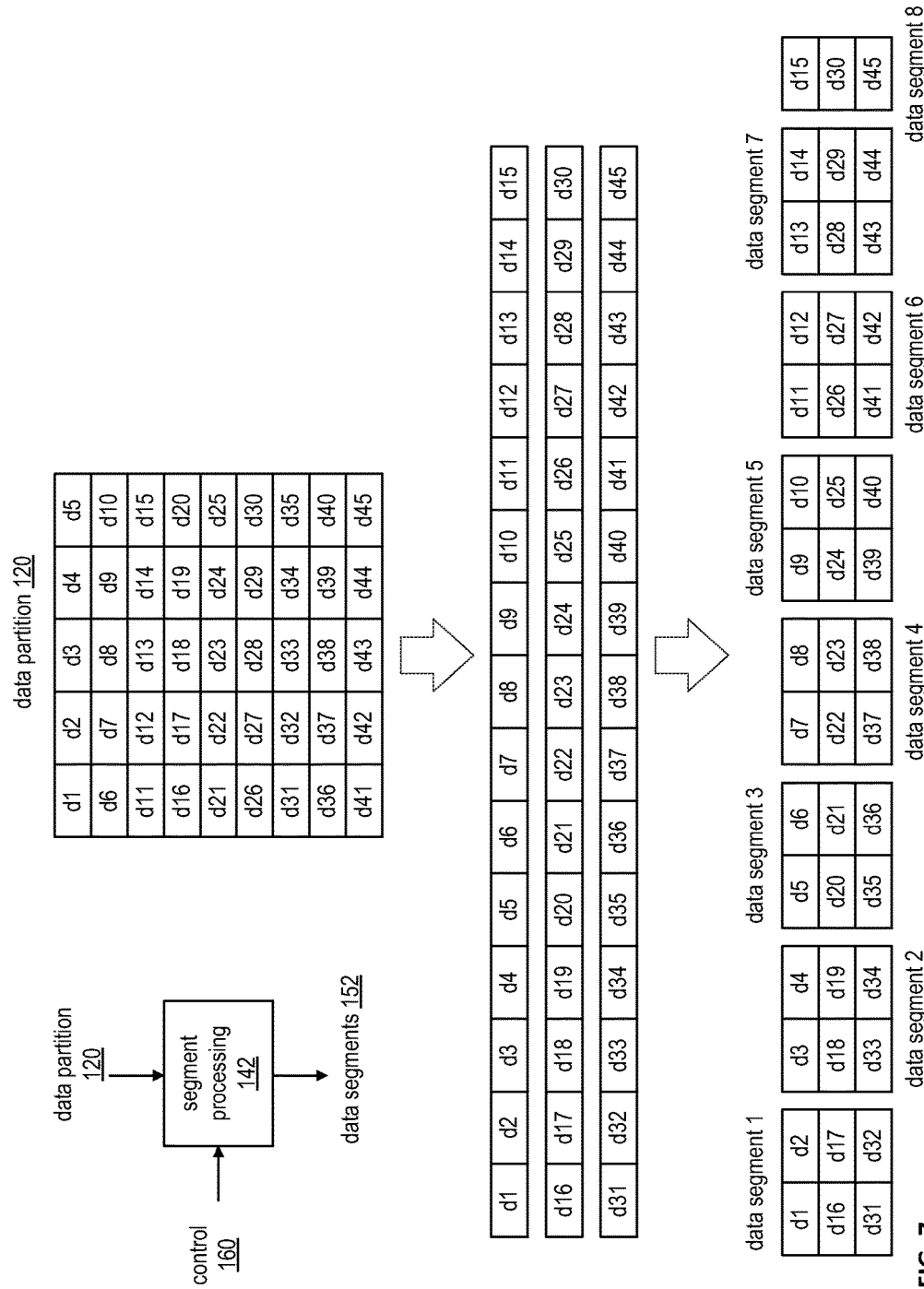
FIG. 7 is a diagram of an example of a segment processing of the dispersed error encoding in accordance with the present invention.

FIG. 7 is a diagram of an example of a segment processing of a dispersed storage (DS) error encoding module. In this example, a segment processing module 142 receives a data partition 120 that includes 45 data blocks (e.g., d1-d45), receives segmenting information (i.e., control information 160) from a control module, and segments the data partition 120 in accordance with the control information 160 to produce data segments 152. Each data block may be of the same size as other data blocks or of a different size. In addition, the size of each data block may be a few bytes to megabytes of data. As previously mentioned, the segmenting information indicates how many rows to segment the data partition into, indicates how many columns to segment the data partition into, and indicates how many columns to include in a data segment.

In this example, the decode threshold of the error encoding scheme is three; as such the number of rows to divide the data partition into is three. The number of columns for each row is set to 15, which is based on the number and size of data blocks. The data blocks of the data partition are arranged in rows and columns in a sequential order (i.e., the first row includes the first 15 data blocks; the second row includes the second 15 data blocks; and the third row includes the last 15 data blocks).

With the data blocks arranged into the desired sequential order, they are divided into data segments based on the segmenting information. In this example, the data partition is divided into 8 data segments; the first 7 include 2 columns of three rows and the last includes 1 column of three rows. Note that the first row of the 8 data segments is in sequential order of the first 15 data blocks; the second row of the 8 data segments in sequential order of the second 15 data blocks; and the third row of the 8 data segments in sequential order of the last 15 data blocks. Note that the number of data blocks, the grouping of the data blocks into segments, and size of the data blocks may vary to accommodate the desired distributed task processing function.

Figure 8:
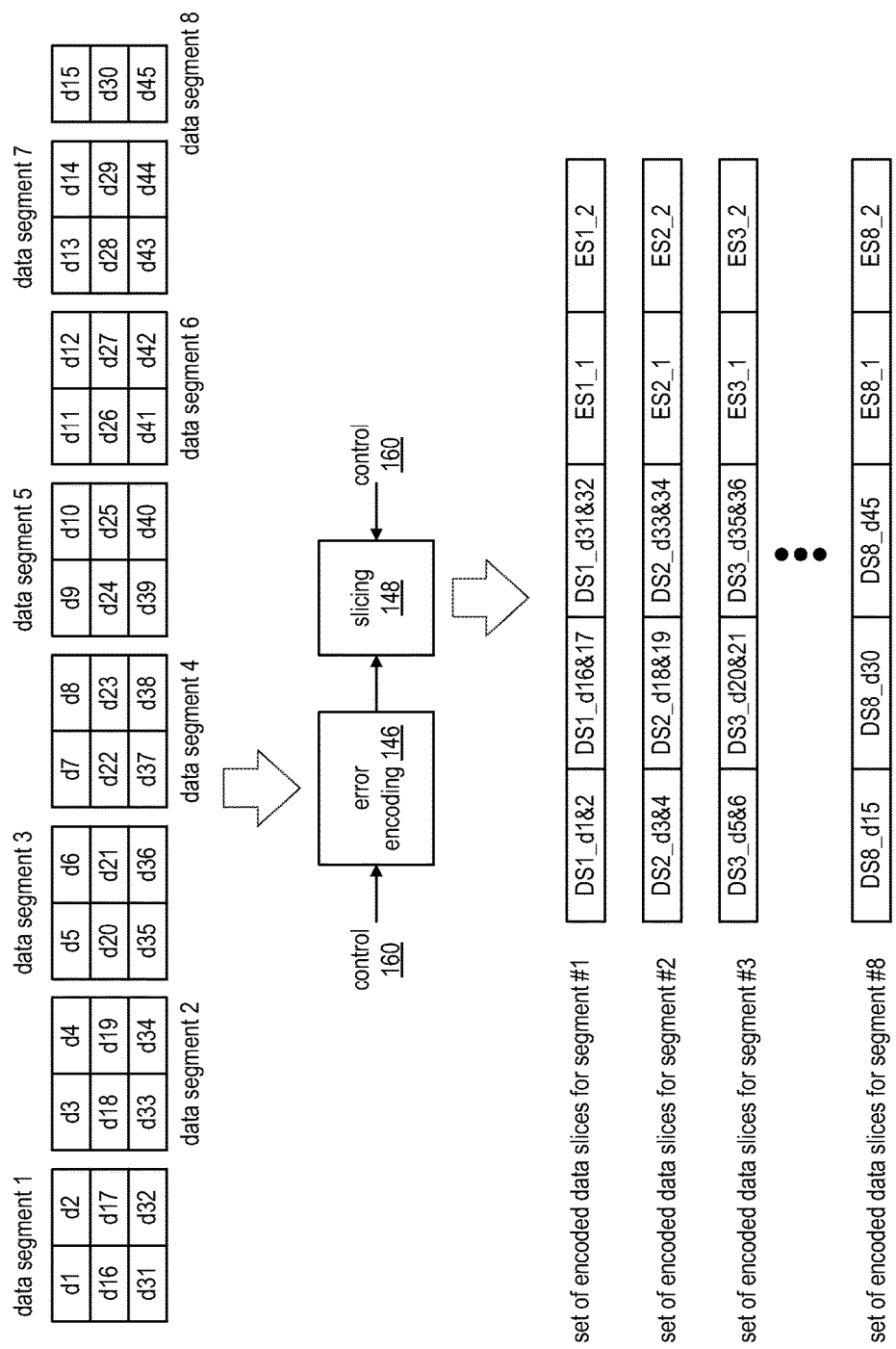
FIG. 8 is a diagram of an example of error encoding and slicing processing of the dispersed error encoding in accordance with the present invention.

FIG. 8 is a diagram of an example of error encoding and slicing processing of the dispersed error encoding processing the data segments of FIG. 7. In this example, data segment 1 includes 3 rows with each row being treated as one word for encoding. As such, data segment 1 includes three words for encoding: word 1 including data blocks d1 and d2, word 2 including data blocks d16 and d17, and word 3 including data blocks d31 and d32. Each of data segments 2-7 includes three words where each word includes two data blocks. Data segment 8 includes three words where each word includes a single data block (e.g., d15, d30, and d45).

In operation, an error encoding module 146 and a slicing module 148 convert each data segment into a set of encoded data slices in accordance with error correction encoding parameters as control information 160. More specifically, when the error correction encoding parameters indicate a unity matrix Reed-Solomon based encoding algorithm, 5 pillars, and decode threshold of 3, the first three encoded data slices of the set of encoded data slices for a data segment are substantially similar to the corresponding word of the data segment. For instance, when the unity matrix Reed-Solomon based encoding algorithm is applied to data segment 1, the content of the first encoded data slice (DS1_d1&2) of the first set of encoded data slices (e.g., corresponding to data segment 1) is substantially similar to content of the first word (e.g., d1 & d2); the content of the second encoded data slice (DS1_d16&17) of the first set of encoded data slices is substantially similar to content of the second word (e.g., d16 & d17); and the content of the third encoded data slice (DS1_d31&32) of the first set of encoded data slices is substantially similar to content of the third word (e.g., d31 & d32).

The content of the fourth and fifth encoded data slices (e.g., ES1_1 and ES1_2) of the first set of encoded data slices include error correction data based on the first-third words of the first data segment. With such an encoding and slicing scheme, retrieving any three of the five encoded data slices allows the data segment to be accurately reconstructed. The encoding and slices of data segments 2-7 yield sets of encoded data slices similar to the set of encoded data slices of data segment 1. For instance, the content of the first encoded data slice (DS2_d3&4) of the second set of encoded data slices (e.g., corresponding to data segment 2) is substantially similar to content of the first word (e.g., d3 & d4); the content of the second encoded data slice (DS2_d18&19) of the second set of encoded data slices is substantially similar to content of the second word (e.g., d18 & d19); and the content of the third encoded data slice (DS2_d33&34) of the second set of encoded data slices is substantially similar to content of the third word (e.g., d33 & d34). The content of the fourth and fifth encoded data slices (e.g., ES1_1 and ES1_2) of the second set of encoded data slices includes error correction data based on the first-third words of the second data segment.

Figure 9:
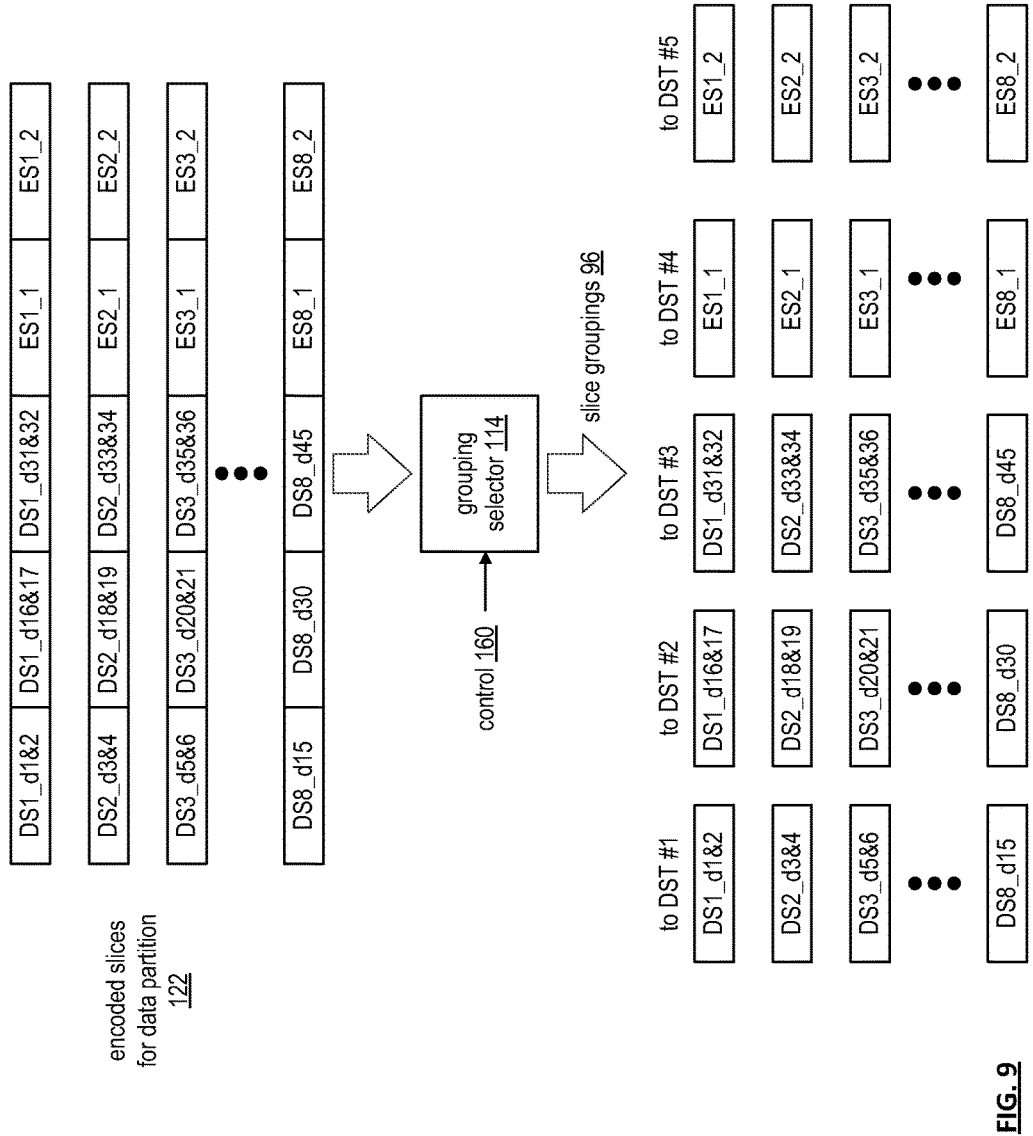
FIG. 9 is a diagram of an example of grouping selection processing of the outbound DST processing in accordance with the present invention.

FIG. 9 is a diagram of an example of grouping selection processing of an outbound distributed storage and task (DST) processing in accordance with group selection information as control information 160 from a control module. Encoded slices for data partition 122 are grouped in accordance with the control information 160 to produce slice groupings 96. In this example, a grouping selector module 114 organizes the encoded data slices into five slice groupings (e.g., one for each DST execution unit of a distributed storage and task network (DSTN) module). As a specific example, the grouping selector module 114 creates a first slice grouping for a DST execution unit #1, which includes first encoded slices of each of the sets of encoded slices. As such, the first DST execution unit receives encoded data slices corresponding to data blocks 1-15 (e.g., encoded data slices of contiguous data).

The grouping selector module 114 also creates a second slice grouping for a DST execution unit #2, which includes second encoded slices of each of the sets of encoded slices. As such, the second DST execution unit receives encoded data slices corresponding to data blocks 16-30. The grouping selector module 114 further creates a third slice grouping for DST execution unit #3, which includes third encoded slices of each of the sets of encoded slices. As such, the third DST execution unit receives encoded data slices corresponding to data blocks 31-45.

The grouping selector module 114 creates a fourth slice grouping for DST execution unit #4, which includes fourth encoded slices of each of the sets of encoded slices. As such, the fourth DST execution unit receives encoded data slices corresponding to first error encoding information (e.g., encoded data slices of error coding (EC) data). The grouping selector module 114 further creates a fifth slice grouping for DST execution unit #5, which includes fifth encoded slices of each of the sets of encoded slices. As such, the fifth DST execution unit receives encoded data slices corresponding to second error encoding information.

Figure 10:
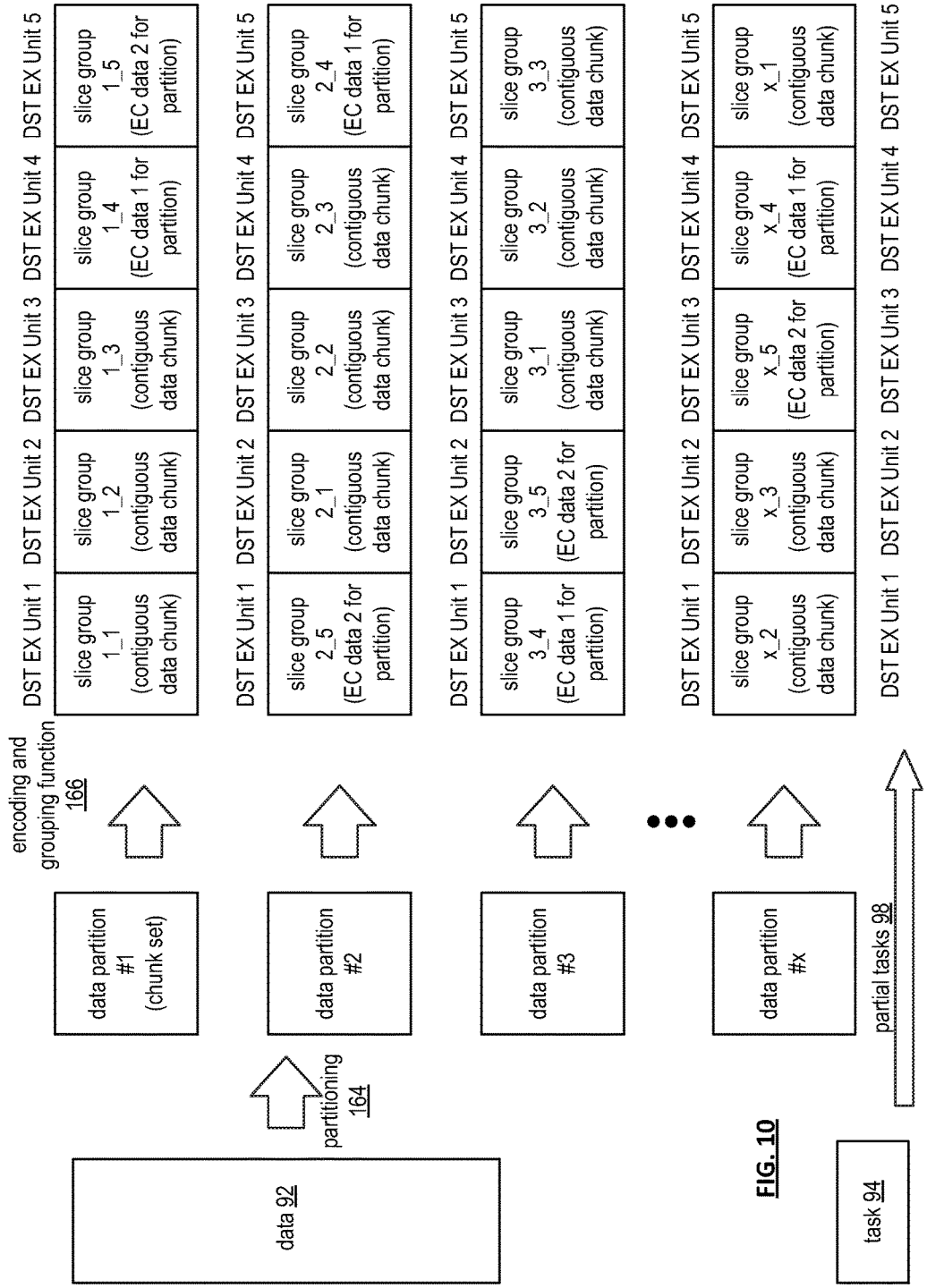
FIG. 10 is a diagram of an example of converting data into slice groups in accordance with the present invention.

FIG. 10 is a diagram of an example of converting data 92 into slice groups that expands on the preceding figures. As shown, the data 92 is partitioned in accordance with a partitioning function 164 into a plurality of data partitions (1-x, where x is an integer greater than 4). Each data partition (or chunkset of data) is encoded and grouped into slice groupings as previously discussed by an encoding and grouping function 166. For a given data partition, the slice groupings are sent to distributed storage and task (DST) execution units. From data partition to data partition, the ordering of the slice groupings to the DST execution units may vary.

For example, the slice groupings of data partition #1 is sent to the DST execution units such that the first DST execution receives first encoded data slices of each of the sets of encoded data slices, which corresponds to a first continuous data chunk of the first data partition (e.g., refer to FIG. 9), a second DST execution receives second encoded data slices of each of the sets of encoded data slices, which corresponds to a second continuous data chunk of the first data partition, etc.

For the second data partition, the slice groupings may be sent to the DST execution units in a different order than it was done for the first data partition. For instance, the first slice grouping of the second data partition (e.g., slice group 2_1) is sent to the second DST execution unit; the second slice grouping of the second data partition (e.g., slice group 2_2) is sent to the third DST execution unit; the third slice grouping of the second data partition (e.g., slice group 2_3) is sent to the fourth DST execution unit; the fourth slice grouping of the second data partition (e.g., slice group 2_4, which includes first error coding information) is sent to the fifth DST execution unit; and the fifth slice grouping of the second data partition (e.g., slice group 2_5, which includes second error coding information) is sent to the first DST execution unit.

The pattern of sending the slice groupings to the set of DST execution units may vary in a predicted pattern, a random pattern, and/or a combination thereof from data partition to data partition. In addition, from data partition to data partition, the set of DST execution units may change. For example, for the first data partition, DST execution units 1-5 may be used; for the second data partition, DST execution units 6-10 may be used; for the third data partition, DST execution units 3-7 may be used; etc. As is also shown, the task is divided into partial tasks that are sent to the DST execution units in conjunction with the slice groupings of the data partitions.

Figure 11:
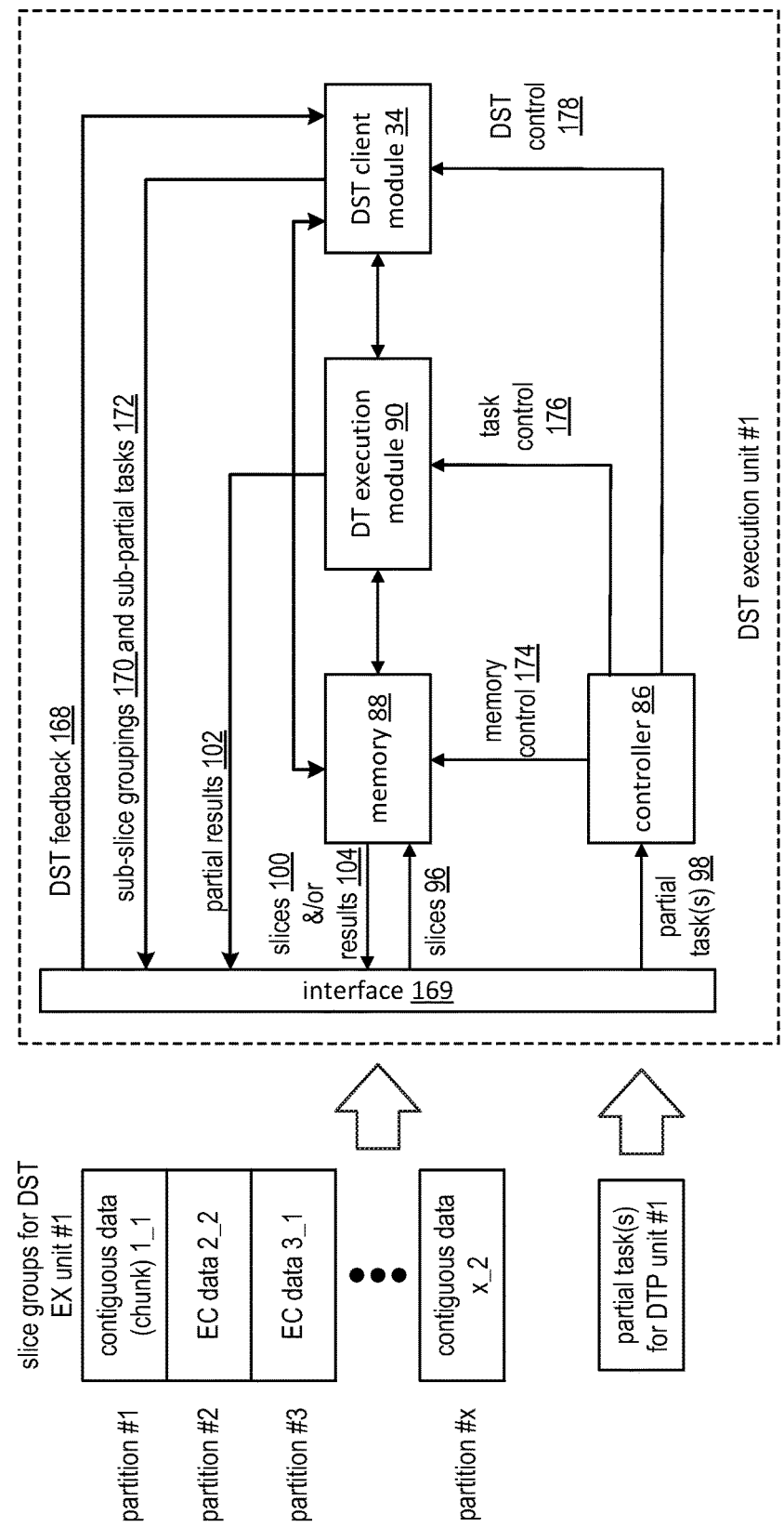
FIG. 11 is a schematic block diagram of an embodiment of a DST execution unit in accordance with the present invention.

FIG. 11 is a schematic block diagram of an embodiment of a DST (distributed storage and/or task) execution unit that includes an interface 169, a controller 86, memory 88, one or more DT (distributed task) execution modules 90, and a DST client module 34. The memory 88 is of sufficient size to store a significant number of encoded data slices (e.g., thousands of slices to hundreds-of-millions of slices) and may include one or more hard drives and/or one or more solid-state memory devices (e.g., flash memory, DRAM, etc.).

In an example of storing a slice group, the DST execution module receives a slice grouping 96 (e.g., slice group #1) via interface 169. The slice grouping 96 includes, per partition, encoded data slices of contiguous data or encoded data slices of error coding (EC) data. For slice group #1, the DST execution module receives encoded data slices of contiguous data for partitions #1 and #x (and potentially others between 3 and x) and receives encoded data slices of EC data for partitions #2 and #3 (and potentially others between 3 and x). Examples of encoded data slices of contiguous data and encoded data slices of error coding (EC) data are discussed with reference to FIG. 9. The memory 88 stores the encoded data slices of slice groupings 96 in accordance with memory control information 174 it receives from the controller 86.

The controller 86 (e.g., a processing module, a CPU, etc.) generates the memory control information 174 based on a partial task(s) 98 and distributed computing information (e.g., user information (e.g., user ID, distributed computing permissions, data access permission, etc.), vault information (e.g., virtual memory assigned to user, user group, temporary storage for task processing, etc.), task validation information, etc.). For example, the controller 86 interprets the partial task(s) 98 in light of the distributed computing information to determine whether a requestor is authorized to perform the task 98, is authorized to access the data, and/or is authorized to perform the task on this particular data. When the requestor is authorized, the controller 86 determines, based on the task 98 and/or another input, whether the encoded data slices of the slice grouping 96 are to be temporarily stored or permanently stored. Based on the foregoing, the controller 86 generates the memory control information 174 to write the encoded data slices of the slice grouping 96 into the memory 88 and to indicate whether the slice grouping 96 is permanently stored or temporarily stored.

With the slice grouping 96 stored in the memory 88, the controller 86 facilitates execution of the partial task(s) 98. In an example, the controller 86 interprets the partial task 98 in light of the capabilities of the DT execution module(s) 90. The capabilities include one or more of MIPS capabilities, processing resources (e.g., quantity and capability of microprocessors, CPUs, digital signal processors, co-processor, microcontrollers, arithmetic logic circuitry, and/or and the other analog and/or digital processing circuitry), availability of the processing resources, etc. If the controller 86 determines that the DT execution module(s) 90 have sufficient capabilities, it generates task control information 176.

The task control information 176 may be a generic instruction (e.g., perform the task on the stored slice grouping) or a series of operational codes. In the former instance, the DT execution module 90 includes a co-processor function specifically configured (fixed or programmed) to perform the desired task 98. In the latter instance, the DT execution module 90 includes a general processor topology where the controller stores an algorithm corresponding to the particular task 98. In this instance, the controller 86 provides the operational codes (e.g., assembly language, source code of a programming language, object code, etc.) of the algorithm to the DT execution module 90 for execution.

Depending on the nature of the task 98, the DT execution module 90 may generate intermediate partial results 102 that are stored in the memory 88 or in a cache memory (not shown) within the DT execution module 90. In either case, when the DT execution module 90 completes execution of the partial task 98, it outputs one or more partial results 102. The partial results 102 may also be stored in memory 88.

If, when the controller 86 is interpreting whether capabilities of the DT execution module(s) 90 can support the partial task 98, the controller 86 determines that the DT execution module(s) 90 cannot adequately support the task 98 (e.g., does not have the right resources, does not have sufficient available resources, available resources would be too slow, etc.), it then determines whether the partial task 98 should be fully offloaded or partially offloaded.

If the controller 86 determines that the partial task 98 should be fully offloaded, it generates DST control information 178 and provides it to the DST client module 34. The DST control information 178 includes the partial task 98, memory storage information regarding the slice grouping 96, and distribution instructions. The distribution instructions instruct the DST client module 34 to divide the partial task 98 into sub-partial tasks 172, to divide the slice grouping 96 into sub-slice groupings 170, and identify other DST execution units. The DST client module 34 functions in a similar manner as the DST client module 34 of FIGS. 3-10 to produce the sub-partial tasks 172 and the sub-slice groupings 170 in accordance with the distribution instructions.

The DST client module 34 receives DST feedback 168 (e.g., sub-partial results), via the interface 169, from the DST execution units to which the task was offloaded. The DST client module 34 provides the sub-partial results to the DST execution unit, which processes the sub-partial results to produce the partial result(s) 102.

If the controller 86 determines that the partial task 98 should be partially offloaded, it determines what portion of the task 98 and/or slice grouping 96 should be processed locally and what should be offloaded. For the portion that is being locally processed, the controller 86 generates task control information 176 as previously discussed. For the portion that is being offloaded, the controller 86 generates DST control information 178 as previously discussed.

When the DST client module 34 receives DST feedback 168 (e.g., sub-partial results) from the DST executions units to which a portion of the task was offloaded, it provides the sub-partial results to the DT execution module 90. The DT execution module 90 processes the sub-partial results with the sub-partial results it created to produce the partial result(s) 102.

The memory 88 may be further utilized to retrieve one or more of stored slices 100, stored results 104, partial results 102 when the DT execution module 90 stores partial results 102 and/or results 104 in the memory 88. For example, when the partial task 98 includes a retrieval request, the controller 86 outputs the memory control 174 to the memory 88 to facilitate retrieval of slices 100 and/or results 104.

Figure 12:
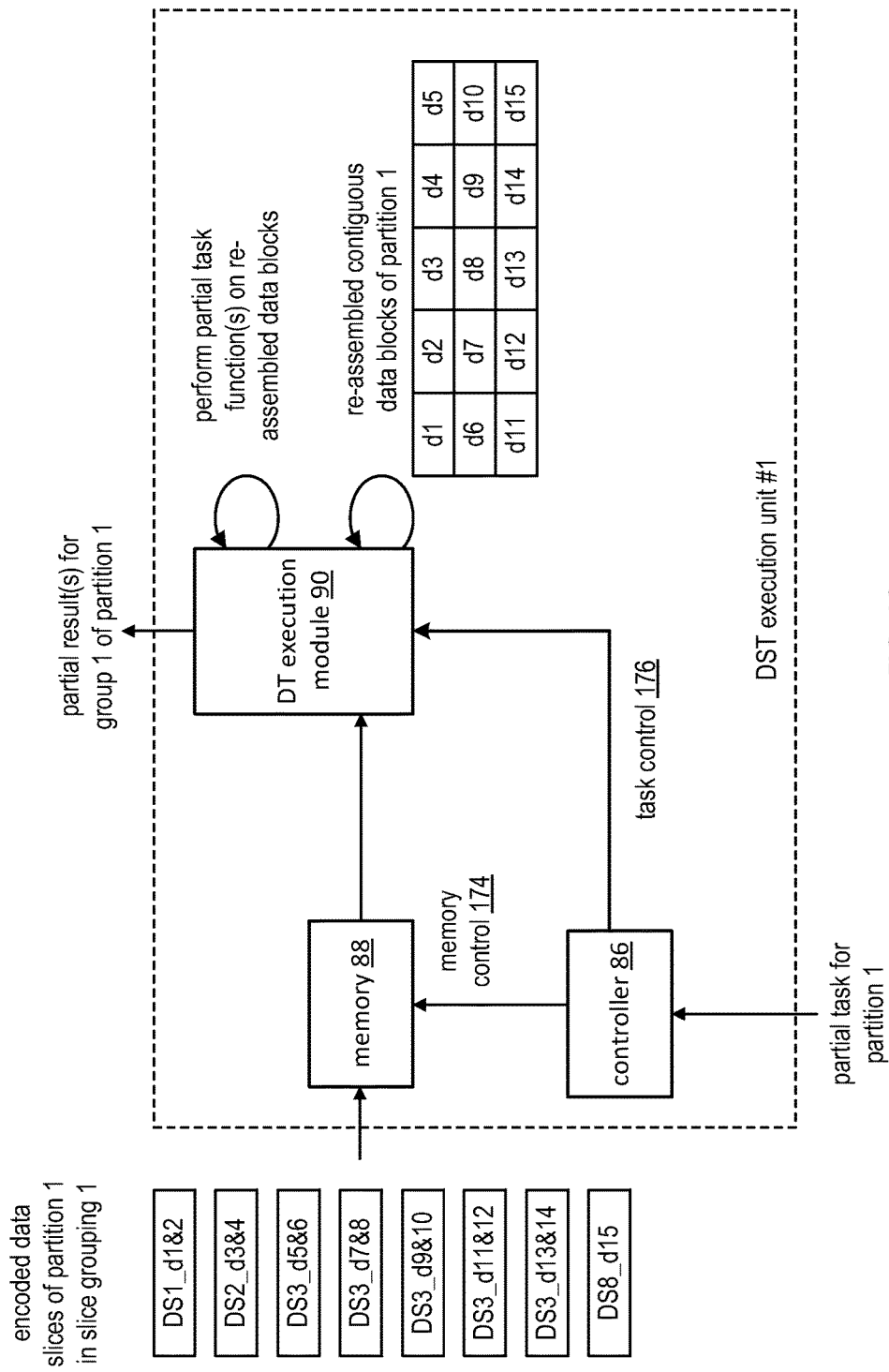
FIG. 12 is a schematic block diagram of an example of operation of a DST execution unit in accordance with the present invention.

FIG. 12 is a schematic block diagram of an example of operation of a distributed storage and task (DST) execution unit storing encoded data slices and executing a task thereon. To store the encoded data slices of a partition 1 of slice grouping 1, a controller 86 generates write commands as memory control information 174 such that the encoded slices are stored in desired locations (e.g., permanent or temporary) within memory 88.

Once the encoded slices are stored, the controller 86 provides task control information 176 to a distributed task (DT) execution module 90. As a first step of executing the task in accordance with the task control information 176, the DT execution module 90 retrieves the encoded slices from memory 88. The DT execution module 90 then reconstructs contiguous data blocks of a data partition. As shown for this example, reconstructed contiguous data blocks of data partition 1 include data blocks 1-15 (e.g., d1-d15).

With the contiguous data blocks reconstructed, the DT execution module 90 performs the task on the reconstructed contiguous data blocks. For example, the task may be to search the reconstructed contiguous data blocks for a particular word or phrase, identify where in the reconstructed contiguous data blocks the particular word or phrase occurred, and/or count the occurrences of the particular word or phrase on the reconstructed contiguous data blocks. The DST execution unit continues in a similar manner for the encoded data slices of other partitions in slice grouping 1. Note that with using the unity matrix error encoding scheme previously discussed, if the encoded data slices of contiguous data are uncorrupted, the decoding of them is a relatively straightforward process of extracting the data.

If, however, an encoded data slice of contiguous data is corrupted (or missing), it can be rebuilt by accessing other DST execution units that are storing the other encoded data slices of the set of encoded data slices of the corrupted encoded data slice. In this instance, the DST execution unit having the corrupted encoded data slices retrieves at least three encoded data slices (of contiguous data and of error coding data) in the set from the other DST execution units (recall for this example, the pillar width is 5 and the decode threshold is 3). The DST execution unit decodes the retrieved data slices using the DS error encoding parameters to recapture the corresponding data segment. The DST execution unit then re-encodes the data segment using the DS error encoding parameters to rebuild the corrupted encoded data slice. Once the encoded data slice is rebuilt, the DST execution unit functions as previously described.

Figure 13:
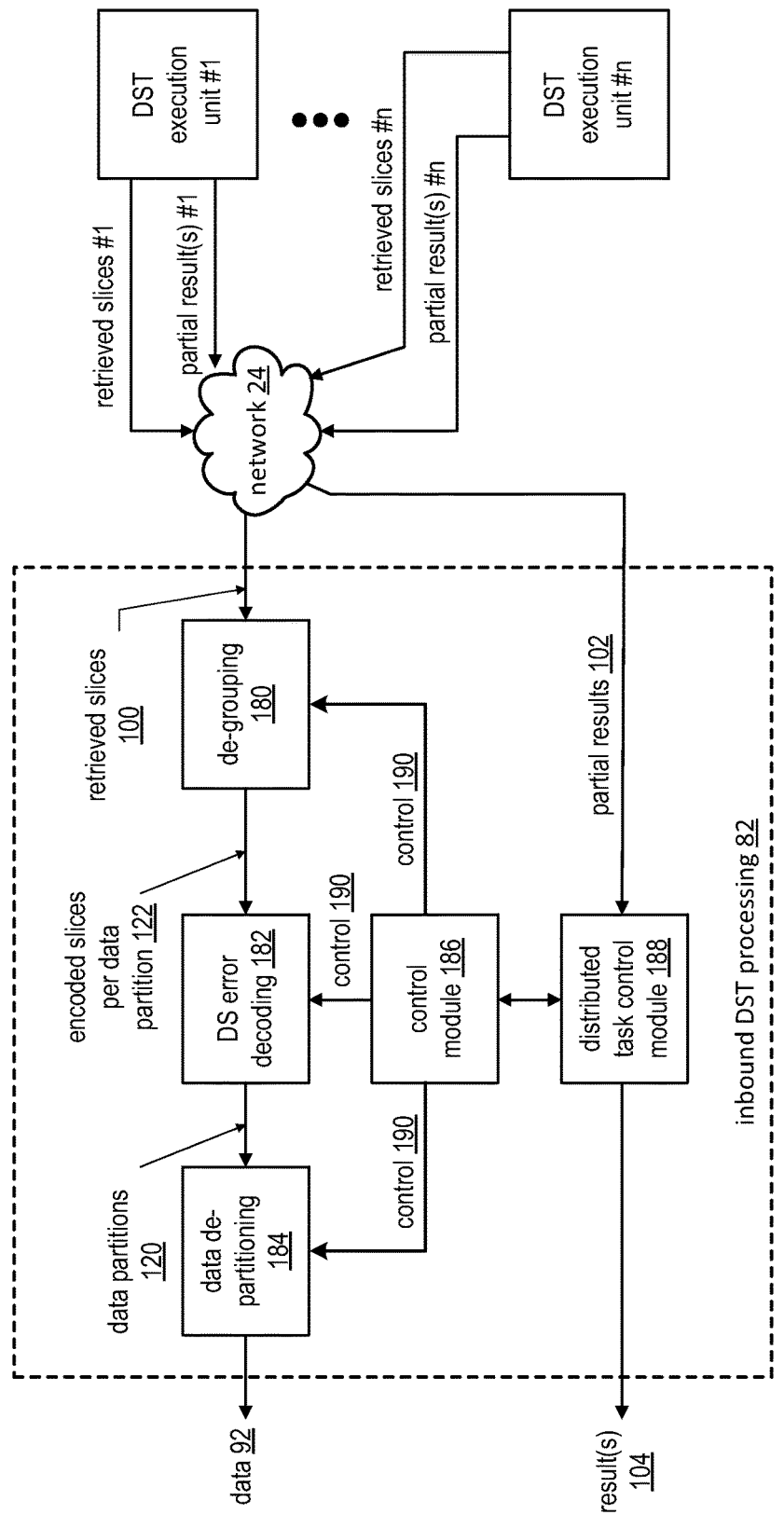
FIG. 13 is a schematic block diagram of an embodiment of an inbound distributed storage and/or task (DST) processing in accordance with the present invention.

FIG. 13 is a schematic block diagram of an embodiment of an inbound distributed storage and/or task (DST) processing section 82 of a DST client module coupled to DST execution units of a distributed storage and task network (DSTN) module via a network 24. The inbound DST processing section 82 includes a de-grouping module 180, a DS (dispersed storage) error decoding module 182, a data de-partitioning module 184, a control module 186, and a distributed task control module 188. Note that the control module 186 and/or the distributed task control module 188 may be separate modules from corresponding ones of outbound DST processing section or may be the same modules.

In an example of operation, the DST execution units have completed execution of corresponding partial tasks on the corresponding slice groupings to produce partial results 102. The inbound DST processing section 82 receives the partial results 102 via the distributed task control module 188. The inbound DST processing section 82 then processes the partial results 102 to produce a final result, or results 104. For example, if the task was to find a specific word or phrase within data, the partial results 102 indicate where in each of the prescribed portions of the data the corresponding DST execution units found the specific word or phrase. The distributed task control module 188 combines the individual partial results 102 for the corresponding portions of the data into a final result 104 for the data as a whole.

In another example of operation, the inbound DST processing section 82 is retrieving stored data from the DST execution units (i.e., the DSTN module). In this example, the DST execution units output encoded data slices 100 corresponding to the data retrieval requests. The de-grouping module 180 receives retrieved slices 100 and de-groups them to produce encoded data slices per data partition 122. The DS error decoding module 182 decodes, in accordance with DS error encoding parameters, the encoded data slices per data partition 122 to produce data partitions 120.

The data de-partitioning module 184 combines the data partitions 120 into the data 92. The control module 186 controls the conversion of retrieved slices 100 into the data 92 using control signals 190 to each of the modules. For instance, the control module 186 provides de-grouping information to the de-grouping module 180, provides the DS error encoding parameters to the DS error decoding module 182, and provides de-partitioning information to the data de-partitioning module 184.

Figure 14:
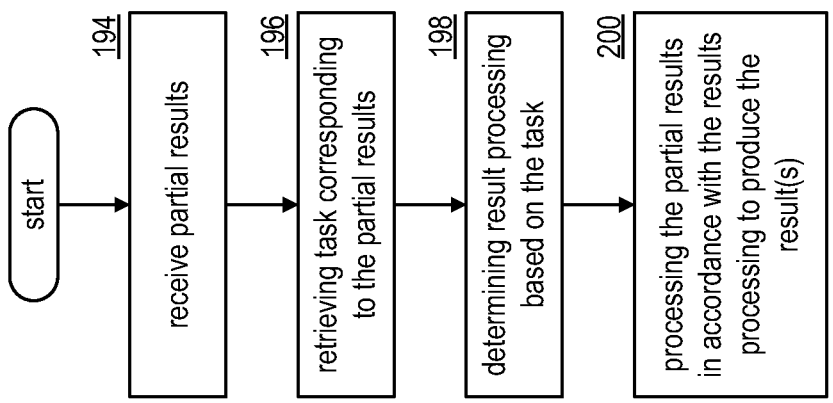
FIG. 14 is a logic diagram of an example of a method for inbound DST processing in accordance with the present invention.

FIG. 14 is a logic diagram of an example of a method that is executable by distributed storage and task (DST) client module regarding inbound DST processing. The method begins at step 194 where the DST client module receives partial results. The method continues at step 196 where the DST client module retrieves the task corresponding to the partial results. For example, the partial results include header information that identifies the requesting entity, which correlates to the requested task.

The method continues at step 198 where the DST client module determines result processing information based on the task. For example, if the task were to identify a particular word or phrase within the data, the result processing information would indicate to aggregate the partial results for the corresponding portions of the data to produce the final result. As another example, if the task were to count the occurrences of a particular word or phrase within the data, results of processing the information would indicate to add the partial results to produce the final results. The method continues at step 200 where the DST client module processes the partial results in accordance with the result processing information to produce the final result or results.

Figure 15:
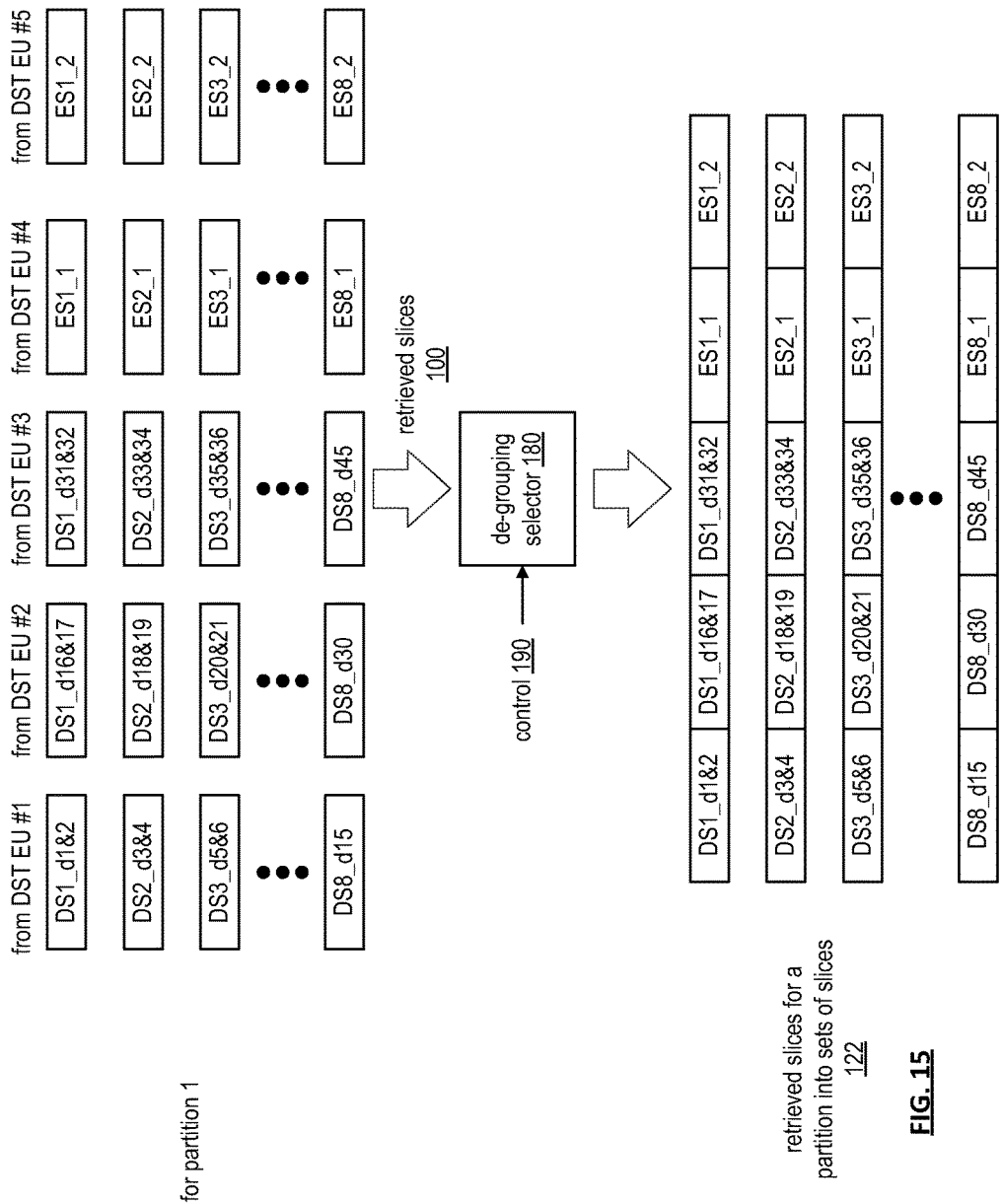
FIG. 15 is a diagram of an example of de-grouping selection processing of the inbound DST processing in accordance with the present invention.

FIG. 15 is a diagram of an example of de-grouping selection processing of an inbound distributed storage and task (DST) processing section of a DST client module. In general, this is an inverse process of the grouping module of the outbound DST processing section of FIG. 9. Accordingly, for each data partition (e.g., partition #1), the de-grouping module retrieves the corresponding slice grouping from the DST execution units (EU) (e.g., DST 1-5).

As shown, DST execution unit #1 provides a first slice grouping, which includes the first encoded slices of each of the sets of encoded slices (e.g., encoded data slices of contiguous data of data blocks 1-15); DST execution unit #2 provides a second slice grouping, which includes the second encoded slices of each of the sets of encoded slices (e.g., encoded data slices of contiguous data of data blocks 16-30); DST execution unit #3 provides a third slice grouping, which includes the third encoded slices of each of the sets of encoded slices (e.g., encoded data slices of contiguous data of data blocks 31-45); DST execution unit #4 provides a fourth slice grouping, which includes the fourth encoded slices of each of the sets of encoded slices (e.g., first encoded data slices of error coding (EC) data); and DST execution unit #5 provides a fifth slice grouping, which includes the fifth encoded slices of each of the sets of encoded slices (e.g., first encoded data slices of error coding (EC) data).

The de-grouping module de-groups the slice groupings (e.g., received slices 100) using a de-grouping selector 180 controlled by a control signal 190 as shown in the example to produce a plurality of sets of encoded data slices (e.g., retrieved slices for a partition into sets of slices 122). Each set corresponding to a data segment of the data partition.

Figure 16:
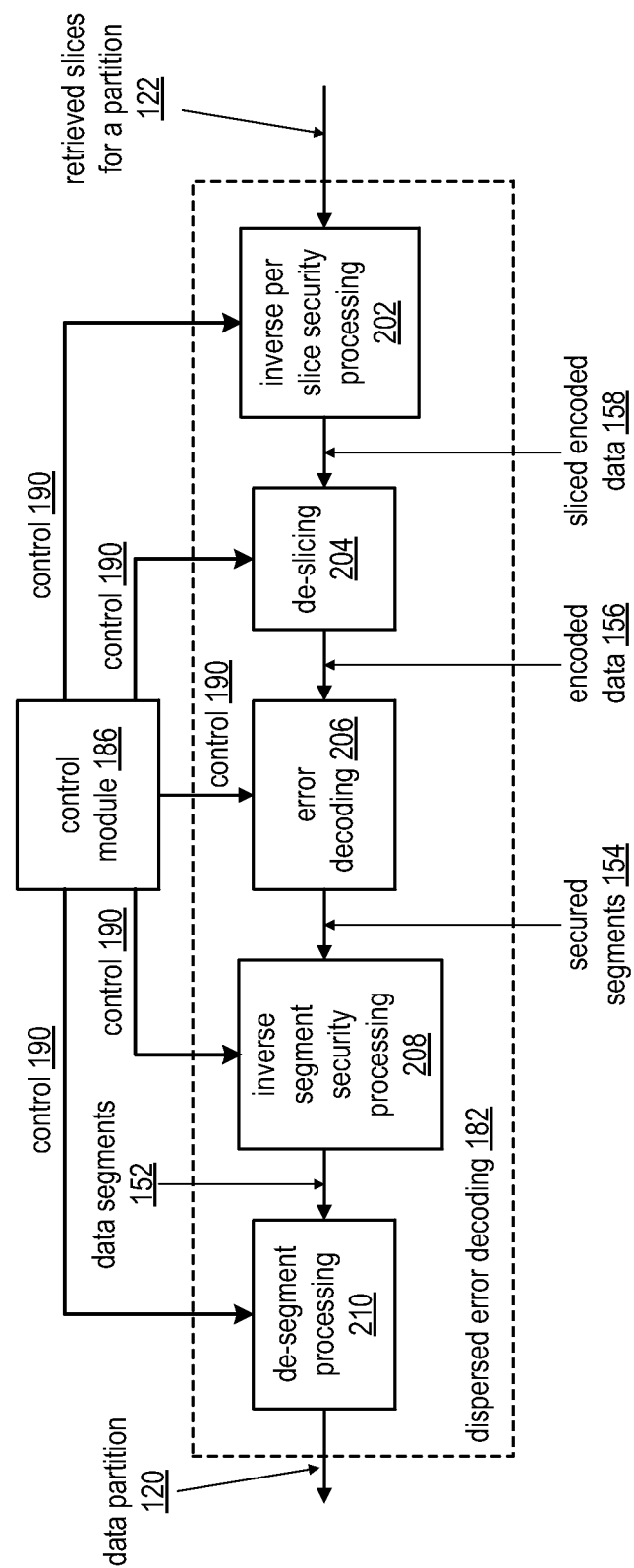
FIG. 16 is a schematic block diagram of an embodiment of a dispersed error decoding in accordance with the present invention.

FIG. 16 is a schematic block diagram of an embodiment of a dispersed storage (DS) error decoding module 182 of an inbound distributed storage and task (DST) processing section. The DS error decoding module 182 includes an inverse per slice security processing module 202, a de-slicing module 204, an error decoding module 206, an inverse segment security module 208, a de-segmenting processing module 210, and a control module 186.

In an example of operation, the inverse per slice security processing module 202, when enabled by the control module 186, unsecures each encoded data slice 122 based on slice de-security information received as control information 190 (e.g., the compliment of the slice security information discussed with reference to FIG. 6) received from the control module 186. The slice security information includes data decompression, decryption, de-watermarking, integrity check (e.g., CRC verification, etc.), and/or any other type of digital security. For example, when the inverse per slice security processing module 202 is enabled, it verifies integrity information (e.g., a CRC value) of each encoded data slice 122, it decrypts each verified encoded data slice, and decompresses each decrypted encoded data slice to produce slice encoded data 158. When the inverse per slice security processing module 202 is not enabled, it passes the encoded data slices 122 as the sliced encoded data 158 or is bypassed such that the retrieved encoded data slices 122 are provided as the sliced encoded data 158.

The de-slicing module 204 de-slices the sliced encoded data 158 into encoded data segments 156 in accordance with a pillar width of the error correction encoding parameters received as control information 190 from the control module 186. For example, if the pillar width is five, the de-slicing module 204 de-slices a set of five encoded data slices into an encoded data segment 156. The error decoding module 206 decodes the encoded data segments 156 in accordance with error correction decoding parameters received as control information 190 from the control module 186 to produce secure data segments 154. The error correction decoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction decoding parameters identify a specific error correction encoding scheme, specify a pillar width of five, and specify a decode threshold of three.

The inverse segment security processing module 208, when enabled by the control module 186, unsecures the secured data segments 154 based on segment security information received as control information 190 from the control module 186. The segment security information includes data decompression, decryption, de-watermarking, integrity check (e.g., CRC, etc.) verification, and/or any other type of digital security. For example, when the inverse segment security processing module 208 is enabled, it verifies integrity information (e.g., a CRC value) of each secure data segment 154, it decrypts each verified secured data segment, and decompresses each decrypted secure data segment to produce a data segment 152. When the inverse segment security processing module 208 is not enabled, it passes the decoded data segment 154 as the data segment 152 or is bypassed.

The de-segment processing module 210 receives the data segments 152 and receives de-segmenting information as control information 190 from the control module 186. The de-segmenting information indicates how the de-segment processing module 210 is to de-segment the data segments 152 into a data partition 120. For example, the de-segmenting information indicates how the rows and columns of data segments are to be rearranged to yield the data partition 120.

Figure 17:
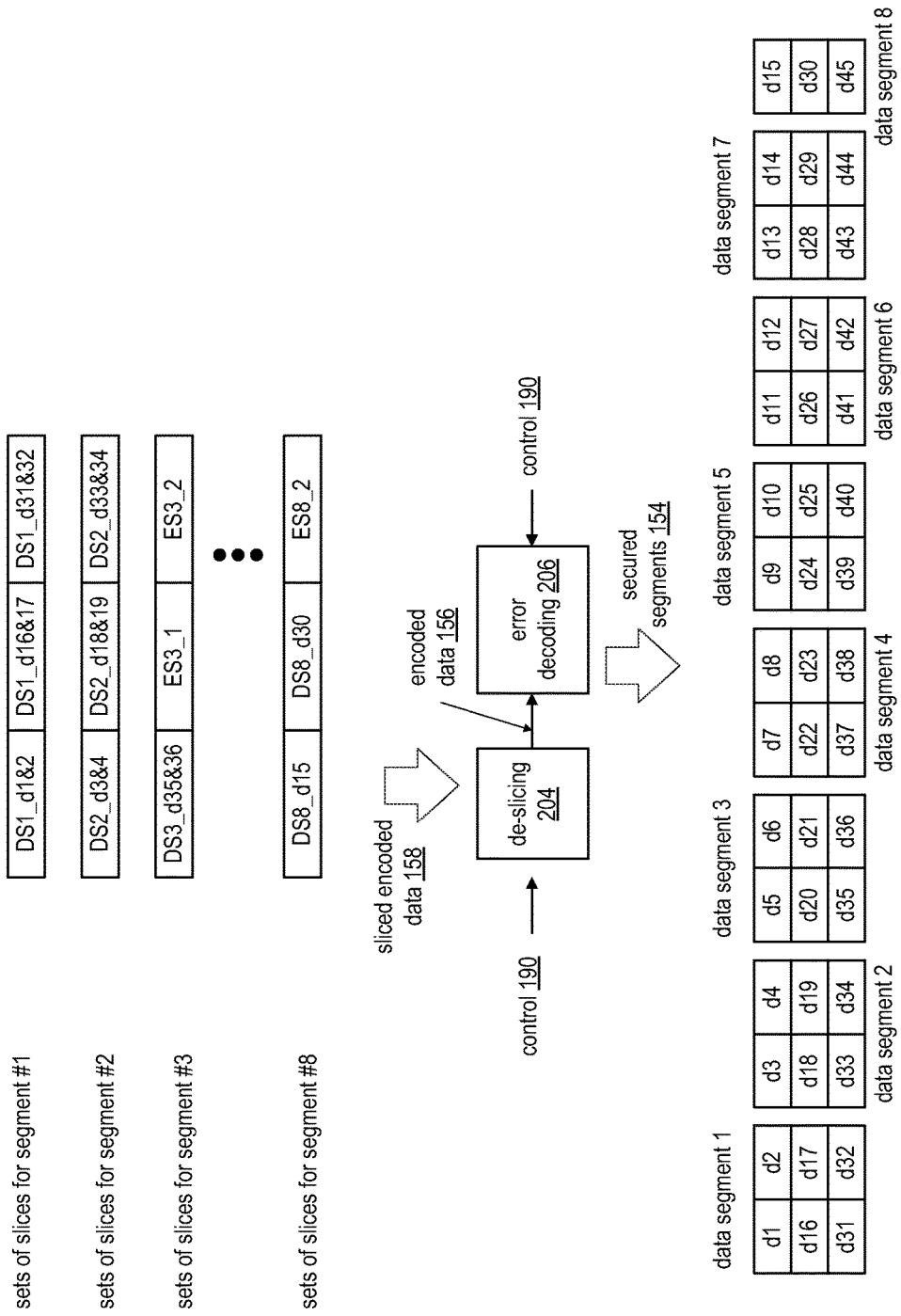
FIG. 17 is a diagram of an example of de-slicing and error decoding processing of the dispersed error decoding in accordance with the present invention.

FIG. 17 is a diagram of an example of de-slicing and error decoding processing of a dispersed error decoding module. A de-slicing module 204 receives at least a decode threshold number of encoded data slices 158 for each data segment in accordance with control information 190 and provides encoded data 156. In this example, a decode threshold is three. As such, each set of encoded data slices 158 is shown to have three encoded data slices per data segment. The de-slicing module 204 may receive three encoded data slices per data segment because an associated distributed storage and task (DST) client module requested retrieving only three encoded data slices per segment or selected three of the retrieved encoded data slices per data segment. As shown, which is based on the unity matrix encoding previously discussed with reference to FIG. 8, an encoded data slice may be a data-based encoded data slice (e.g., DS1_d1&d2) or an error code based encoded data slice (e.g., ES3_1).

An error decoding module 206 decodes the encoded data 156 of each data segment in accordance with the error correction decoding parameters of control information 190 to produce secured segments 154. In this example, data segment 1 includes 3 rows with each row being treated as one word for encoding. As such, data segment 1 includes three words: word 1 including data blocks d1 and d2, word 2 including data blocks d16 and d17, and word 3 including data blocks d31 and d32. Each of data segments 2-7 includes three words where each word includes two data blocks. Data segment 8 includes three words where each word includes a single data block (e.g., d15, d30, and d45).

Figure 18:
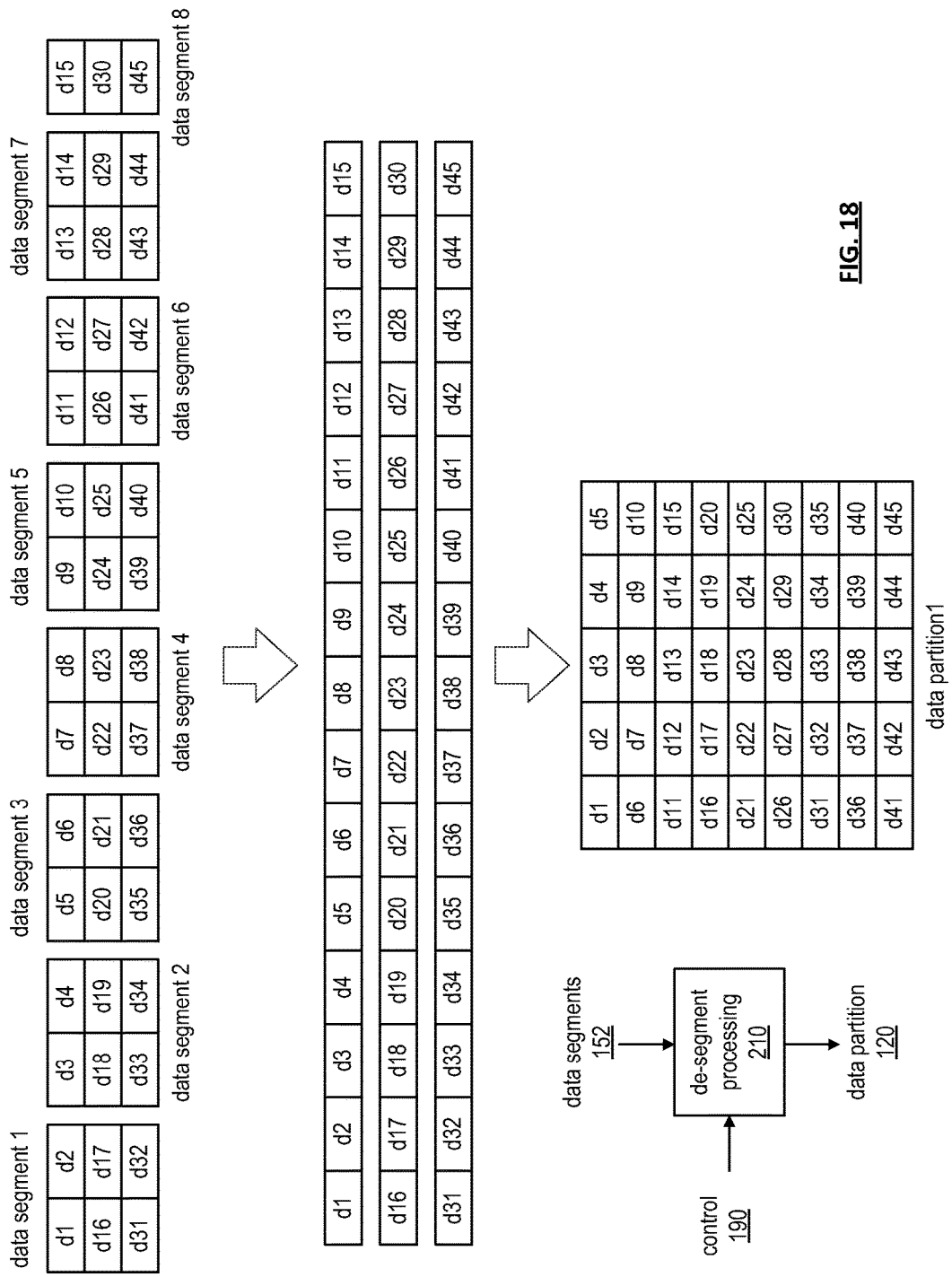
FIG. 18 is a diagram of an example of a de-segment processing of the dispersed error decoding in accordance with the present invention.

FIG. 18 is a diagram of an example of a de-segment processing of an inbound distributed storage and task (DST) processing. In this example, a de-segment processing module 210 receives data segments 152 (e.g., 1-8) and rearranges the data blocks of the data segments into rows and columns in accordance with de-segmenting information of control information 190 to produce a data partition 120. Note that the number of rows is based on the decode threshold (e.g., 3 in this specific example) and the number of columns is based on the number and size of the data blocks.

The de-segmenting module 210 converts the rows and columns of data blocks into the data partition 120. Note that each data block may be of the same size as other data blocks or of a different size. In addition, the size of each data block may be a few bytes to megabytes of data.

Figure 19:
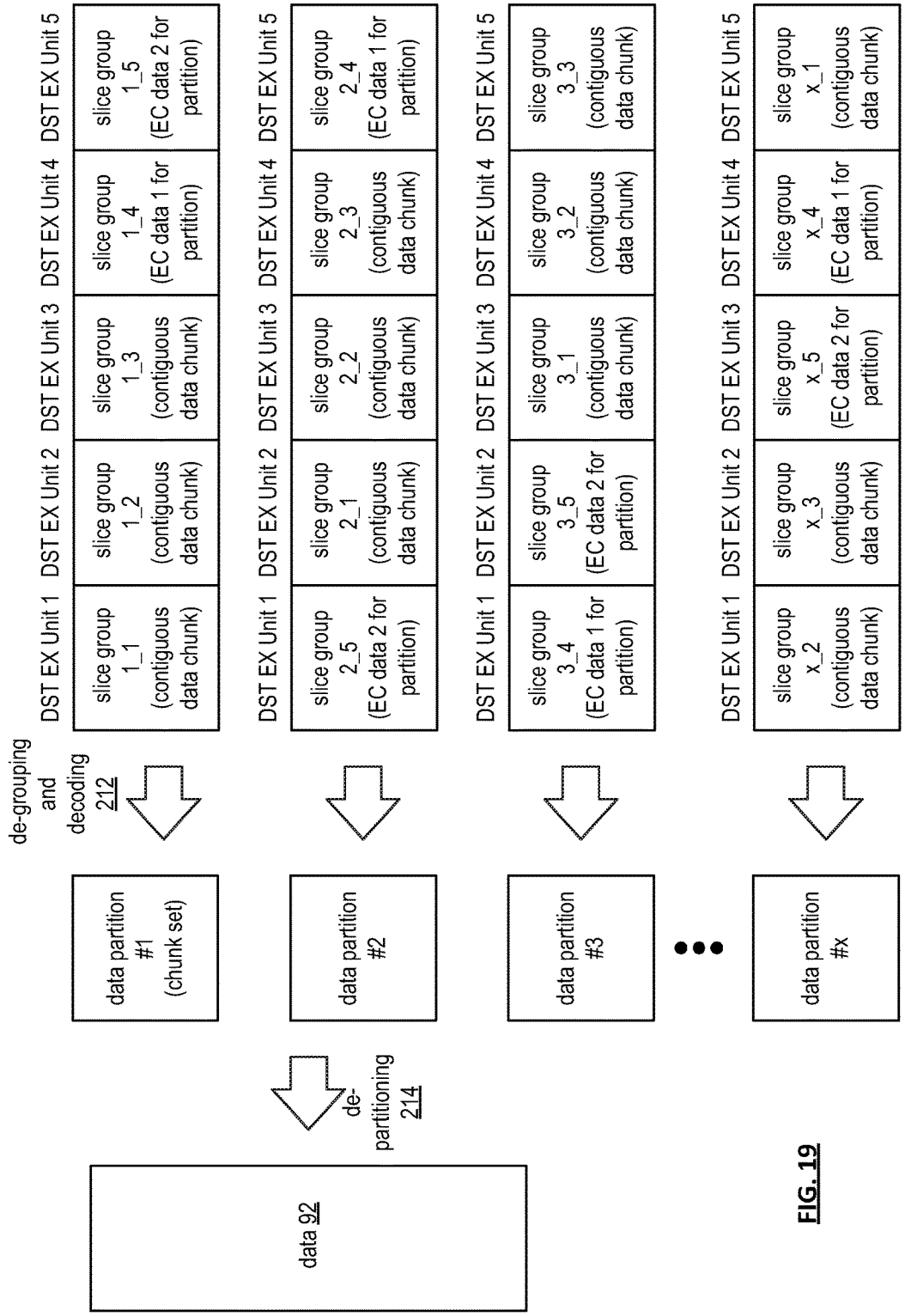
FIG. 19 is a diagram of an example of converting slice groups into data in accordance with the present invention.

FIG. 19 is a diagram of an example of converting slice groups into data 92 within an inbound distributed storage and task (DST) processing section. As shown, the data 92 is reconstructed from a plurality of data partitions (1-x, where x is an integer greater than 4). Each data partition (or chunk set of data) is decoded and re-grouped using a de-grouping and decoding function 212 and a de-partition function 214 from slice groupings as previously discussed. For a given data partition, the slice groupings (e.g., at least a decode threshold per data segment of encoded data slices) are received from DST execution units. From data partition to data partition, the ordering of the slice groupings received from the DST execution units may vary as discussed with reference to FIG. 10.

Figure 20:
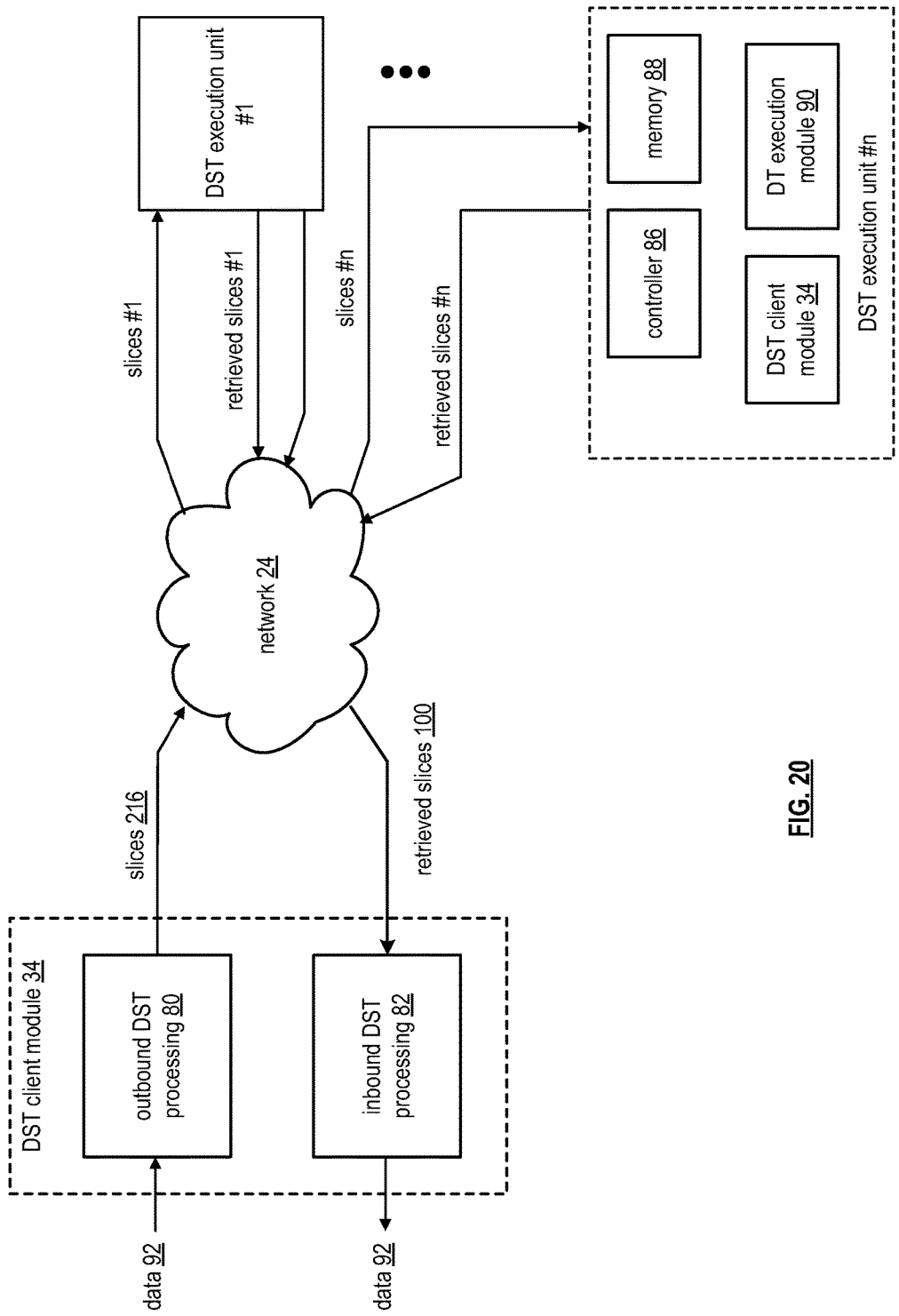
FIG. 20 is a diagram of an example of a distributed storage within the distributed computing system in accordance with the present invention.

FIG. 20 is a diagram of an example of a distributed storage and/or retrieval within the distributed computing system. The distributed computing system includes a plurality of distributed storage and/or task (DST) processing client modules 34 (one shown) coupled to a distributed storage and/or task processing network (DSTN) module, or multiple DSTN modules, via a network 24. The DST client module 34 includes an outbound DST processing section 80 and an inbound DST processing section 82. The DSTN module includes a plurality of DST execution units. Each DST execution unit includes a controller 86, memory 88, one or more distributed task (DT) execution modules 90, and a DST client module 34.

In an example of data storage, the DST client module 34 has data 92 that it desires to store in the DSTN module. The data 92 may be a file (e.g., video, audio, text, graphics, etc.), a data object, a data block, an update to a file, an update to a data block, etc. In this instance, the outbound DST processing module 80 converts the data 92 into encoded data slices 216 as will be further described with reference to FIGS. 21-23. The outbound DST processing module 80 sends, via the network 24, to the DST execution units for storage as further described with reference to FIG. 24.

In an example of data retrieval, the DST client module 34 issues a retrieve request to the DST execution units for the desired data 92. The retrieve request may address each DST executions units storing encoded data slices of the desired data, address a decode threshold number of DST execution units, address a read threshold number of DST execution units, or address some other number of DST execution units. In response to the request, each addressed DST execution unit retrieves its encoded data slices 100 of the desired data and sends them to the inbound DST processing section 82, via the network 24.

When, for each data segment, the inbound DST processing section 82 receives at least a decode threshold number of encoded data slices 100, it converts the encoded data slices 100 into a data segment. The inbound DST processing section 82 aggregates the data segments to produce the retrieved data 92.

Figure 21:
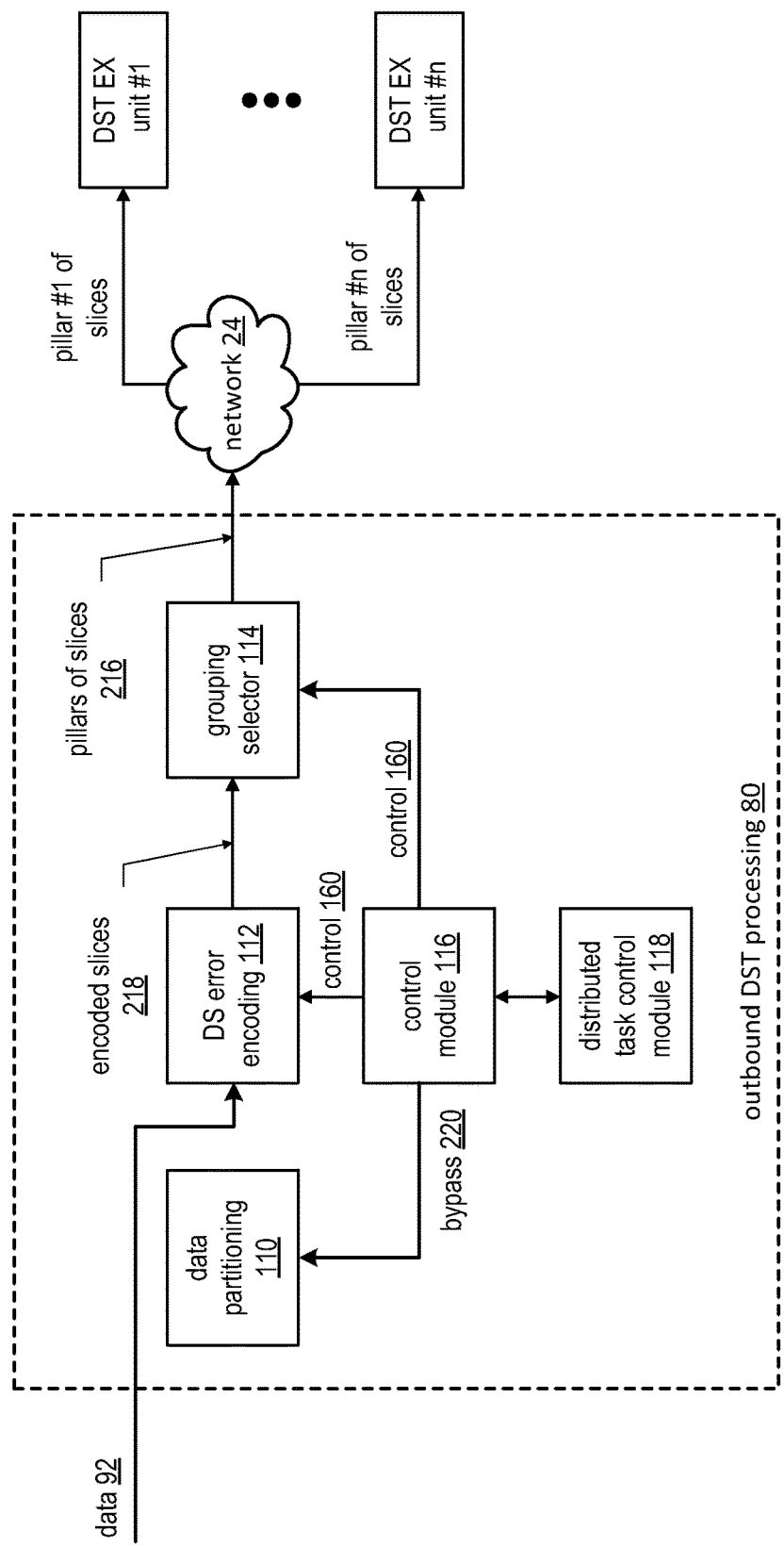
FIG. 21 is a schematic block diagram of an example of operation of outbound distributed storage and/or task (DST) processing for storing data in accordance with the present invention.

FIG. 21 is a schematic block diagram of an embodiment of an outbound distributed storage and/or task (DST) processing section 80 of a DST client module coupled to a distributed storage and task network (DSTN) module (e.g., a plurality of DST execution units) via a network 24. The outbound DST processing section 80 includes a data partitioning module 110, a dispersed storage (DS) error encoding module 112, a grouping selector module 114, a control module 116, and a distributed task control module 118.

In an example of operation, the data partitioning module 110 is by-passed such that data 92 is provided directly to the DS error encoding module 112. The control module 116 coordinates the by-passing of the data partitioning module 110 by outputting a bypass 220 message to the data partitioning module 110.

The DS error encoding module 112 receives the data 92 in a serial manner, a parallel manner, and/or a combination thereof. The DS error encoding module 112 DS error encodes the data in accordance with control information 160 from the control module 116 to produce encoded data slices 218. The DS error encoding includes segmenting the data 92 into data segments, segment security processing (e.g., encryption, compression, watermarking, integrity check (e.g., CRC, etc.)), error encoding, slicing, and/or per slice security processing (e.g., encryption, compression, watermarking, integrity check (e.g., CRC, etc.)). The control information 160 indicates which steps of the DS error encoding are active for the data 92 and, for active steps, indicates the parameters for the step. For example, the control information 160 indicates that the error encoding is active and includes error encoding parameters (e.g., pillar width, decode threshold, write threshold, read threshold, type of error encoding, etc.).

The grouping selector module 114 groups the encoded slices 218 of the data segments into pillars of slices 216. The number of pillars corresponds to the pillar width of the DS error encoding parameters. In this example, the distributed task control module 118 facilitates the storage request.

Figure 22:
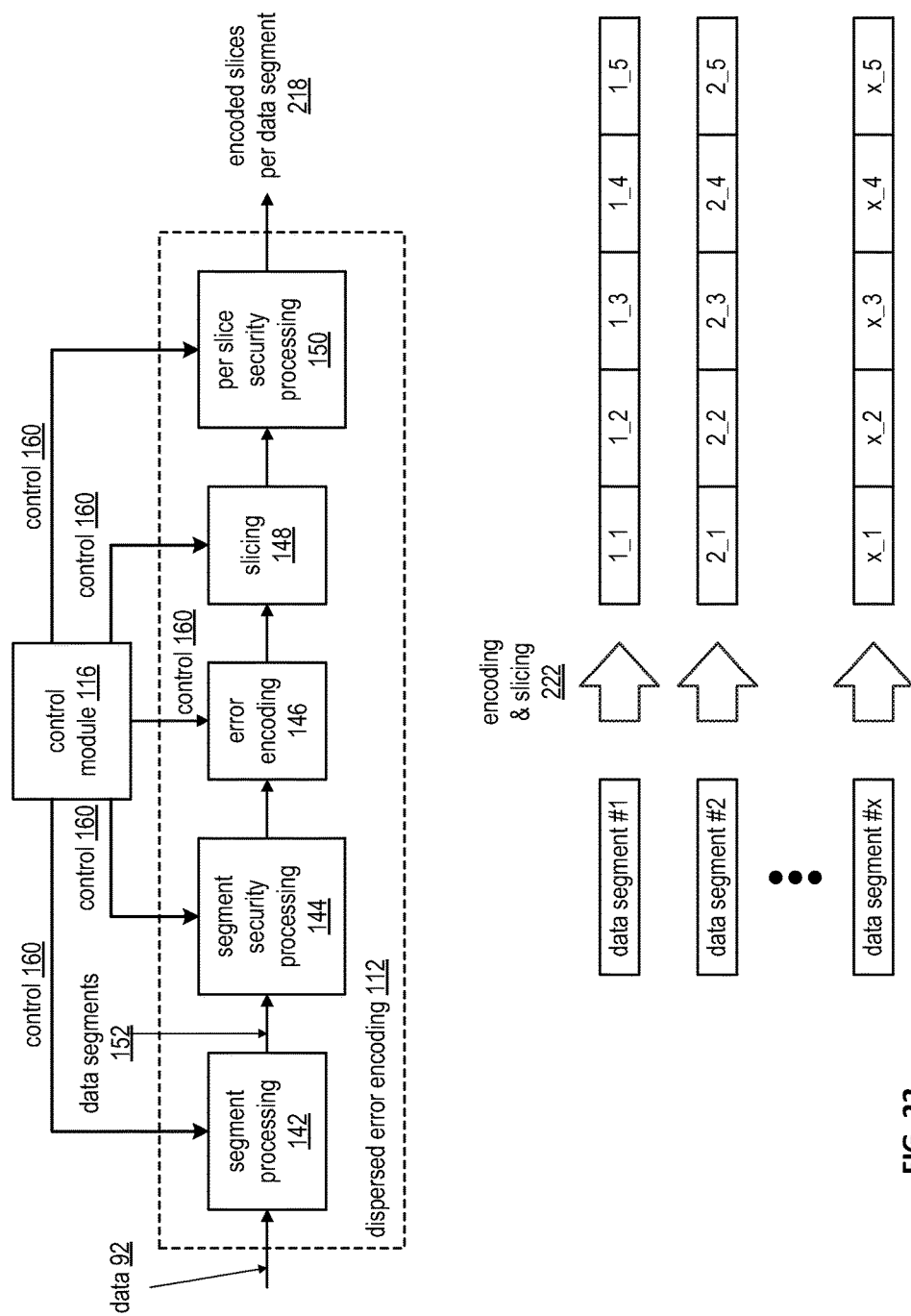
FIG. 22 is a schematic block diagram of an example of a dispersed error encoding for the example of FIG. 21 in accordance with the present invention.

FIG. 22 is a schematic block diagram of an example of a dispersed storage (DS) error encoding module 112 for the example of FIG. 21. The DS error encoding module 112 includes a segment processing module 142, a segment security processing module 144, an error encoding module 146, a slicing module 148, and a per slice security processing module 150. Each of these modules is coupled to a control module 116 to receive control information 160 therefrom.

In an example of operation, the segment processing module 142 receives data 92 and receives segmenting information as control information 160 from the control module 116. The segmenting information indicates how the segment processing module is to segment the data. For example, the segmenting information indicates the size of each data segment. The segment processing module 142 segments the data 92 into data segments 152 in accordance with the segmenting information.

The segment security processing module 144, when enabled by the control module 116, secures the data segments 152 based on segment security information received as control information 160 from the control module 116. The segment security information includes data compression, encryption, watermarking, integrity check (e.g., CRC, etc.), and/or any other type of digital security. For example, when the segment security processing module 144 is enabled, it compresses a data segment 152, encrypts the compressed data segment, and generates a CRC value for the encrypted data segment to produce a secure data segment. When the segment security processing module 144 is not enabled, it passes the data segments 152 to the error encoding module 146 or is bypassed such that the data segments 152 are provided to the error encoding module 146.

The error encoding module 146 encodes the secure data segments in accordance with error correction encoding parameters received as control information 160 from the control module 116. The error correction encoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction encoding parameters identify a specific error correction encoding scheme, specifies a pillar width of five, and specifies a decode threshold of three. From these parameters, the error encoding module 146 encodes a data segment to produce an encoded data segment.

The slicing module 148 slices the encoded data segment in accordance with a pillar width of the error correction encoding parameters. For example, if the pillar width is five, the slicing module slices an encoded data segment into a set of five encoded data slices. As such, for a plurality of data segments, the slicing module 148 outputs a plurality of sets of encoded data slices as shown within encoding and slicing function 222 as described.

The per slice security processing module 150, when enabled by the control module 116, secures each encoded data slice based on slice security information received as control information 160 from the control module 116. The slice security information includes data compression, encryption, watermarking, integrity check (e.g., CRC, etc.), and/or any other type of digital security. For example, when the per slice security processing module 150 is enabled, it may compress an encoded data slice, encrypt the compressed encoded data slice, and generate a CRC value for the encrypted encoded data slice to produce a secure encoded data slice tweaking. When the per slice security processing module 150 is not enabled, it passes the encoded data slices or is bypassed such that the encoded data slices 218 are the output of the DS error encoding module 112.

Figure 23:
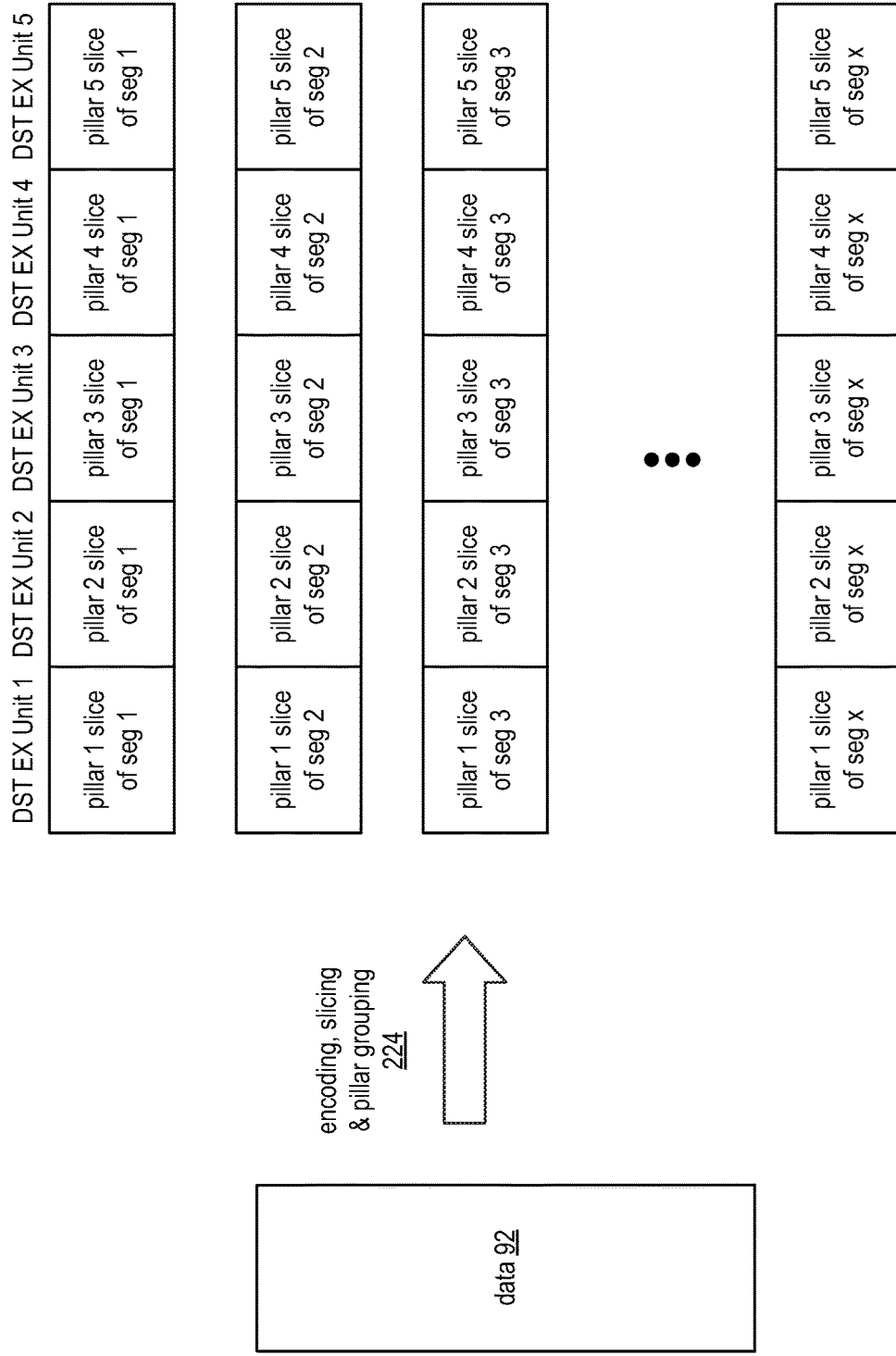
FIG. 23 is a diagram of an example of converting data into pillar slice groups for storage in accordance with the present invention.

FIG. 23 is a diagram of an example of converting data 92 into pillar slice groups utilizing encoding, slicing and pillar grouping function 224 for storage in memory of a distributed storage and task network (DSTN) module. As previously discussed the data 92 is encoded and sliced into a plurality of sets of encoded data slices; one set per data segment. The grouping selector module organizes the sets of encoded data slices into pillars of data slices. In this example, the DS error encoding parameters include a pillar width of 5 and a decode threshold of 3. As such, for each data segment, 5 encoded data slices are created. The grouping selector module takes the first encoded data slice of each of the sets and forms a first pillar, which may be sent to the first DST execution unit. Similarly, the grouping selector module creates the second pillar from the second slices of the sets; the third pillar from the third slices of the sets; the fourth pillar from the fourth slices of the sets; and the fifth pillar from the fifth slices of the set.

FIG. 24 is a schematic block diagram of an embodiment of a distributed storage and/or task (DST) execution unit that includes an interface 169, a controller 86, memory 88, one or more distributed task (DT) execution modules 90, and a DST client module 34. A computing core 26 may be utilized to implement the one or more DT execution modules 90 and the DST client module 34. The memory 88 is of sufficient size to store a significant number of encoded data slices (e.g., thousands of slices to hundreds-of-millions of slices) and may include one or more hard drives and/or one or more solid-state memory devices (e.g., flash memory, DRAM, etc.).

In an example of storing a pillar of slices 216, the DST execution unit receives, via interface 169, a pillar of slices 216 (e.g., pillar #1 slices). The memory 88 stores the encoded data slices 216 of the pillar of slices in accordance with memory control information 174 it receives from the controller 86. The controller 86 (e.g., a processing module, a CPU, etc.) generates the memory control information 174 based on distributed storage information (e.g., user information (e.g., user ID, distributed storage permissions, data access permission, etc.), vault information (e.g., virtual memory assigned to user, user group, etc.), etc.). Similarly, when retrieving slices, the DST execution unit receives, via interface 169, a slice retrieval request. The memory 88 retrieves the slice in accordance with memory control information 174 it receives from the controller 86. The memory 88 outputs the slice 100, via the interface 169, to a requesting entity.

Figure 25:
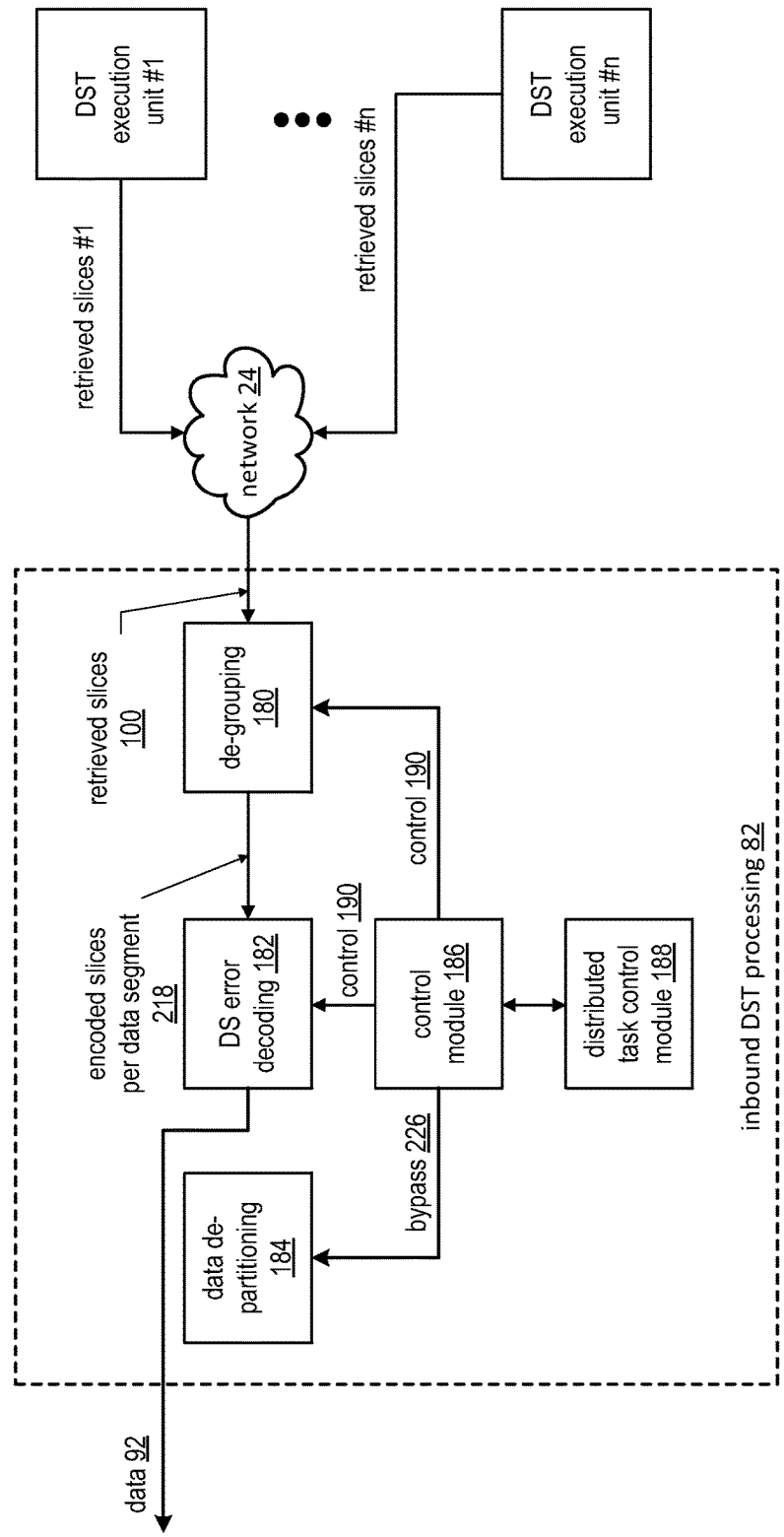
FIG. 25 is a schematic block diagram of an example of operation of inbound distributed storage and/or task (DST) processing for retrieving dispersed error encoded data in accordance with the present invention.

FIG. 25 is a schematic block diagram of an example of operation of an inbound distributed storage and/or task (DST) processing section 82 for retrieving dispersed error encoded data 92. The inbound DST processing section 82 includes a de-grouping module 180, a dispersed storage (DS) error decoding module 182, a data de-partitioning module 184, a control module 186, and a distributed task control module 188. Note that the control module 186 and/or the distributed task control module 188 may be separate modules from corresponding ones of an outbound DST processing section or may be the same modules.

In an example of operation, the inbound DST processing section 82 is retrieving stored data 92 from the DST execution units (i.e., the DSTN module). In this example, the DST execution units output encoded data slices corresponding to data retrieval requests from the distributed task control module 188. The de-grouping module 180 receives pillars of slices 100 and de-groups them in accordance with control information 190 from the control module 186 to produce sets of encoded data slices 218. The DS error decoding module 182 decodes, in accordance with the DS error encoding parameters received as control information 190 from the control module 186, each set of encoded data slices 218 to produce data segments, which are aggregated into retrieved data 92. The data de-partitioning module 184 is by-passed in this operational mode via a bypass signal 226 of control information 190 from the control module 186.

Figure 26:
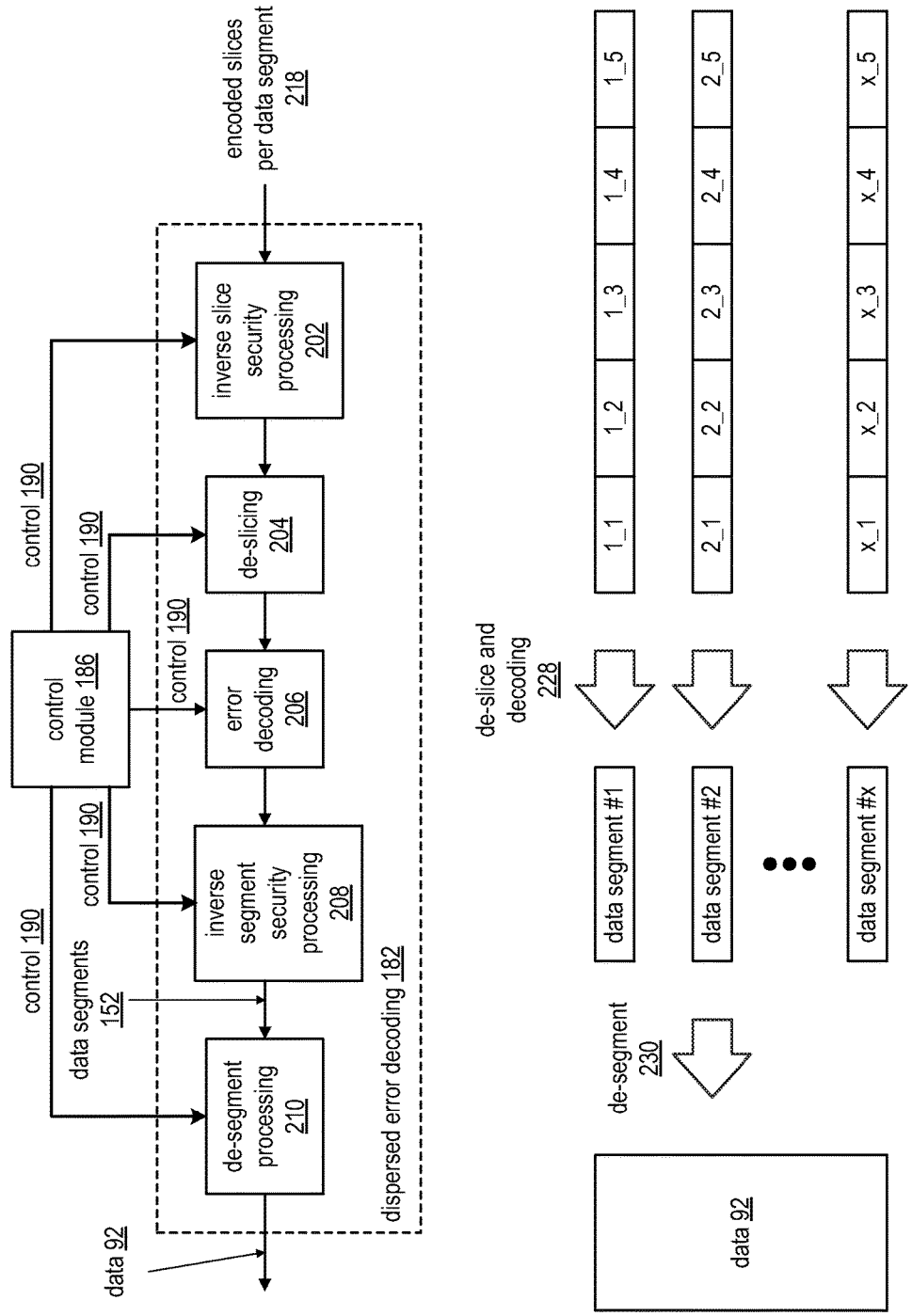
FIG. 26 is a schematic block diagram of an example of a dispersed error decoding for the example of FIG. 25 in accordance with the present invention.

FIG. 26 is a schematic block diagram of an embodiment of a dispersed storage (DS) error decoding module 182 of an inbound distributed storage and task (DST) processing section. The DS error decoding module 182 includes an inverse per slice security processing module 202, a de-slicing module 204, an error decoding module 206, an inverse segment security module 208, and a de-segmenting processing module 210. The dispersed error decoding module 182 is operable to de-slice and decode encoded slices per data segment 218 utilizing a de-slicing and decoding function 228 to produce a plurality of data segments that are de-segmented utilizing a de-segment function 230 to recover data 92.

In an example of operation, the inverse per slice security processing module 202, when enabled by the control module 186 via control information 190, unsecures each encoded data slice 218 based on slice de-security information (e.g., the compliment of the slice security information discussed with reference to FIG. 6) received as control information 190 from the control module 186. The slice de-security information includes data decompression, decryption, de-watermarking, integrity check (e.g., CRC verification, etc.), and/or any other type of digital security. For example, when the inverse per slice security processing module 202 is enabled, it verifies integrity information (e.g., a CRC value) of each encoded data slice 218, it decrypts each verified encoded data slice, and decompresses each decrypted encoded data slice to produce slice encoded data. When the inverse per slice security processing module 202 is not enabled, it passes the encoded data slices 218 as the sliced encoded data or is bypassed such that the retrieved encoded data slices 218 are provided as the sliced encoded data.

The de-slicing module 204 de-slices the sliced encoded data into encoded data segments in accordance with a pillar width of the error correction encoding parameters received as control information 190 from a control module 186. For example, if the pillar width is five, the de-slicing module de-slices a set of five encoded data slices into an encoded data segment. Alternatively, the encoded data segment may include just three encoded data slices (e.g., when the decode threshold is 3).

The error decoding module 206 decodes the encoded data segments in accordance with error correction decoding parameters received as control information 190 from the control module 186 to produce secure data segments. The error correction decoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction decoding parameters identify a specific error correction encoding scheme, specify a pillar width of five, and specify a decode threshold of three.

The inverse segment security processing module 208, when enabled by the control module 186, unsecures the secured data segments based on segment security information received as control information 190 from the control module 186. The segment security information includes data decompression, decryption, de-watermarking, integrity check (e.g., CRC, etc.) verification, and/or any other type of digital security. For example, when the inverse segment security processing module is enabled, it verifies integrity information (e.g., a CRC value) of each secure data segment, it decrypts each verified secured data segment, and decompresses each decrypted secure data segment to produce a data segment 152. When the inverse segment security processing module 208 is not enabled, it passes the decoded data segment 152 as the data segment or is bypassed. The de-segmenting processing module 210 aggregates the data segments 152 into the data 92 in accordance with control information 190 from the control module 186.

Figure 27:
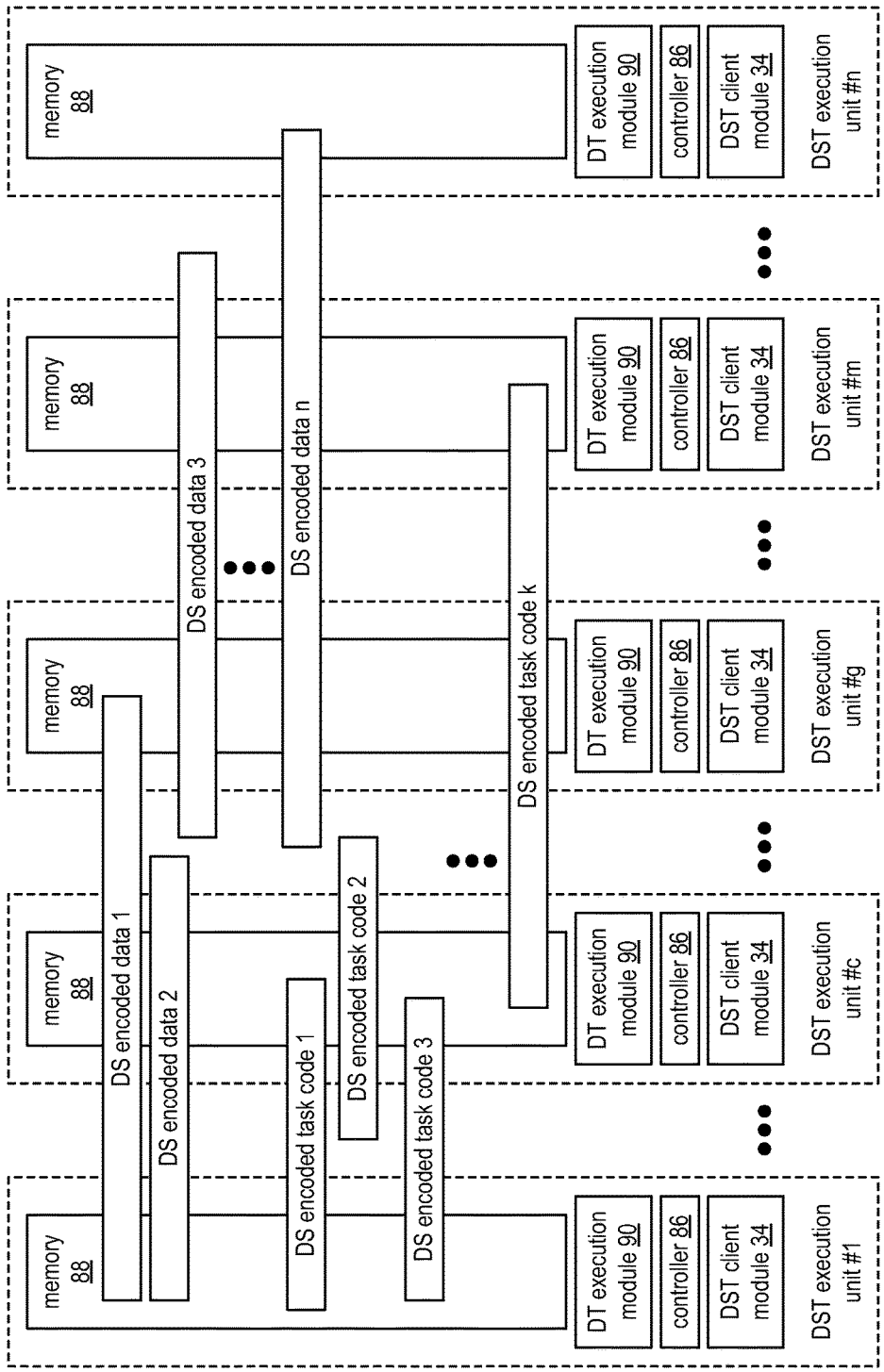
FIG. 27 is a schematic block diagram of an example of a distributed storage and task processing network (DSTN) module storing a plurality of data and a plurality of task codes in accordance with the present invention.

FIG. 27 is a schematic block diagram of an example of a distributed storage and task processing network (DSTN) module that includes a plurality of distributed storage and task (DST) execution units (#1 through #n, where, for example, n is an integer greater than or equal to three). Each of the DST execution units includes a DST client module 34, a controller 86, one or more DT (distributed task) execution modules 90, and memory 88.

In this example, the DSTN module stores, in the memory of the DST execution units, a plurality of DS (dispersed storage) encoded data (e.g., 1 through n, where n is an integer greater than or equal to two) and stores a plurality of DS encoded task codes (e.g., 1 through k, where k is an integer greater than or equal to two). The DS encoded data may be encoded in accordance with one or more examples described with reference to FIGS. 3-19 (e.g., organized in slice groupings) or encoded in accordance with one or more examples described with reference to FIGS. 20-26 (e.g., organized in pillar groups). The data that is encoded into the DS encoded data may be of any size and/or of any content. For example, the data may be one or more digital books, a copy of a company's emails, a large-scale Internet search, a video security file, one or more entertainment video files (e.g., television programs, movies, etc.), data files, and/or any other large amount of data (e.g., greater than a few Terabytes).

The tasks that are encoded into the DS encoded task code may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc. The tasks may be encoded into the DS encoded task code in accordance with one or more examples described with reference to FIGS. 3-19 (e.g., organized in slice groupings) or encoded in accordance with one or more examples described with reference to FIGS. 20-26 (e.g., organized in pillar groups).

In an example of operation, a DST client module of a user device or of a DST processing unit issues a DST request to the DSTN module. The DST request may include a request to retrieve stored data, or a portion thereof, may include a request to store data that is included with the DST request, may include a request to perform one or more tasks on stored data, may include a request to perform one or more tasks on data included with the DST request, etc. In the cases where the DST request includes a request to store data or to retrieve data, the client module and/or the DSTN module processes the request as previously discussed with reference to one or more of FIGS. 3-19 (e.g., slice groupings) and/or 20-26 (e.g., pillar groupings). In the case where the DST request includes a request to perform one or more tasks on data included with the DST request, the DST client module and/or the DSTN module process the DST request as previously discussed with reference to one or more of FIGS. 3-19.

In the case where the DST request includes a request to perform one or more tasks on stored data, the DST client module and/or the DSTN module processes the DST request as will be described with reference to one or more of FIGS. 28-39. In general, the DST client module identifies data and one or more tasks for the DSTN module to execute upon the identified data. The DST request may be for a one-time execution of the task or for an on-going execution of the task. As an example of the latter, as a company generates daily emails, the DST request may be to daily search new emails for inappropriate content and, if found, record the content, the email sender(s), the email recipient(s), email routing information, notify human resources of the identified email, etc.

Figure 28:
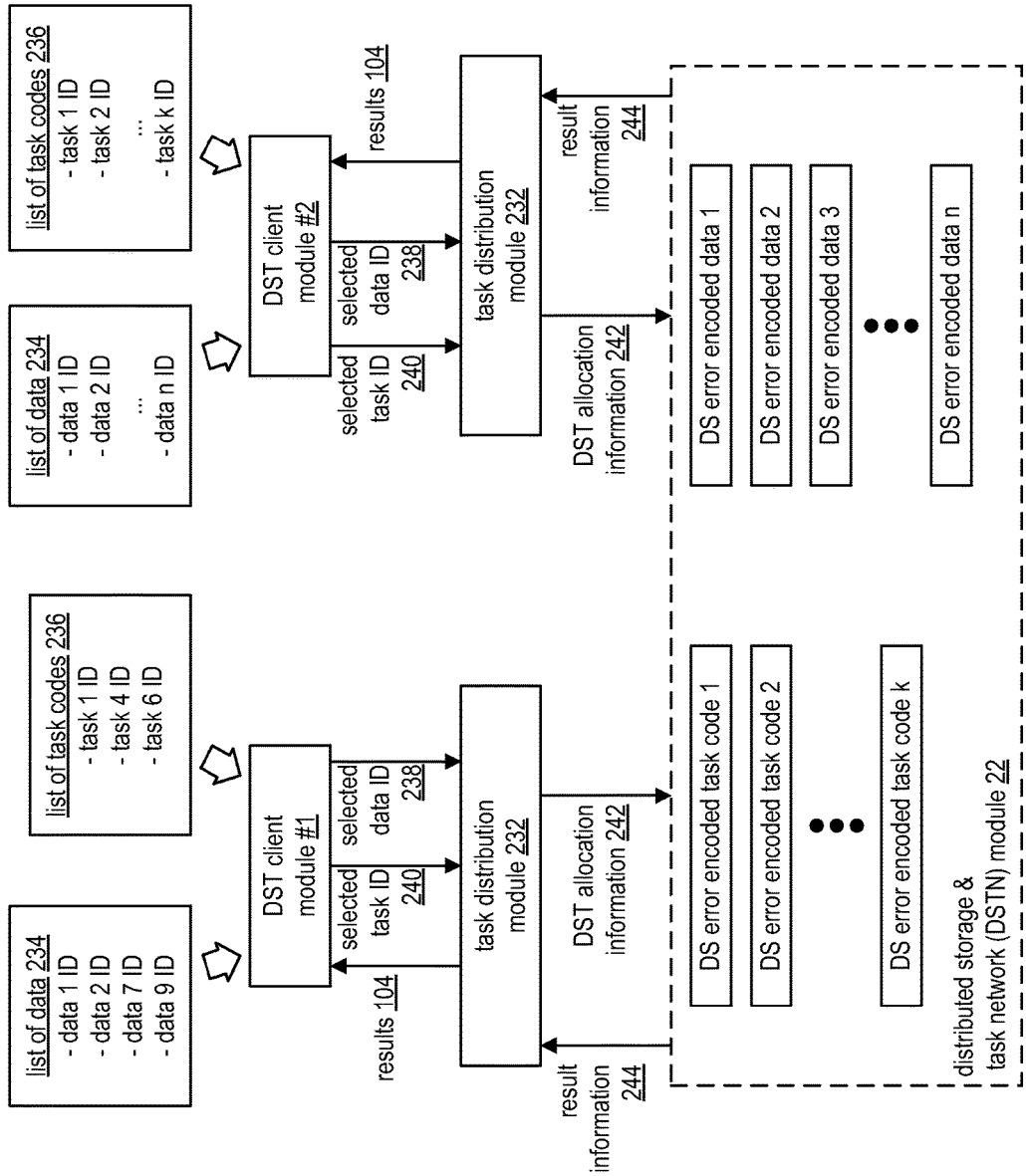
FIG. 28 is a schematic block diagram of an example of the distributed computing system performing tasks on stored data in accordance with the present invention.

FIG. 28 is a schematic block diagram of an example of a distributed computing system performing tasks on stored data. In this example, two distributed storage and task (DST) client modules 1-2 are shown: the first may be associated with a user device and the second may be associated with a DST processing unit or a high priority user device (e.g., high priority clearance user, system administrator, etc.). Each DST client module includes a list of stored data 234 and a list of tasks codes 236. The list of stored data 234 includes one or more entries of data identifying information, where each entry identifies data stored in the DSTN module 22. The data identifying information (e.g., data ID) includes one or more of a data file name, a data file directory listing, DSTN addressing information of the data, a data object identifier, etc. The list of tasks 236 includes one or more entries of task code identifying information, when each entry identifies task codes stored in the DSTN module 22. The task code identifying information (e.g., task ID) includes one or more of a task file name, a task file directory listing, DSTN addressing information of the task, another type of identifier to identify the task, etc.

As shown, the list of data 234 and the list of tasks 236 are each smaller in number of entries for the first DST client module than the corresponding lists of the second DST client module. This may occur because the user device associated with the first DST client module has fewer privileges in the distributed computing system than the device associated with the second DST client module. Alternatively, this may occur because the user device associated with the first DST client module serves fewer users than the device associated with the second DST client module and is restricted by the distributed computing system accordingly. As yet another alternative, this may occur through no restraints by the distributed computing system, it just occurred because the operator of the user device associated with the first DST client module has selected fewer data and/or fewer tasks than the operator of the device associated with the second DST client module.

In an example of operation, the first DST client module selects one or more data entries 238 and one or more tasks 240 from its respective lists (e.g., selected data ID and selected task ID). The first DST client module sends its selections to a task distribution module 232. The task distribution module 232 may be within a stand-alone device of the distributed computing system, may be within the user device that contains the first DST client module, or may be within the DSTN module 22.

Regardless of the task distribution module's location, it generates DST allocation information 242 from the selected task ID 240 and the selected data ID 238. The DST allocation information 242 includes data partitioning information, task execution information, and/or intermediate result information. The task distribution module 232 sends the DST allocation information 242 to the DSTN module 22. Note that one or more examples of the DST allocation information will be discussed with reference to one or more of FIGS. 29-39.

The DSTN module 22 interprets the DST allocation information 242 to identify the stored DS encoded data (e.g., DS error encoded data 2) and to identify the stored DS error encoded task code (e.g., DS error encoded task code 1). In addition, the DSTN module 22 interprets the DST allocation information 242 to determine how the data is to be partitioned and how the task is to be partitioned. The DSTN module 22 also determines whether the selected DS error encoded data 238 needs to be converted from pillar grouping to slice grouping. If so, the DSTN module 22 converts the selected DS error encoded data into slice groupings and stores the slice grouping DS error encoded data by overwriting the pillar grouping DS error encoded data or by storing it in a different location in the memory of the DSTN module 22 (i.e., does not overwrite the pillar grouping DS encoded data).

The DSTN module 22 partitions the data and the task as indicated in the DST allocation information 242 and sends the portions to selected DST execution units of the DSTN module 22. Each of the selected DST execution units performs its partial task(s) on its slice groupings to produce partial results. The DSTN module 22 collects the partial results from the selected DST execution units and provides them, as result information 244, to the task distribution module. The result information 244 may be the collected partial results, one or more final results as produced by the DSTN module 22 from processing the partial results in accordance with the DST allocation information 242, or one or more intermediate results as produced by the DSTN module 22 from processing the partial results in accordance with the DST allocation information 242.

The task distribution module 232 receives the result information 244 and provides one or more final results 104 therefrom to the first DST client module. The final result(s) 104 may be result information 244 or a result(s) of the task distribution module's processing of the result information 244.

In concurrence with processing the selected task of the first DST client module, the distributed computing system may process the selected task(s) of the second DST client module on the selected data(s) of the second DST client module. Alternatively, the distributed computing system may process the second DST client module's request subsequent to, or preceding, that of the first DST client module. Regardless of the ordering and/or parallel processing of the DST client module requests, the second DST client module provides its selected data 238 and selected task 240 to a task distribution module 232. If the task distribution module 232 is a separate device of the distributed computing system or within the DSTN module, the task distribution modules 232 coupled to the first and second DST client modules may be the same module. The task distribution module 232 processes the request of the second DST client module in a similar manner as it processed the request of the first DST client module.

Figure 29:
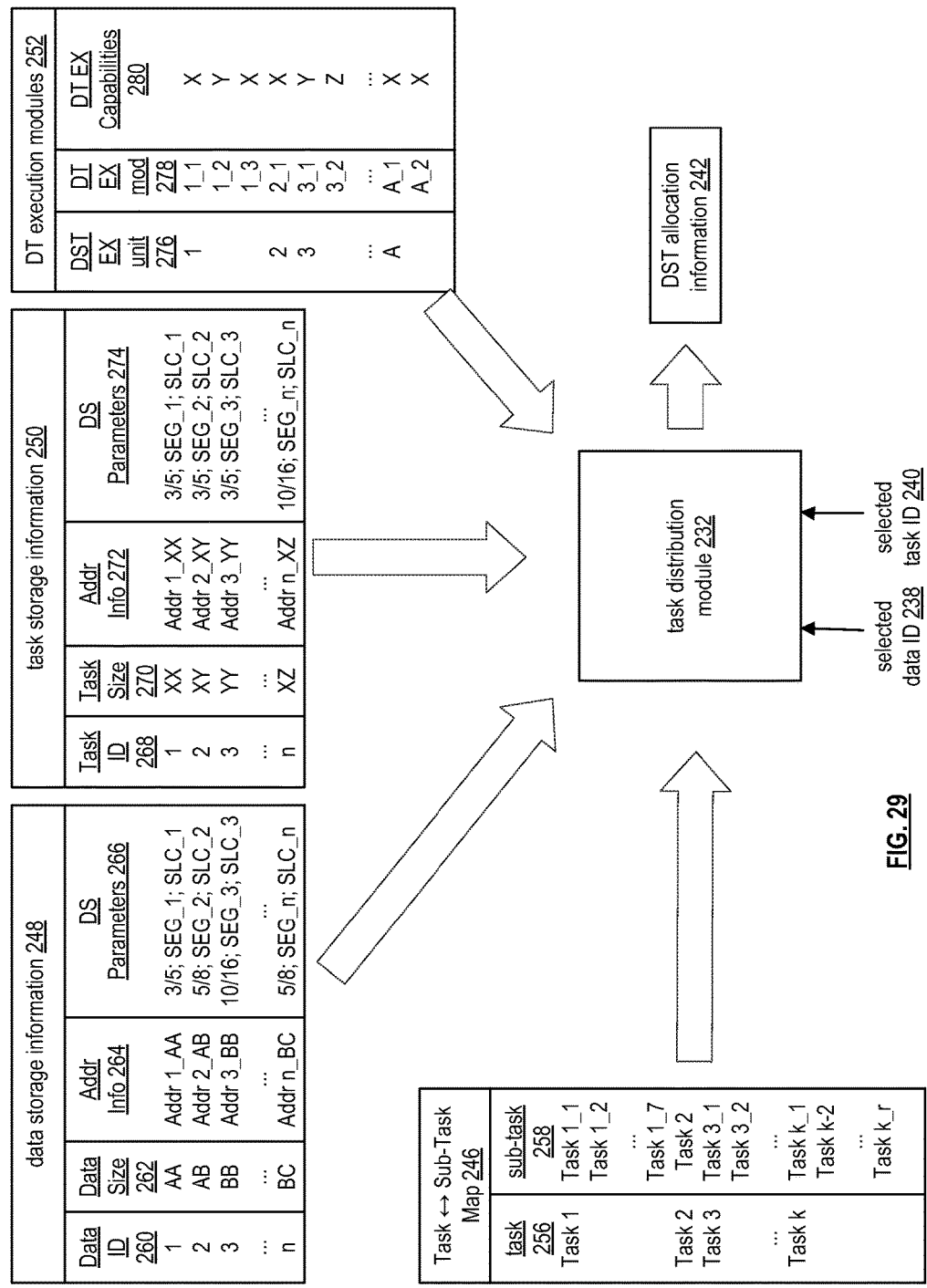
FIG. 29 is a schematic block diagram of an embodiment of a task distribution module facilitating the example of FIG. 28 in accordance with the present invention.

FIG. 29 is a schematic block diagram of an embodiment of a task distribution module 232 facilitating the example of FIG. 28. The task distribution module 232 includes a plurality of tables it uses to generate distributed storage and task (DST) allocation information 242 for selected data and selected tasks received from a DST client module. The tables include data storage information 248, task storage information 250, distributed task (DT) execution module information 252, and task ⇔ sub-task mapping information 246.

The data storage information table 248 includes a data identification (ID) field 260, a data size field 262, an addressing information field 264, distributed storage (DS) information 266, and may further include other information regarding the data, how it is stored, and/or how it can be processed. For example, DS encoded data #1 has a data ID of 1, a data size of AA (e.g., a byte size of a few Terabytes or more), addressing information of Addr_1_AA, and DS parameters of 3/5; SEG_1; and SLC_1. In this example, the addressing information may be a virtual address corresponding to the virtual address of the first storage word (e.g., one or more bytes) of the data and information on how to calculate the other addresses, may be a range of virtual addresses for the storage words of the data, physical addresses of the first storage word or the storage words of the data, may be a list of slice names of the encoded data slices of the data, etc. The DS parameters may include identity of an error encoding scheme, decode threshold/pillar width (e.g., 3/5 for the first data entry), segment security information (e.g., SEG_1), per slice security information (e.g., SLC_1), and/or any other information regarding how the data was encoded into data slices.

The task storage information table 250 includes a task identification (ID) field 268, a task size field 270, an addressing information field 272, distributed storage (DS) information 274, and may further include other information regarding the task, how it is stored, and/or how it can be used to process data. For example, DS encoded task #2 has a task ID of 2, a task size of XY, addressing information of Addr_2_XY, and DS parameters of 3/5; SEG_2; and SLC_2. In this example, the addressing information may be a virtual address corresponding to the virtual address of the first storage word (e.g., one or more bytes) of the task and information on how to calculate the other addresses, may be a range of virtual addresses for the storage words of the task, physical addresses of the first storage word or the storage words of the task, may be a list of slices names of the encoded slices of the task code, etc. The DS parameters may include identity of an error encoding scheme, decode threshold/pillar width (e.g., 3/5 for the first data entry), segment security information (e.g., SEG_2), per slice security information (e.g., SLC_2), and/or any other information regarding how the task was encoded into encoded task slices. Note that the segment and/or the per-slice security information include a type of encryption (if enabled), a type of compression (if enabled), watermarking information (if enabled), and/or an integrity check scheme (if enabled).

The task ⇔ sub-task mapping information table 246 includes a task field 256 and a sub-task field 258. The task field 256 identifies a task stored in the memory of a distributed storage and task network (DSTN) module and the corresponding sub-task fields 258 indicates whether the task includes sub-tasks and, if so, how many and if any of the sub-tasks are ordered. In this example, the task ⇔ sub-task mapping information table 246 includes an entry for each task stored in memory of the DSTN module (e.g., task 1 through task k). In particular, this example indicates that task 1 includes 7 sub-tasks; task 2 does not include sub-tasks, and task k includes r number of sub-tasks (where r is an integer greater than or equal to two).

The DT execution module table 252 includes a DST execution unit ID field 276, a DT execution module ID field 278, and a DT execution module capabilities field 280. The DST execution unit ID field 276 includes the identity of DST units in the DSTN module. The DT execution module ID field 278 includes the identity of each DT execution unit in each DST unit. For example, DST unit 1 includes three DT executions modules (e.g., 1_1, 1_2, and 1_3). The DT execution capabilities field 280 includes identity of the capabilities of the corresponding DT execution unit. For example, DT execution module 1_1 includes capabilities X, where X includes one or more of MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, memory information (e.g., type, size, availability, etc.), and/or any information germane to executing one or more tasks.

From these tables, the task distribution module 232 generates the DST allocation information 242 to indicate where the data is stored, how to partition the data, where the task is stored, how to partition the task, which DT execution units should perform which partial task on which data partitions, where and how intermediate results are to be stored, etc. If multiple tasks are being performed on the same data or different data, the task distribution module factors such information into its generation of the DST allocation information.

Figure 30:
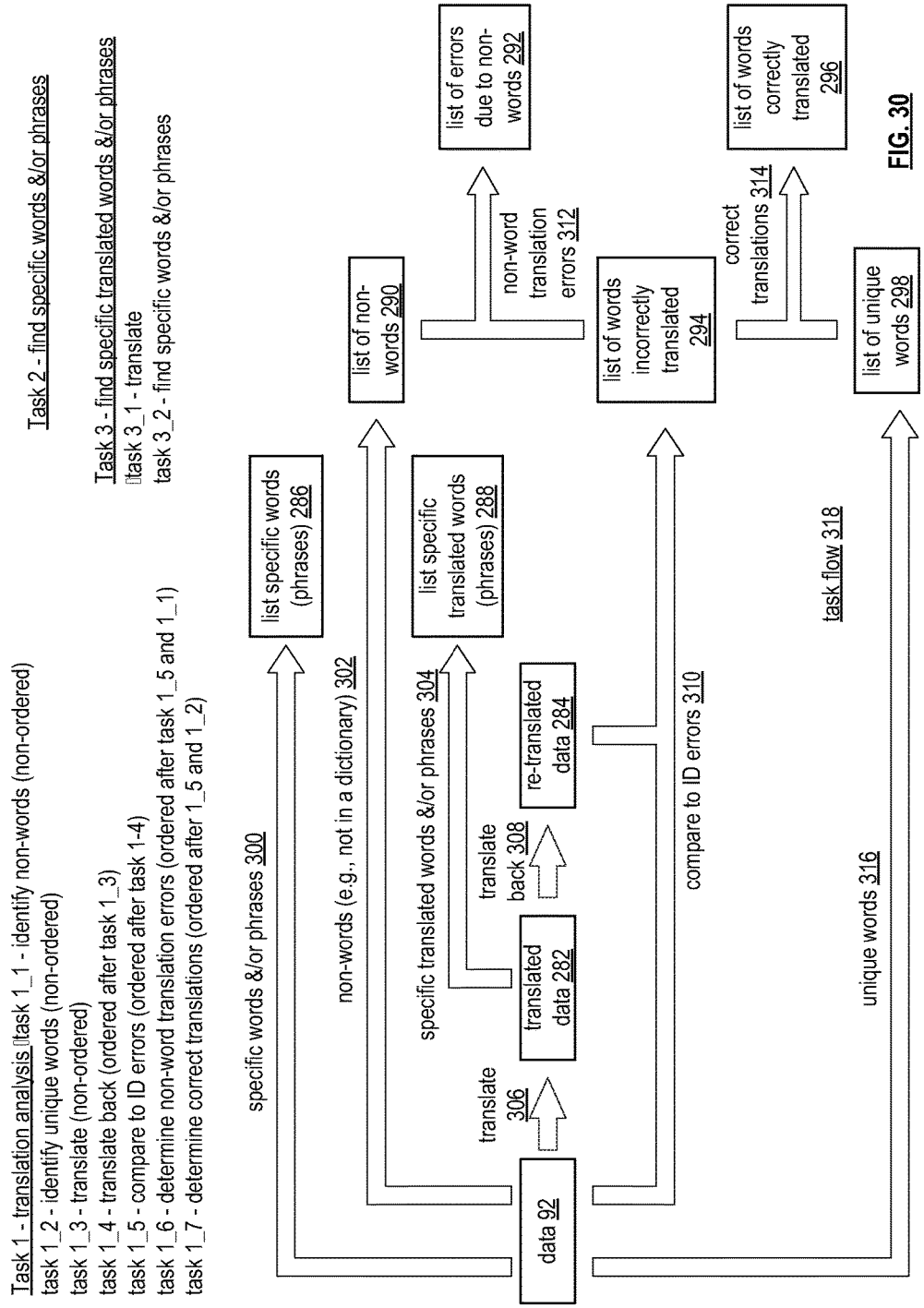
FIG. 30 is a diagram of a specific example of the distributed computing system performing tasks on stored data in accordance with the present invention.

FIG. 30 is a diagram of a specific example of a distributed computing system performing tasks on stored data as a task flow 318. In this example, selected data 92 is data 2 and selected tasks are tasks 1, 2, and 3. Task 1 corresponds to analyzing translation of data from one language to another (e.g., human language or computer language); task 2 corresponds to finding specific words and/or phrases in the data; and task 3 corresponds to finding specific translated words and/or phrases in translated data.

In this example, task 1 includes 7 sub-tasks: task 1_1—identify non-words (non-ordered); task 1_2—identify unique words (non-ordered); task 1_3—translate (non-ordered); task 1_4—translate back (ordered after task 1_3); task 1_5—compare to ID errors (ordered after task 1-4); task 1_6—determine non-word translation errors (ordered after task 1_5 and 1_1); and task 1_7—determine correct translations (ordered after 1_5 and 1_2). The sub-task further indicates whether they are an ordered task (i.e., are dependent on the outcome of another task) or non-order (i.e., are independent of the outcome of another task). Task 2 does not include sub-tasks and task 3 includes two sub-tasks: task 3_1 translate; and task 3_2 find specific word or phrase in translated data.

In general, the three tasks collectively are selected to analyze data for translation accuracies, translation errors, translation anomalies, occurrence of specific words or phrases in the data, and occurrence of specific words or phrases on the translated data. Graphically, the data 92 is translated 306 into translated data 282; is analyzed for specific words and/or phrases 300 to produce a list of specific words and/or phrases 286; is analyzed for non-words 302 (e.g., not in a reference dictionary) to produce a list of non-words 290; and is analyzed for unique words 316 included in the data 92 (i.e., how many different words are included in the data) to produce a list of unique words 298. Each of these tasks is independent of each other and can therefore be processed in parallel if desired.

The translated data 282 is analyzed (e.g., sub-task 3_2) for specific translated words and/or phrases 304 to produce a list of specific translated words and/or phrases 288. The translated data 282 is translated back 308 (e.g., sub-task 1_4) into the language of the original data to produce re-translated data 284. These two tasks are dependent on the translation task (e.g., task 1_3) and thus must be ordered after the translation task, which may be in a pipelined ordering or a serial ordering. The re-translated data 284 is then compared 310 with the original data 92 to find words and/or phrases that did not translate (one way and/or the other) properly to produce a list of incorrectly translated words 294. As such, the comparing task (e.g., sub-task 1_5) 310 is ordered after the translation 306 and re-translation tasks 308 (e.g., sub-tasks 1_3 and 1_4).

The list of words incorrectly translated 294 is compared 312 to the list of non-words 290 to identify words that were not properly translated because the words are non-words to produce a list of errors due to non-words 292. In addition, the list of words incorrectly translated 294 is compared 314 to the list of unique words 298 to identify unique words that were properly translated to produce a list of correctly translated words 296. The comparison may also identify unique words that were not properly translated to produce a list of unique words that were not properly translated. Note that each list of words (e.g., specific words and/or phrases, non-words, unique words, translated words and/or phrases, etc.,) may include the word and/or phrase, how many times it is used, where in the data it is used, and/or any other information requested regarding a word and/or phrase.

Figure 31:
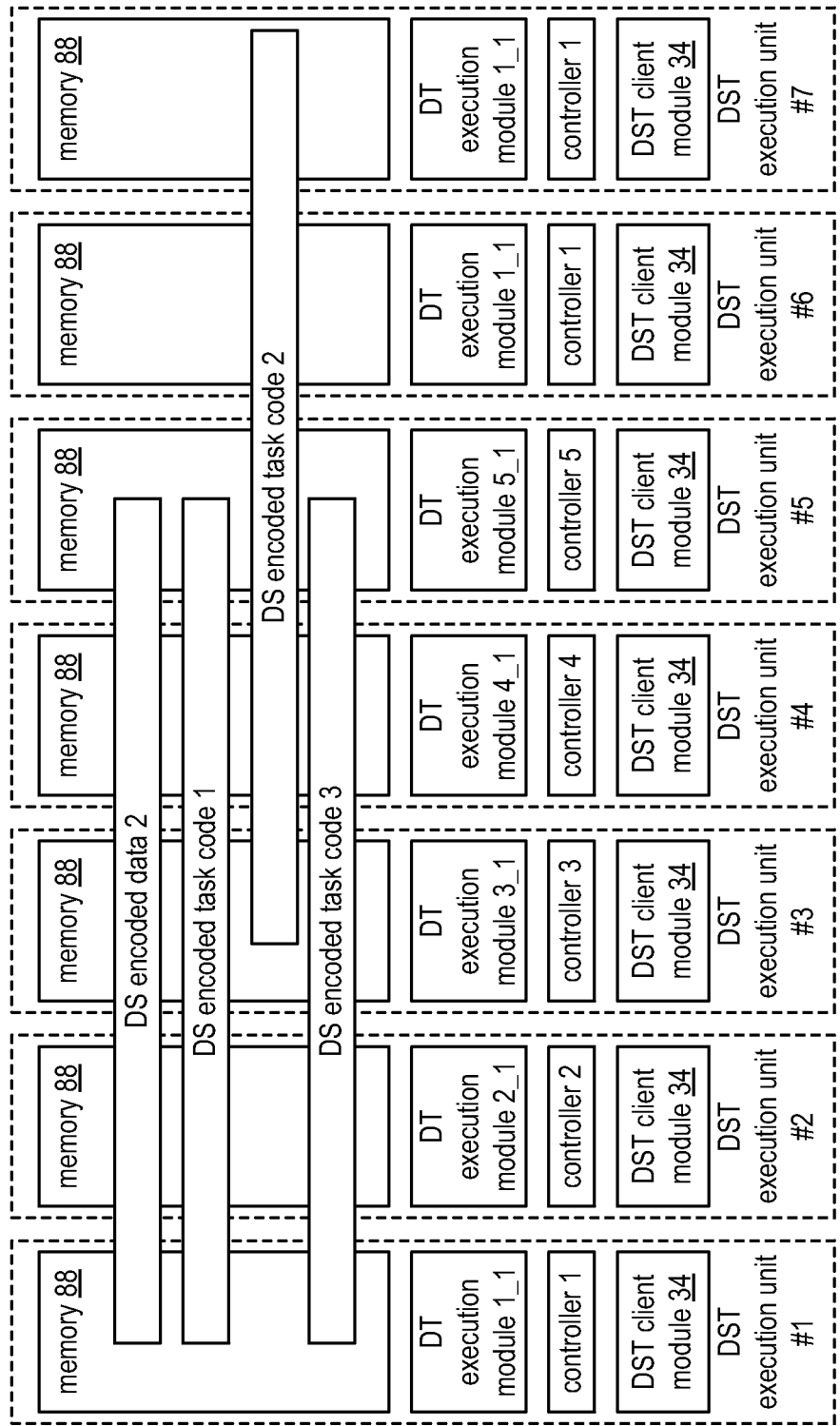
FIG. 31 is a schematic block diagram of an example of a distributed storage and task processing network (DSTN) module storing data and task codes for the example of FIG. 30 in accordance with the present invention.

FIG. 31 is a schematic block diagram of an example of a distributed storage and task processing network (DSTN) module storing data and task codes for the example of FIG. 30. As shown, DS encoded data 2 is stored as encoded data slices across the memory (e.g., stored in memories 88) of DST execution units 1-5; the DS encoded task code 1 (of task 1) and DS encoded task 3 are stored as encoded task slices across the memory of DST execution units 1-5; and DS encoded task code 2 (of task 2) is stored as encoded task slices across the memory of DST execution units 3-7. As indicated in the data storage information table and the task storage information table of FIG. 29, the respective data/task has DS parameters of 3/5 for their decode threshold/pillar width; hence spanning the memory of five DST execution units.

FIG. 32 is a diagram of an example of distributed storage and task (DST) allocation information 242 for the example of FIG. 30. The DST allocation information 242 includes data partitioning information 320, task execution information 322, and intermediate result information 324. The data partitioning information 320 includes the data identifier (ID), the number of partitions to split the data into, address information for each data partition, and whether the DS encoded data has to be transformed from pillar grouping to slice grouping. The task execution information 322 includes tabular information having a task identification field 326, a task ordering field 328, a data partition field ID 330, and a set of DT execution modules 332 to use for the distributed task processing per data partition. The intermediate result information 324 includes tabular information having a name ID field 334, an ID of the DST execution unit assigned to process the corresponding intermediate result 336, a scratch pad storage field 338, and an intermediate result storage field 340.

Continuing with the example of FIG. 30, where tasks 1-3 are to be distributedly performed on data 2, the data partitioning information includes the ID of data 2. In addition, the task distribution module determines whether the DS encoded data 2 is in the proper format for distributed computing (e.g., was stored as slice groupings). If not, the task distribution module indicates that the DS encoded data 2 format needs to be changed from the pillar grouping format to the slice grouping format, which will be done the by DSTN module. In addition, the task distribution module determines the number of partitions to divide the data into (e.g., 2_1 through 2_z) and addressing information for each partition.

The task distribution module generates an entry in the task execution information section for each sub-task to be performed. For example, task 1_1 (e.g., identify non-words on the data) has no task ordering (i.e., is independent of the results of other sub-tasks), is to be performed on data partitions 2_1 through 2_z by DT execution modules 1_1, 2_1, 3_1, 4_1, and 5_1. For instance, DT execution modules 1_1, 2_1, 3_1, 4_1, and 5_1 search for non-words in data partitions 2_1 through 2_z to produce task 1_1 intermediate results (R1-1, which is a list of non-words). Task 1_2 (e.g., identify unique words) has similar task execution information as task 1_1 to produce task 1_2 intermediate results (R1-2, which is the list of unique words).

Task 1_3 (e.g., translate) includes task execution information as being non-ordered (i.e., is independent), having DT execution modules 1_1, 2_1, 3_1, 4_1, and 5_1 translate data partitions 2_1 through 2_4 and having DT execution modules 1_2, 2_2, 3_2, 4_2, and 5_2 translate data partitions 2_5 through 2_z to produce task 1_3 intermediate results (R1-3, which is the translated data). In this example, the data partitions are grouped, where different sets of DT execution modules perform a distributed sub-task (or task) on each data partition group, which allows for further parallel processing.

Task 1_4 (e.g., translate back) is ordered after task 1_3 and is to be executed on task 1_3's intermediate result (e.g., R1-3_1) (e.g., the translated data). DT execution modules 1_1, 2_1, 3_1, 4_1, and 5_1 are allocated to translate back task 1_3 intermediate result partitions R1-3_1 through R1-3_4 and DT execution modules 1_2, 2_2, 6_1, 7_1, and 7_2 are allocated to translate back task 1_3 intermediate result partitions R1-3_5 through R1-3_z to produce task 1-4 intermediate results (R1-4, which is the translated back data).

Task 1_5 (e.g., compare data and translated data to identify translation errors) is ordered after task 1_4 and is to be executed on task 1_4's intermediate results (R4-1) and on the data. DT execution modules 1_1, 2_1, 3_1, 4_1, and 5_1 are allocated to compare the data partitions (2_1 through 2_z) with partitions of task 1-4 intermediate results partitions R1-4_1 through R1-4_z to produce task 1_5 intermediate results (R1-5, which is the list words translated incorrectly).

Task 1_6 (e.g., determine non-word translation errors) is ordered after tasks 1_1 and 1_5 and is to be executed on tasks 1_1's and 1_5's intermediate results (R1-1 and R1-5). DT execution modules 1_1, 2_1, 3_1, 4_1, and 5_1 are allocated to compare the partitions of task 1_1 intermediate results (R1-1_1 through R1-1_z) with partitions of task 1-5 intermediate results partitions (R1-5_1 through R1-5_z) to produce task 1_6 intermediate results (R1-6, which is the list translation errors due to non-words).

Task 1_7 (e.g., determine words correctly translated) is ordered after tasks 1_2 and 1_5 and is to be executed on tasks 1_2's and 1_5's intermediate results (R1-1 and R1-5). DT execution modules 1_2, 2_2, 3_2, 4_2, and 5_2 are allocated to compare the partitions of task 1_2 intermediate results (R1-2_1 through R1-2_z) with partitions of task 1-5 intermediate results partitions (R1-5_1 through R1-5_z) to produce task 1_7 intermediate results (R1-7, which is the list of correctly translated words).

Task 2 (e.g., find specific words and/or phrases) has no task ordering (i.e., is independent of the results of other sub-tasks), is to be performed on data partitions 2_1 through 2_z by DT execution modules 3_1, 4_1, 5_1, 6_1, and 7_1. For instance, DT execution modules 3_1, 4_1, 5_1, 6_1, and 7_1 search for specific words and/or phrases in data partitions 2_1 through 2_z to produce task 2 intermediate results (R2, which is a list of specific words and/or phrases).

Task 3_2 (e.g., find specific translated words and/or phrases) is ordered after task 1_3 (e.g., translate) is to be performed on partitions R1-3_1 through R1-3_z by DT execution modules 1_2, 2_2, 3_2, 4_2, and 5_2. For instance, DT execution modules 1_2, 2_2, 3_2, 4_2, and 5_2 search for specific translated words and/or phrases in the partitions of the translated data (R1-3_1 through R1-3_z) to produce task 3_2 intermediate results (R3-2, which is a list of specific translated words and/or phrases).

For each task, the intermediate result information indicates which DST unit is responsible for overseeing execution of the task and, if needed, processing the partial results generated by the set of allocated DT execution units. In addition, the intermediate result information indicates a scratch pad memory for the task and where the corresponding intermediate results are to be stored. For example, for intermediate result R1-1 (the intermediate result of task 1_1), DST unit 1 is responsible for overseeing execution of the task 1_1 and coordinates storage of the intermediate result as encoded intermediate result slices stored in memory of DST execution units 1-5. In general, the scratch pad is for storing non-DS encoded intermediate results and the intermediate result storage is for storing DS encoded intermediate results.

FIGS. 33-38 are schematic block diagrams of the distributed storage and task network (DSTN) module performing the example of FIG. 30. In FIG. 33, the DSTN module accesses the data 92 and partitions it into a plurality of partitions 1-z in accordance with distributed storage and task network (DST) allocation information. For each data partition, the DSTN identifies a set of its DT (distributed task) execution modules 90 to perform the task (e.g., identify non-words (i.e., not in a reference dictionary) within the data partition) in accordance with the DST allocation information. From data partition to data partition, the set of DT execution modules 90 may be the same, different, or a combination thereof (e.g., some data partitions use the same set while other data partitions use different sets).

For the first data partition, the first set of DT execution modules (e.g., 1_1, 2_1, 3_1, 4_1, and 5_1 per the DST allocation information of FIG. 32) executes task 1_1 to produce a first partial result 102 of non-words found in the first data partition. The second set of DT execution modules (e.g., 1_1, 2_1, 3_1, 4_1, and 5_1 per the DST allocation information of FIG. 32) executes task 1_1 to produce a second partial result 102 of non-words found in the second data partition. The sets of DT execution modules (as per the DST allocation information) perform task 1_1 on the data partitions until the "z" set of DT execution modules performs task 1_1 on the "zth" data partition to produce a "zth" partial result 102 of non-words found in the "zth" data partition.

As indicated in the DST allocation information of FIG. 32, DST execution unit 1 is assigned to process the first through "zth" partial results to produce the first intermediate result (R1-1), which is a list of non-words found in the data. For instance, each set of DT execution modules 90 stores its respective partial result in the scratchpad memory of DST execution unit 1 (which is identified in the DST allocation or may be determined by DST execution unit 1). A processing module of DST execution 1 is engaged to aggregate the first through "zth" partial results to produce the first intermediate result (e.g., R1_1). The processing module stores the first intermediate result as non-DS error encoded data in the scratchpad memory or in another section of memory of DST execution unit 1.

DST execution unit 1 engages its DST client module to slice grouping based DS error encode the first intermediate result (e.g., the list of non-words). To begin the encoding, the DST client module determines whether the list of non-words is of a sufficient size to partition (e.g., greater than a Terabyte). If yes, it partitions the first intermediate result (R1-1) into a plurality of partitions (e.g., R1-1_1 through R1-1_m). If the first intermediate result is not of sufficient size to partition, it is not partitioned.

For each partition of the first intermediate result, or for the first intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5).

In FIG. 34, the DSTN module is performing task 1_2 (e.g., find unique words) on the data 92. To begin, the DSTN module accesses the data 92 and partitions it into a plurality of partitions 1-z in accordance with the DST allocation information or it may use the data partitions of task 1_1 if the partitioning is the same. For each data partition, the DSTN identifies a set of its DT execution modules to perform task 1_2 in accordance with the DST allocation information. From data partition to data partition, the set of DT execution modules may be the same, different, or a combination thereof. For the data partitions, the allocated set of DT execution modules executes task 1_2 to produce a partial results (e.g., $1^{st}$ through "zth") of unique words found in the data partitions.

As indicated in the DST allocation information of FIG. 32, DST execution unit 1 is assigned to process the first through "zth" partial results 102 of task 1_2 to produce the second intermediate result (R1-2), which is a list of unique words found in the data 92. The processing module of DST execution 1 is engaged to aggregate the first through "zth" partial results of unique words to produce the second intermediate result. The processing module stores the second intermediate result as non-DS error encoded data in the scratchpad memory or in another section of memory of DST execution unit 1.

DST execution unit 1 engages its DST client module to slice grouping based DS error encode the second intermediate result (e.g., the list of non-words). To begin the encoding, the DST client module determines whether the list of unique words is of a sufficient size to partition (e.g., greater than a Terrabyte). If yes, it partitions the second intermediate result (R1-2) into a plurality of partitions (e.g., R1-2_1 through R1-2_m). If the second intermediate result is not of sufficient size to partition, it is not partitioned.

For each partition of the second intermediate result, or for the second intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5).

In FIG. 35, the DSTN module is performing task 1_3 (e.g., translate) on the data 92. To begin, the DSTN module accesses the data 92 and partitions it into a plurality of partitions 1-z in accordance with the DST allocation information or it may use the data partitions of task 1_1 if the partitioning is the same. For each data partition, the DSTN identifies a set of its DT execution modules to perform task 1_3 in accordance with the DST allocation information (e.g., DT execution modules 1_1, 2_1, 3_1, 4_1, and 5_1 translate data partitions 2_1 through 2_4 and DT execution modules 1_2, 2_2, 3_2, 4_2, and 5_2 translate data partitions 2_5 through 2_z). For the data partitions, the allocated set of DT execution modules 90 executes task 1_3 to produce partial results 102 (e.g., 1$^{st}$ through "zth") of translated data.

As indicated in the DST allocation information of FIG. 32, DST execution unit 2 is assigned to process the first through "zth" partial results of task 1_3 to produce the third intermediate result (R1-3), which is translated data. The processing module of DST execution 2 is engaged to aggregate the first through "zth" partial results of translated data to produce the third intermediate result. The processing module stores the third intermediate result as non-DS error encoded data in the scratchpad memory or in another section of memory of DST execution unit 2.

DST execution unit 2 engages its DST client module to slice grouping based DS error encode the third intermediate result (e.g., translated data). To begin the encoding, the DST client module partitions the third intermediate result (R1-3) into a plurality of partitions (e.g., R1-3_1 through R1-3_y). For each partition of the third intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 2-6 per the DST allocation information).

As is further shown in FIG. 35, the DSTN module is performing task 1_4 (e.g., retranslate) on the translated data of the third intermediate result. To begin, the DSTN module accesses the translated data (from the scratchpad memory or from the intermediate result memory and decodes it) and partitions it into a plurality of partitions in accordance with the DST allocation information. For each partition of the third intermediate result, the DSTN identifies a set of its DT execution modules 90 to perform task 1_4 in accordance with the DST allocation information (e.g., DT execution modules 1_1, 2_1, 3_1, 4_1, and 5_1 are allocated to translate back partitions R1-3_1 through R1-3_4 and DT execution modules 1_2, 2_2, 6_1, 7_1, and 7_2 are allocated to translate back partitions R1-3_5 through R1-3_z). For the partitions, the allocated set of DT execution modules executes task 1_4 to produce partial results 102 (e.g., 1$^{st}$ through "zth") of re-translated data.

As indicated in the DST allocation information of FIG. 32, DST execution unit 3 is assigned to process the first through "zth" partial results of task 1_4 to produce the fourth intermediate result (R1-4), which is retranslated data. The processing module of DST execution 3 is engaged to aggregate the first through "zth" partial results of retranslated data to produce the fourth intermediate result. The processing module stores the fourth intermediate result as non-DS error encoded data in the scratchpad memory or in another section of memory of DST execution unit 3.

DST execution unit 3 engages its DST client module to slice grouping based DS error encode the fourth intermediate result (e.g., retranslated data). To begin the encoding, the DST client module partitions the fourth intermediate result (R1-4) into a plurality of partitions (e.g., R1-4_1 through R1-4_z). For each partition of the fourth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 3-7 per the DST allocation information).

Figure 36:
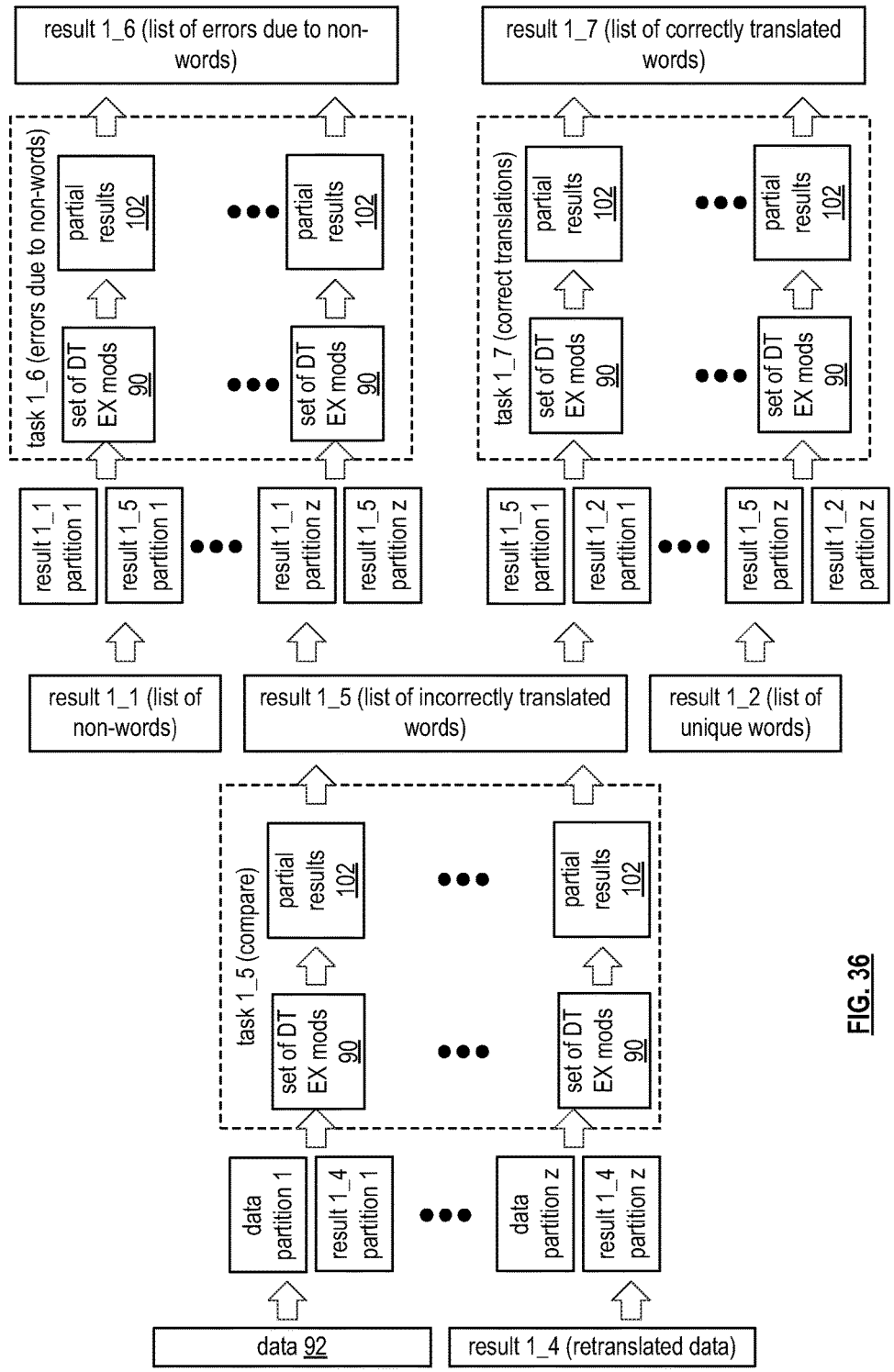

In FIG. 36, a distributed storage and task network (DSTN) module is performing task 1_5 (e.g., compare) on data 92 and retranslated data of FIG. 35. To begin, the DSTN module accesses the data 92 and partitions it into a plurality of partitions in accordance with the DST allocation information or it may use the data partitions of task 1_1 if the partitioning is the same. The DSTN module also accesses the retranslated data from the scratchpad memory, or from the intermediate result memory and decodes it, and partitions it into a plurality of partitions in accordance with the DST allocation information. The number of partitions of the retranslated data corresponds to the number of partitions of the data.

For each pair of partitions (e.g., data partition 1 and retranslated data partition 1), the DSTN identifies a set of its DT execution modules 90 to perform task 1_5 in accordance with the DST allocation information (e.g., DT execution modules 1_1, 2_1, 3_1, 4_1, and 5_1). For each pair of partitions, the allocated set of DT execution modules executes task 1_5 to produce partial results 102 (e.g., 1$^{st}$ through "zth") of a list of incorrectly translated words and/or phrases.

As indicated in the DST allocation information of FIG. 32, DST execution unit 1 is assigned to process the first through "zth" partial results of task 1_5 to produce the fifth intermediate result (R1-5), which is the list of incorrectly translated words and/or phrases. In particular, the processing module of DST execution 1 is engaged to aggregate the first through "zth" partial results of the list of incorrectly translated words and/or phrases to produce the fifth intermediate result. The processing module stores the fifth intermediate result as non-DS error encoded data in the scratchpad memory or in another section of memory of DST execution unit 1.

DST execution unit 1 engages its DST client module to slice grouping based DS error encode the fifth intermediate result. To begin the encoding, the DST client module partitions the fifth intermediate result (R1-5) into a plurality of partitions (e.g., R1-5_1 through R1-5_z). For each partition of the fifth intermediate result, the DST client module uses the DS error encoding parameters of the data (e.g., DS parameters of data 2, which includes 3/5 decode threshold/ pillar width ratio) to produce slice groupings. The slice groupings are stored in the intermediate result memory (e.g., allocated memory in the memories of DST execution units 1-5 per the DST allocation information).

As is further shown in FIG. 36, the DSTN module is performing task 1_6 (e.g., translation errors due to non-words) on the list of incorrectly translated words and/or phrases (e.g., the fifth intermediate result R1-5) and the list of non-words (e.g., the first intermediate result R1-1). To begin, the DSTN module accesses the lists and partitions them into a corresponding number of partitions.

For each pair of partitions (e.g., partition R1-1_1 and partition R1-5_1), the DSTN identifies a set of its DT execution modules 90 to perform task 1_6 in accordance with the DST allocation information (e.g., DT execution modules 1_1, 2_1, 3_1, 4_1, and 5_1). For each pair of partitions, the allocated set of DT execution modules executes task 1_6 to produce partial results 102 (e.g., 1$^{st}$ through "zth") of a list of incorrectly translated words and/or phrases due to non-words.

As indicated in the DST allocation information of FIG. 32, DST execution unit 2 is assigned to process the first through "zth" partial results of task 1_6 to produce the sixth intermediate result (R1-6), which is the list of incorrectly translated words and/or phrases due to non-words. In particular, the processing module of DST execution 2 is engaged to aggregate the first through "zth" partial results of the list of incorrectly translated words and/or phrases due to non-words to produce the sixth intermediate result. The processing module stores the sixth intermediate result as non-DS error encoded data in the scratchpad memory or in another section of memory of DST execution unit 2.

DST execution unit 2 engages its DST client module to slice grouping based DS error encode the sixth intermediate result. To begin the encoding, the DST client module partitions the sixth intermediate result (R1-6) into a plurality of partitions (e.g., R1-6_1 through R1-6_z). For each partition of the sixth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 2-6 per the DST allocation information).

As is still further shown in FIG. 36, the DSTN module is performing task 1_7 (e.g., correctly translated words and/or phrases) on the list of incorrectly translated words and/or phrases (e.g., the fifth intermediate result R1-5) and the list of unique words (e.g., the second intermediate result R1-2). To begin, the DSTN module accesses the lists and partitions them into a corresponding number of partitions.

For each pair of partitions (e.g., partition R1-2_1 and partition R1-5_1), the DSTN identifies a set of its DT execution modules 90 to perform task 1_7 in accordance with the DST allocation information (e.g., DT execution modules 1_2, 2_2, 3_2, 4_2, and 5_2). For each pair of partitions, the allocated set of DT execution modules executes task 1_7 to produce partial results 102 (e.g., $1^{st}$ through "zth") of a list of correctly translated words and/or phrases.

As indicated in the DST allocation information of FIG. 32, DST execution unit 3 is assigned to process the first through "zth" partial results of task 1_7 to produce the seventh intermediate result (R1-7), which is the list of correctly translated words and/or phrases. In particular, the processing module of DST execution 3 is engaged to aggregate the first through "zth" partial results of the list of correctly translated words and/or phrases to produce the seventh intermediate result. The processing module stores the seventh intermediate result as non-DS error encoded data in the scratchpad memory or in another section of memory of DST execution unit 3.

DST execution unit 3 engages its DST client module to slice grouping based DS error encode the seventh intermediate result. To begin the encoding, the DST client module partitions the seventh intermediate result (R1-7) into a plurality of partitions (e.g., R1-7_1 through R1-7_z). For each partition of the seventh intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 3-7 per the DST allocation information).

In FIG. 37, the distributed storage and task network (DSTN) module is performing task 2 (e.g., find specific words and/or phrases) on the data 92. To begin, the DSTN module accesses the data and partitions it into a plurality of partitions 1-z in accordance with the DST allocation information or it may use the data partitions of task 1_1 if the partitioning is the same. For each data partition, the DSTN identifies a set of its DT execution modules 90 to perform task 2 in accordance with the DST allocation information. From data partition to data partition, the set of DT execution modules may be the same, different, or a combination thereof. For the data partitions, the allocated set of DT execution modules executes task 2 to produce partial results 102 (e.g., $1^{st}$ through "zth") of specific words and/or phrases found in the data partitions.

As indicated in the DST allocation information of FIG. 32, DST execution unit 7 is assigned to process the first through "zth" partial results of task 2 to produce task 2 intermediate result (R2), which is a list of specific words and/or phrases found in the data. The processing module of DST execution 7 is engaged to aggregate the first through "zth" partial results of specific words and/or phrases to produce the task 2 intermediate result. The processing module stores the task 2 intermediate result as non-DS error encoded data in the scratchpad memory or in another section of memory of DST execution unit 7.

DST execution unit 7 engages its DST client module to slice grouping based DS error encode the task 2 intermediate result. To begin the encoding, the DST client module determines whether the list of specific words and/or phrases is of a sufficient size to partition (e.g., greater than a Terabyte). If yes, it partitions the task 2 intermediate result (R2) into a plurality of partitions (e.g., R2_1 through R2_m). If the task 2 intermediate result is not of sufficient size to partition, it is not partitioned.

For each partition of the task 2 intermediate result, or for the task 2 intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-4, and 7).

In FIG. 38, the distributed storage and task network (DSTN) module is performing task 3 (e.g., find specific translated words and/or phrases) on the translated data (R1-3). To begin, the DSTN module accesses the translated data (from the scratchpad memory or from the intermediate result memory and decodes it) and partitions it into a plurality of partitions in accordance with the DST allocation information. For each partition, the DSTN identifies a set of its DT execution modules to perform task 3 in accordance with the DST allocation information. From partition to partition, the set of DT execution modules may be the same, different, or a combination thereof. For the partitions, the allocated set of DT execution modules 90 executes task 3 to produce partial results 102 (e.g., $1^{st}$ through "zth") of specific translated words and/or phrases found in the data partitions.

As indicated in the DST allocation information of FIG. 32, DST execution unit 5 is assigned to process the first through "zth" partial results of task 3 to produce task 3 intermediate result (R3), which is a list of specific translated words and/or phrases found in the translated data. In particular, the processing module of DST execution 5 is engaged to aggregate the first through "zth" partial results of specific translated words and/or phrases to produce the task 3 intermediate result. The processing module stores the task 3 intermediate result as non-DS error encoded data in the scratchpad memory or in another section of memory of DST execution unit 7.

DST execution unit 5 engages its DST client module to slice grouping based DS error encode the task 3 intermediate result. To begin the encoding, the DST client module determines whether the list of specific translated words and/or phrases is of a sufficient size to partition (e.g., greater than a Terabyte). If yes, it partitions the task 3 intermediate result (R3) into a plurality of partitions (e.g., R3_1 through R3_m). If the task 3 intermediate result is not of sufficient size to partition, it is not partitioned.

For each partition of the task 3 intermediate result, or for the task 3 intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-4, 5, and 7).

FIG. 39 is a diagram of an example of combining result information into final results 104 for the example of FIG. 30. In this example, the result information includes the list of specific words and/or phrases found in the data (task 3 intermediate result), the list of specific translated words and/or phrases found in the data (task 3 intermediate result), the list of non-words found in the data (task 1 first intermediate result R1-1), the list of unique words found in the data (task 1 second intermediate result R1-2), the list of translation errors due to non-words (task 1 sixth intermediate result R1-6), and the list of correctly translated words and/or phrases (task 1 seventh intermediate result R1-7). The task distribution module provides the result information to the requesting DST client module as the results 104.

Figure 40A:
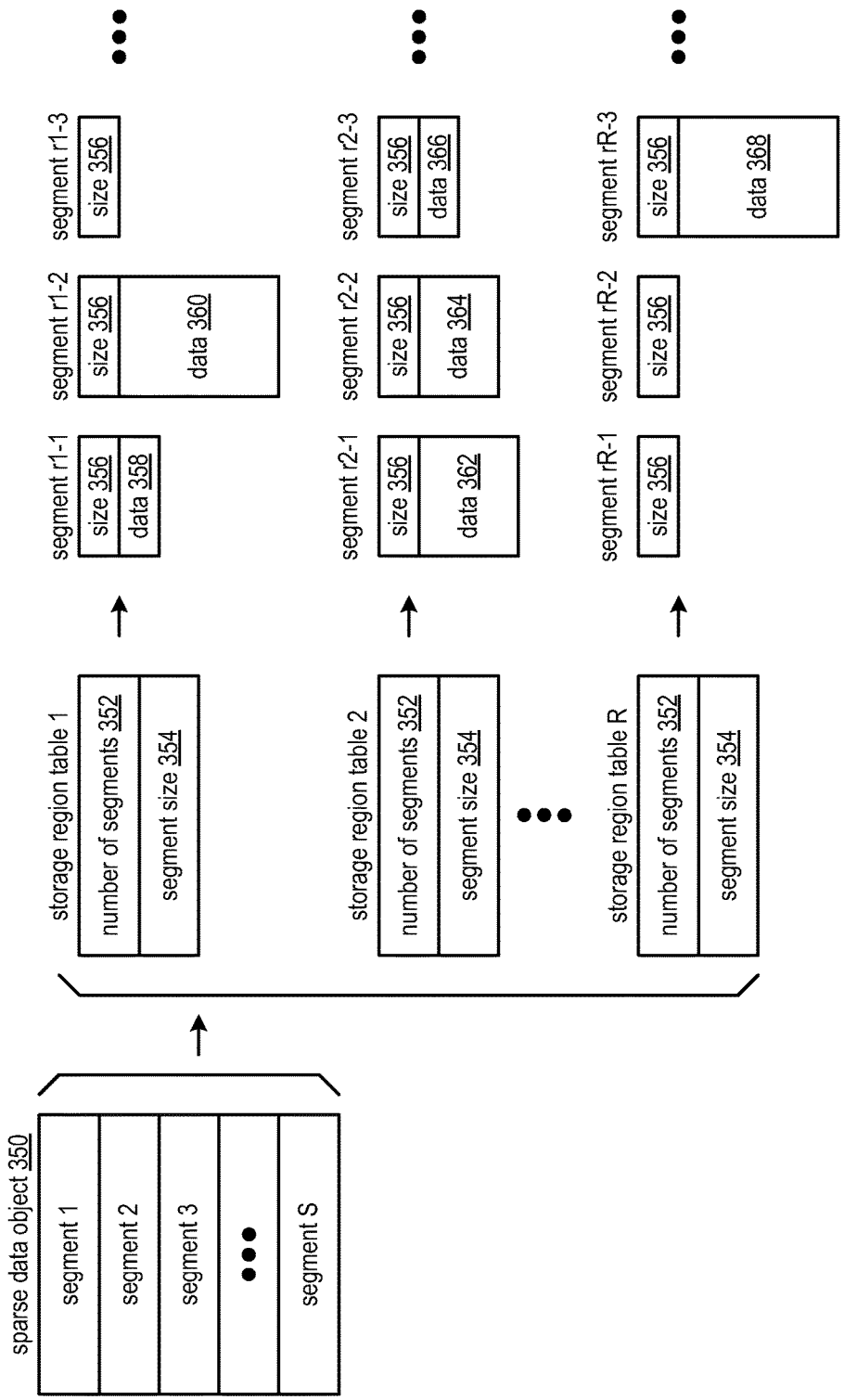
FIG. 40A is a diagram representing an embodiment of a distributed storage data segmentation approach in accordance with the present invention.

FIG. 40A is a diagram representing an embodiment of a distributed storage data segmentation approach that includes a sparse data object 350 that is stored in one or more storage regions of a dispersed storage network (DSN). The sparse data object 350 is partitioned to create a plurality of segments 1-S. Each segment of the plurality of segments 1-S includes one or more of data and null data (e.g., all zeroes, all ones, all a common pattern). For example, a segment includes all null data. As another example, another segment includes 60% data and 40% null data. As yet another example, yet another segment includes all data.

Each of the one or more storage regions includes one or more sequentially ordered storage region segments. For example, a first storage region includes storage region segments r1-1, r1-2, r1-3 etc., a second storage region includes storage region segments r2-1, r2-2, r2-3, etc., a third storage region includes storage region segments r3-1, r3-2, r3-3 etc. Each storage region segment includes a size field 356 and a data field 358, 360, 362, 364, 366, and 368. The size field 356 includes a size entry that indicates a number of bytes included in an entry of the data field. The data field includes a data entry corresponding to data bytes (e.g., not null data) of a corresponding segment of the plurality of segments 1-S. Null data is excluded from the data field entry. The data field entry may be skipped when the corresponding segment includes all null data. The size entry is set to zero when the data field entry is skipped. As an example, a first segment includes 1000 data bytes, a second segment includes 400 data bytes and 600 null data bytes, and a third segment includes 1000 null data bytes when a segment size is 1000 bytes. A first storage region segment is generated to include a size entry of 1000 and a data field entry of the 1000 data bytes, a second storage region segment is generated to include a size entry of 400 and a data field entry of the 400 data bytes, and a third storage region segment is generated to include a size entry of zero and no data field.

At least one of a directory or a dispersed hierarchical index is utilized to associate an identifier of the sparse data object to one or more DSN addresses associated with one or more storage region tables, where each of the one or more storage region tables corresponds to each of the one or more storage regions. Each storage region table of the one or more storage region tables includes a number of segments field 352 and a segment size field 354. The number of segments field 352 includes a number of segments entry which indicates a number of storage region segments of a corresponding one or more sequentially ordered storage region segments of a region associated with the storage region table. For example, the number of segments entry is three when the region includes three storage region segments. The segment size field 354 includes a segment size entry that corresponds to the segment size of each of the plurality of segments 1-S. for example, the segment size entry is 1000 when each segments of the plurality of segments 1-S is 1000 bytes.

Each storage region table may also include a start segment DSN address corresponding to a DSN address of a first storage region segment of the one or more sequentially ordered storage region segments of the region, a segmentation approach (e.g., fixed, variable) of the partitioning of the sparse data object into the plurality of segments 1-S, a total length (e.g., number of bytes included in all data fields of the one or more sequentially ordered storage region segments of the region), and a file offset (e.g., number of bytes and/or number of segments into the sparse data object corresponding to the first storage region segment). Each storage region table may be stored in one or more of a local memory, in a header of the first storage region segment, and as a segment allocation table (SAT) object stored in the DSN memory (e.g., encoded to produce SAT slices, SAT slices stored in a set of dispersed storage (DS) units of a memory of the DSN). The segment size entry may also be stored in a DSN registry for a vault corresponding to one or more of sparse data object, a storing requesting entity, a retrieving requesting entity, an owner of the sparse data object, and a set of user devices associated with the sparse data object. For each of the one or more storage regions, each of the one or more sequentially ordered storage region segments is encoded using a dispersed storage error coding function to produce a set of slices and the set of slices are stored in the memory of the DSN (e.g., sent to the set of DS units for storage therein).

Figure 40B:
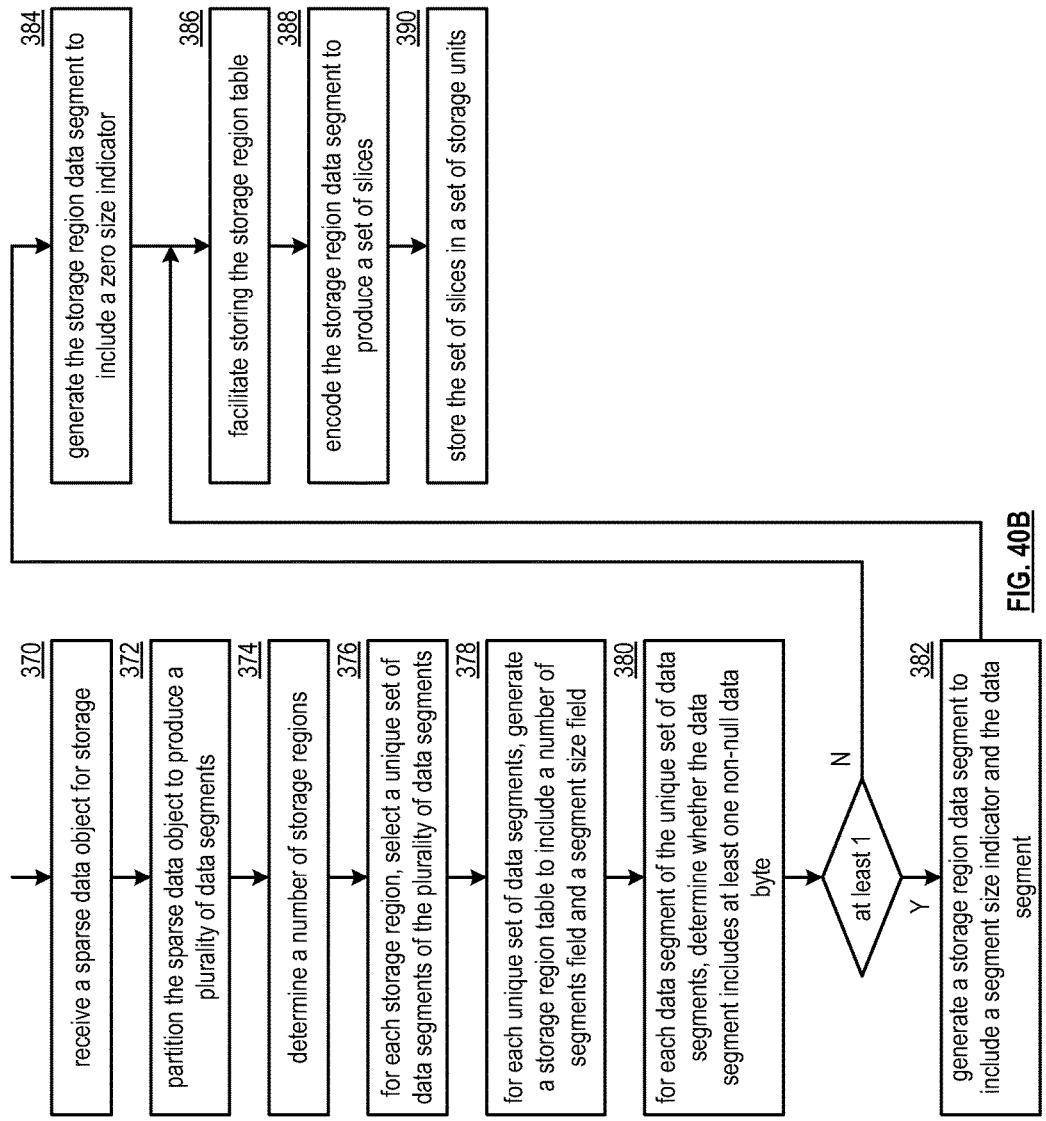
FIG. 40B is a flowchart illustrating an example of storing a sparse data object in accordance with the present invention.

FIG. 40B is a flowchart illustrating an example of storing a sparse data object. The method begins at step 370 where a processing module (e.g., of a distributed storage processing module) receives a sparse data object for storage in a memory of a dispersed storage network (DSN). The method continues at step 372 where the processing module partitions the sparse data object produce a plurality of data segments in accordance with a segmentation scheme. The segmentation scheme includes at least one of a segmentation approach (e.g., fixed segment size, variable segment size, ramping up segment size, ramping down segment size) and a segment size. The processing module may obtain the segmentation scheme from at least one of a retrieval from a registry, initiating a query, receiving the segmentation scheme, and determining the segmentation scheme based on the sparse data object. For example, the processing module partitions the sparse data object to produce 100 data segments, where each data segment is 1 MB when the segment size is 1 MB and the sparse data object includes 100 MB.

The method continues at step 374 where the processing module determines a number of storage regions. The determining may be based on one or more of a predetermination, initiating a query, receiving a response, a data type of the sparse data object, a size of the sparse data object, a number of data bytes of the sparse data object, and a number of null data bytes of the sparse data object. For each storage region, the method continues at step 376 where the processing module selects a unique set of data segments of the plurality of data segments such that the unique set of data segments includes a sequential ordering of data segments when two or more data segments are selected. For each unique set of data segments, the method continues at step 378 where the processing module generates a storage region table to include a number of segments field and a segment size field. The generating includes generating a number of segments entry for the number of segments field to include a number of segments of the unique set of data segments. The generating further includes generating a segment size entry for the segment size field using the segment size of the segmentation scheme.

For each data segment of the unique set of data segments, the method continues at step 380 where the processing module determines whether the data segment includes at least one non-null data byte. The determining may be based on one or more of performing a test, initiating a query, scanning the data segment, comparing each byte of the data segment to a null data byte template set, and receiving a report. For example, the processing module indicates that the data segment includes the at least one non-null data byte when the data segment includes 99% null data bytes and 1% data bytes. The method branches to step 384 when the data segment does not include at least one non-null data byte (e.g., all null data bytes). The method continues to step 382 when the data segment includes the at least one non-null data byte (e.g., at least some data). The method continues at step 382 where the processing module generates a storage region data segment to include a segment size indicator and the data segment when the data segment includes the at least one non-null data byte. The method branches to step 386.

The method continues at step 384 where the processing module generates the storage region data segment to indicate a zero size indicator when the data segment does not include the at least one non-null data byte. The method continues at step 386 where the processing module facilitates storing the storage region table. The facilitating includes at least one of appending the storage region table to a first region data segment, storing the storage region table in a local memory, and storing the storage region table as a storage region table object in the memory of the DSN.

The method continues at step 388 where the processing module encodes the storage region data segment using a dispersed storage error coding function to produce a set of slices. The method continues at step 390 where the processing module stores the set of slices in a set of storage units (e.g., a set of dispersed storage units of the memory of the DSN). The storing includes generating a set of slice names corresponding to the set of slices, generating a set of write slice requests that includes the set of slices and the set of slice names, and outputting the set of write slice requests to the set of storage units.

In an example of a retrieval operation, the processing module, for each storage region, retrieves the unique set of data segments (e.g., issue read slice requests, receive slices, decode slices to reproduce the unique set of data segments). For each retrieved data segment of the unique set of data segments, the processing module extracts the segment size entry from the retrieved data segment. When the segment size entry is zero, the processing module generates a recovered data segment to include all null data bytes based on the segment size of the segmentation scheme. When the segment size entry is not zero, the processing module extracts the recovered data segment from the retrieved data segment. Alternatively, or in addition to, the processing module appends null data bytes to the retrieved data segment to produce the recovered data segment when the segment size entry from the retrieved data segment is less than the segment size of the segmentation scheme. For example, the processing module adds 600,000 null data bytes to 400,000 data bytes of the retrieved data segment to produce the recovered data segment when the segment size entry is 400,000 and the segment size of the segmentation scheme is 1 MB.

FIG. 41A is a diagram representing an example structure of an access control list (ACL) 392. The access control list 392 includes a vault identifier (ID) field 394 and a group permissions field 396. The vault ID field 394 includes a vault configuration field 398 and a vault access field 400. The group permissions field 396 includes one or more group fields (e.g., group 1-group 4). The access control list 392 includes a plurality of entries where each entry identifies certain group permissions (e.g., dispersed storage network (DSN) access permissions) by group and by vault identifier. A vault identifier is associated with a vault which includes a logical container for data stored in a memory of the DSN. A vault is typically associated with a configuration of the vault and access controls of the vault.

For each entry of the access control list, the vault configuration field includes a vault configuration entry of a prefix vault ID that corresponds to a set of configuration parameters of the vault. A range of vault identifiers may share a common vault configuration entry and as such share common configuration parameters. For example, vaults associated with a vault configuration entry of AF123 share the common configuration parameters. The configuration parameters include one or more of a storage pool identifier, a set of storage unit identifiers, an information dispersal algorithm identifier, an encoding matrix, a decoding matrix, a pillar width, a write threshold, a read threshold, and a decode threshold.

For each entry of the access control list, the vault access field includes a vault access entry that corresponds to a range of postfix vault ID values associated with common permissions of the group permissions. Together, the vault configuration entry and the vault access entry form a vault identifier that is associated with the group permissions. The one or more group fields of the group permissions correspond to access permissions for a group of requesting entities affiliated with the group. The access permissions includes individual access permissions for each access type of the DSN including one or more of a read request, a write request, a delete request, a list request, etc. For example, a group 1 may not be allowed to request write access when the DSN accessing includes vault IDs in the range of AF12300000 through AF1238FFFF and is allowed to request write access when the DSN accessing includes vault IDs in the range of EA55500000 through EA5553FFFF.

Figure 41B:
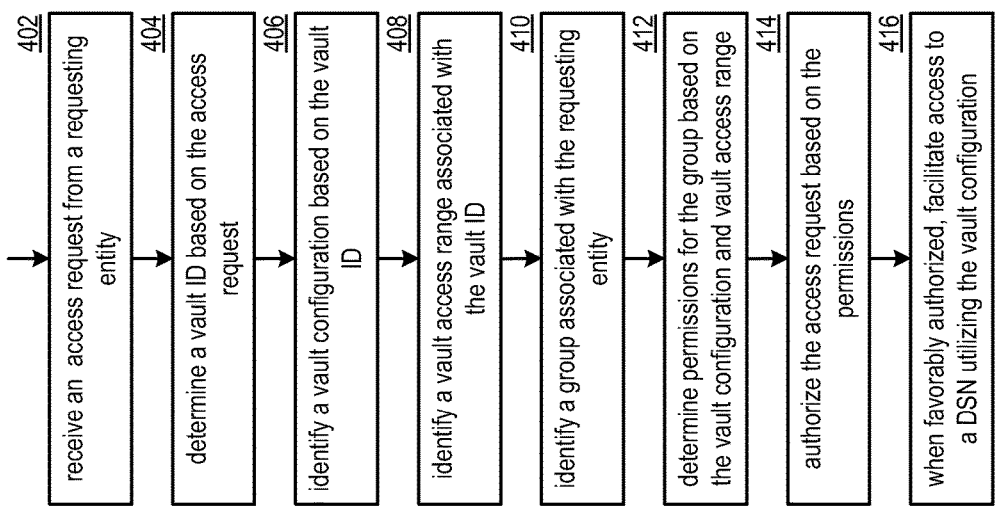
FIG. 41B is a flowchart illustrating an example of controlling access to a dispersed storage network (DSN) in accordance with the present invention.

FIG. 41B is a flowchart illustrating an example of controlling access to a dispersed storage network (DSN). The method begins at step 402 where a processing module (e.g., of a distributed storage processing module) receives an access request from a requesting entity. The access request includes one or more of a requesting entity identifier (ID), a data ID, and a request type. The method continues at step 404 where the processing module determines a vault ID based on the access request. The determining includes accessing at least one of a directory and an index to obtain a vault ID based on the access request (e.g., retrieve a DSN address from the index and extract the vault ID from the DSN address). The method continues at step 406 where the processing module identifies a vault configuration based on the vault ID. The identifying includes partitioning the vault ID to produce a vault configuration field and a vault access field, and performing a vault configuration look up based on an entry of the vault configuration field. For example, the processing module utilizes the vault configuration entry to access a vault configuration table to retrieve configuration parameters for the vault.

The method continues at step 408 where the processing module identifies a vault access range associated with the vault ID. For example, the processing module extracts the vault access range from the vault access field. The method continues at step 410 where the processing module identifies a group associated with requesting entity. The identifying includes at least one of performing a registry lookup using the requesting entity ID, initiating a query, and receiving a group identifier. The method continues at step 412 where the processing module determines permissions for the group based on the vault configuration and the vault access range. The determining includes performing a lookup in an access control list for the group based on the vault ID. Alternatively, the processing module receives permissions from a managing unit.

The method continues at step 414 where the processing module authorizes the access request based on the permissions. The authorizing includes indicating authorized when the permissions compare favorably to the access request. For example, the processing module indicates authorized when the access request includes a write access request and the permissions indicate that the group is authorized to perform the write access request for the vault ID.

When favorably authorized, the method continues at step 416 where the processing module facilitates access to the DSN utilizing the vault configuration (e.g., the configuration parameters). The facilitating includes one or more of executing the request using the configuration parameters, forwarding the request to one or more other executing entities, and issuing a response to the requesting entity based on the execution of the access request. For example, the processing module encodes data of a write access request using a dispersed storage error coding function of the configuration parameters to produce a set of slices and issues a set of write slice requests to a set of dispersed storage units of the configuration parameters where the set of write slice requests includes a set of slices.

Figure 42A:
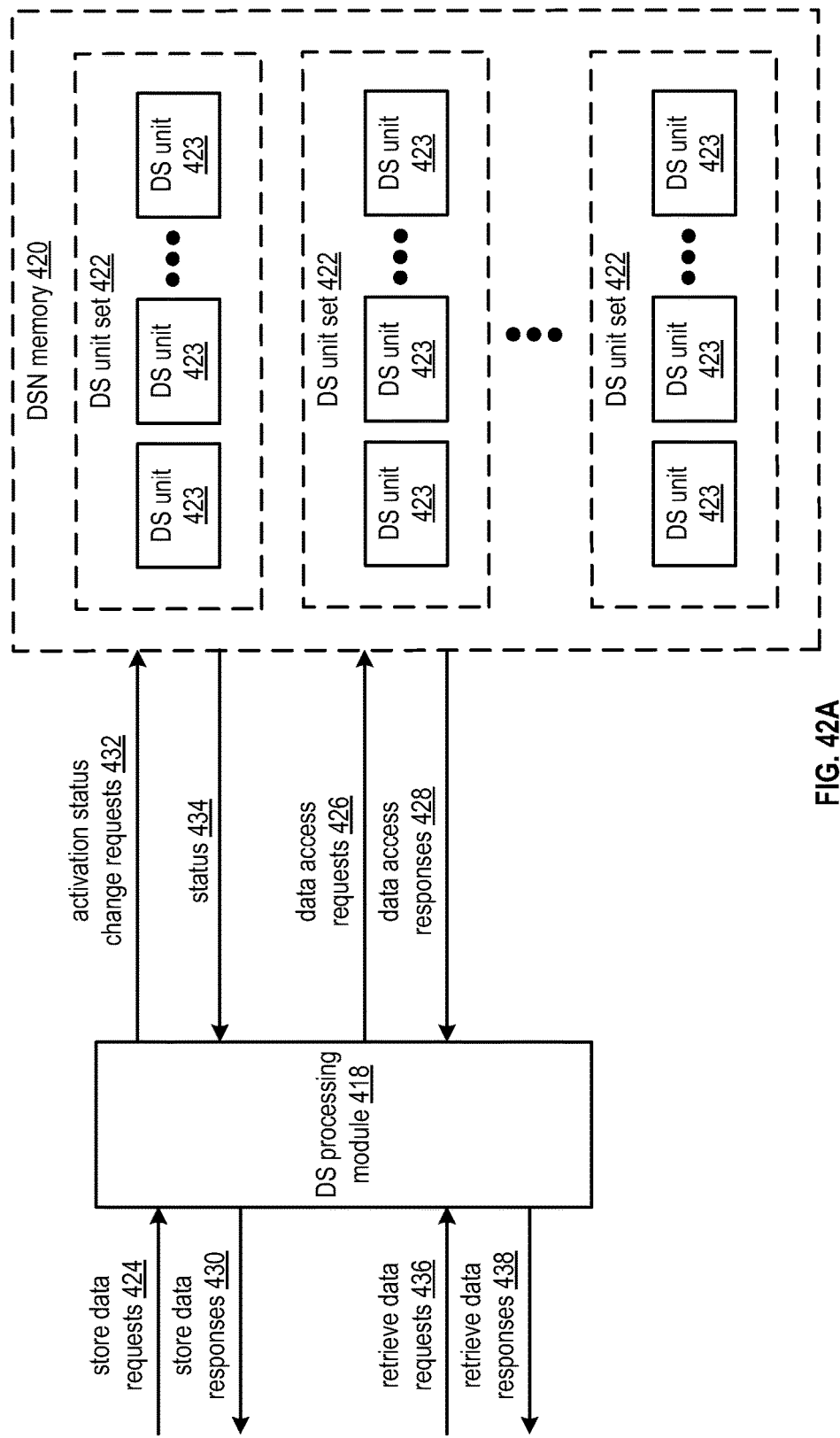
FIG. 42A is a schematic block diagram of an embodiment of a dispersed storage network (DSN) in accordance with the present invention.

FIG. 42A is a schematic block diagram of an embodiment of a dispersed storage network (DSN) that includes at least one dispersed storage (DS) processing module 418 and at least one dispersed storage network (DSN) memory 420. The DSN memory 420 includes a plurality of DS units 423. The DS units 423 may be organized into one or more DS unit set 422. Each DS unit set 422 provides a pool of storage resources accessible by the DS processing module 418. Each DS unit 423 of the plurality of DS units sets may be implemented utilizing one or more of a storage node, a dispersed storage unit, the distributed storage and task (DST) execution unit 36 of FIG. 1, a storage server, a storage unit, a storage module, a memory device, a memory, a user device, a DST processing unit, and a DST processing module. The DS processing module 418 may be implemented by at least one of a server, a computer, a DS unit, a DST execution unit, a user device, a processing module, a DS processing unit, a DST processing module, and the DST processing unit 16 of FIG. 1.

The system functions to store data in the DSN memory 420 in accordance with a power management approach. Each DS unit set 422 of the plurality of DS units sets is activated and deactivated in accordance with the power management approach. Deactivation includes at least one of powering off substantially each DS unit 423 of the DS unit set, powering off more than a decode threshold number of DS units 423 of the DS unit set, suspending operations of at least some of the DS units 423 of the DS unit set, and deactivating internal resources of at least one DS unit 423 of the DS unit set. Activation includes at least one of powering up substantially each DS unit of the DS unit set, powering up more than the decode threshold number of DS units of the DS unit set, resuming operations of at least some of the DS units of the DS unit set, and reactivating previously deactivated internal resources of at least one DS unit of the DS unit set.

The power management approach may be executed in accordance with one or more power management factors. The one or more power management factors include a schedule, a request, and a dynamic operation. The dynamic operation may be based on one or more of real-time power provider costs, status of executing one or more maintenance tasks, status of one or more DS units of the DS unit set, DSN system activity level, a data object access frequency level, a data access latency performance level, a data access latency performance goal, a data security requirement, a number of pending DSN memory requests, a number of pending DSN memory requests goal, a DSN memory power consumption level, a DS unit set power consumption level, a DS unit power consumption level, the DS unit set access bandwidth level, and a DS unit set access latency level. The DS processing module 418 may receive status 434 from the one or more DS units 423 of the DS unit set 422 where the status 434 includes at least one of active, maintenance mode (e.g., executing one or more maintenance tasks), and inactive.

In accordance with the power management approach, the DS processing module 418 receives a plurality of data access requests. The data access requests include store data requests 424 and retrieve data requests 436. For example, the DS processing module 418 receives a store data request 424 to store a data object in at least one DS unit set 422. As another example, the DS processing module 418 receives a retrieve data request 436 to retrieve a previously stored data object from a corresponding DS unit set 422. When a data access request is received, the DS processing module 418 identifies a corresponding DS unit set 422 as an identified DS unit set. The identifying is based on one or more of a requesting entity identifier (ID), a corresponding vault ID, obtaining a data ID associated with the data access request, identifying a source name, identifying at least one set of slice names, identifying a DSN address, identifying a data tag (e.g., a result of performing a deterministic function on the data object) associated with the data access request, accessing a hierarchical dispersed index, accessing a directory, initiating a query, receiving a response, and performing a lookup of a DSN address to physical location table.

The DS processing module 418 determines whether the identified DS unit set 422 is active based on one or more of accessing an activation list, initiating a query, receiving the response, performing a test, and receiving an error message. The DS unit set is active when activated and inactive when deactivated. When the identified DS unit set is active, the DS processing module 418 processes the received data access request including accessing the identified DS unit set 422 and issuing a data access response (e.g., a store data response 430, a retrieve data response 438) to a requesting entity. The accessing the identified DS unit set includes generating one or more data access requests 426 (e.g., generating write slice requests for a store data access request, generating read slice requests for a retrieve data access request), outputting the one or more data access requests 426 to the identified DS unit set 422, and receiving one or more data access responses 428 from the identified DS unit set 422 (e.g., receiving write slice responses for the store data access request, receiving read slice responses for the retrieve data access request and decoding the read slice responses using a dispersed storage error coding function to reproduce data).

The issuing of the data access response includes generating the data access response based on the data access responses from the DS unit set. For example, the DS processing module 418 generates a store data response 430 based on write slice responses for the store data access request 424. As another example, the DS processing module 418 generates a retrieve data response 438 based on read slice responses for the read data access request 436. For instance, the DS processing module 418 generates the retrieve data response 438 to include the reproduced data. When the identified DS unit set is inactive, the DS processing module 418 saves the data access request as a new entry in a request queue. The saving may include identifying a request queue associated with the DS unit set and storing the data access request in the identified request queue associated with the DS unit set.

In accordance with the power management approach, the DS processing module 418, for each DS unit set 422 of the plurality of DS units sets, determines whether to change activation status of the DS unit set based the one or more power management factors. For example, the DS processing module 418 determines to change the activation status of the DS unit set from inactive to active when a number of entries of a request queue associated with the DS unit set is greater than a request queue high threshold. As another example, the DS processing module 418 determines to change the activation status of the DS unit set from active to the inactive when the number of entries of the request queue associated with the DS unit set is less than a request queue low threshold. As yet another example, the DS processing module 418 determines to change the activation status of the DS unit set from active to the inactive when the number of entries of the request queue associated with the DS unit set is less than the request queue high threshold and the DSN memory power consumption level is greater than a power level high threshold.

When changing the activation status, the DS processing module 418 issues an activation status change request 432 to the DS unit set 422. The issuing includes generating the activation status change request 432 and outputting the activation status change request 432 to corresponding DS units 423 of the DS unit set 422. For example, the DS processing module 418 generates an activate status change request when determining to change the activation status of the DS unit set 422 from inactive to active. As another example, the DS processing module 418 outputs a deactivate status change request when determining to change the activation status of the DS unit set from active to inactive.

In accordance with the power management approach, the DS processing module, for each DS unit set 422 of the plurality of DS units sets, processes one or more data access requests from a corresponding request queue for the DS unit set when the DS unit set activation status is active. The processing may include prioritization based on an access request type (e.g., store/retrieve). For example, the DS processing module 418 may prioritize retrieve data access requests ahead of store data access requests to improve read latency performance.

For each DS unit 423 of the DS unit set 422, when an associated status is active and receiving a deactivate request, the DS unit 423 completes execution of any pending data access requests 426, rejects any new data access request 426, issues status 434 to indicate the maintenance mode, and upon completion of the pending data access request, performs a maintenance task set. The maintenance task set includes the one or more maintenance tasks. A maintenance task includes at least one of rebuilding scanning, rebuilding, rebalancing, resource testing, error detection, activity log manipulation, error reporting, and slice migration. The performing of the maintenance task set includes selecting the one or more maintenance tasks and executing the one or more maintenance tasks.

The selecting of the one or more maintenance tasks includes one or more of identifying a desired completion rate of one or more maintenance cycles, for each maintenance cycle, identifying candidate maintenance tasks associated with the maintenance cycle, and selecting the one or more maintenance tasks from the identified candidate maintenance tasks in accordance with the completion rate for each of the one or more maintenance cycles. For example, when receiving the deactivate request, the DS unit 423 completes a retrieve slice request by issuing a data access response 428 that includes an encoded data slice retrieved from a local memory. Next, the DS unit 423 selects a rebuilding scanning maintenance task set in accordance with a schedule. The DS unit 423 initiates execution of the maintenance task set to scan for encoded data slice errors within a next DSN address range assigned to the DS unit. Upon completion of the maintenance task set, the DS unit 423 deactivates DS unit resources. When deactivating, the DS unit 423 issues a status 434 to the DS processing module 418 that includes the inactive status. When completing the deactivating, the DS unit 423 powers down at least some resources of the DS unit 423.

Figure 42B:
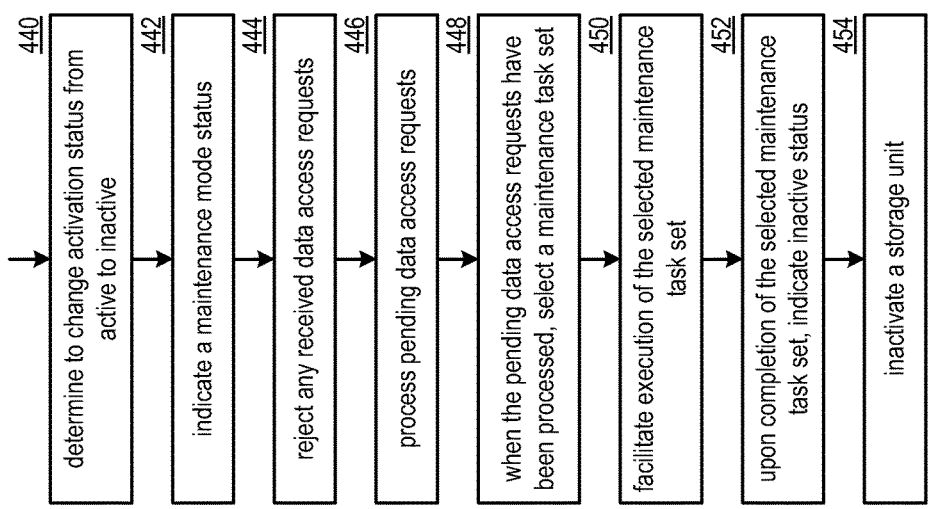
FIG. 42B is a flowchart illustrating an example of processing a maintenance cycle in accordance with the present invention.

FIG. 42B is a flowchart illustrating an example of processing a maintenance cycle. The method begins at step 440 where a processing module (e.g., of a distributed storage processing module) determines to change activation status from active to inactive. The determining may be based on one or more of receiving an activation status change request, a time frame has expired, interpreting a schedule, and detecting an unfavorable power consumption level. The method continues at step 442 where the processing module indicates a maintenance mode status. The indicating includes one or more of issuing a message, modifying a status indicator, and sending a status to a dispersed storage (DS) processing module to indicate maintenance mode. The method continues at step 444 where the processing module rejects any received data access requests. The rejecting includes receiving a new data access request and issuing a data access response that includes a rejection indicator with regards to the new data access request.

The method continues at step 446 where the processing module processes pending data access requests. The processing includes identifying the pending data access requests (e.g., retrieving the pending data access requests from a data access queue, receiving the pending data access requests in response to a query) and executing each of the pending data access requests. When the pending data access requests have been processed, the method continues at step 448 where the processing module selects a maintenance task set. The selecting includes identifying a desired completion rate for one or more maintenance cycles and for each maintenance cycle, identifying maintenance tasks associated with the maintenance cycle.

The method continues at step 450 where the processing module facilitates execution of the selected maintenance task set. For example, the processing module executes a rebuilding scanning task and a rebuilding task when identifying at least one slice error. Upon completion of the selected maintenance task set, the method continues at step 452 where the processing module indicates inactive status. The indicating includes at least one of issuing a status message and modifying a status indicator to indicate inactive status.

The method continues at step 454 where the processing module inactivates a storage unit. The inactivating includes identifying the storage unit based on the determining to change activation status and includes powering down at least one resource of the storage unit. The powering down includes at least one of deactivating power to the at least one resource and issuing a request to another processing module to affect the deactivating of the power.

Figure 43:
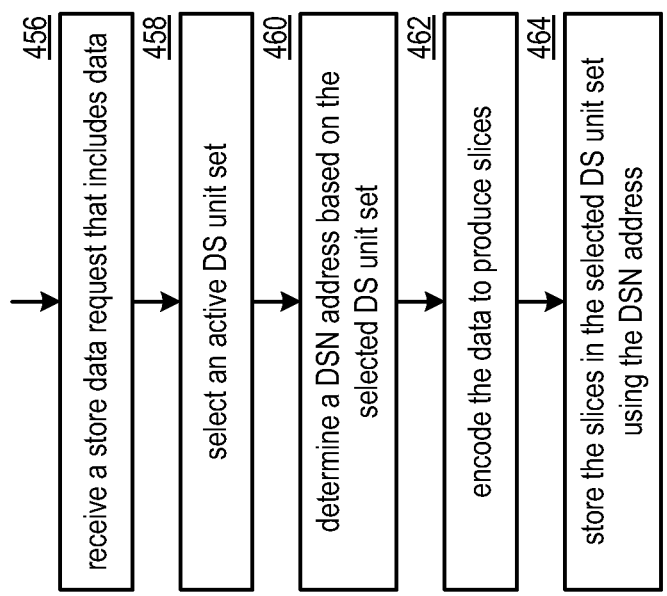
FIG. 43 is a flowchart illustrating an example of storing data in accordance with the present invention.

FIG. 43 is a flowchart illustrating an example of storing data. The method begins at step 456 where a processing module (e.g., of a distributed storage processing module) receives a store data request that includes data. The method continues at step 458 where the processing module selects an active DS unit set. The selecting includes identifying candidate DS units sets and/or candidate memory devices within the candidate DS units sets based on one or more receive status messages, a query, a test, an error message, and a lookup. For example, the processing module performs a lookup to identify the candidate DS unit set associated with an active status.

The method continues at step 460 where the processing module determines a dispersed storage network (DSN) address based on the selected DS unit set. The determining includes at least one of identifying a DSN address range map to the selected DS unit set based on a table lookup and generating the DSN address within the DSN address range. The generating includes selecting an object number such that the DSN address is within the DSN address range, where the DSN address includes a pillar index, a vault identifier, the object number, and a segment number. The method continues at step 462 where the processing module encodes the data using a dispersed storage error coding function to produce slices. For example, the processing module partitions the data to produce a plurality of data segments, and, for each data segment, the processing module encodes the data segment using the dispersed storage error coding function to produce a set of slices. The method continues at step 464 where the processing module stores the slices in the selected DS unit set using the DSN address. The storing includes generating a plurality of sets of slice names based on the DSN address, generating one or more sets of write slice requests that includes the plurality of sets of slice names and a plurality of sets of slices of the slices, and outputting the one or more sets of write slice requests to the selected DS unit set.

FIGS. 44A-C illustrates schematic block diagrams of the embodiments of a dispersed storage (DS) unit set 422 for a rebuilding sequence that includes a plurality of DS units. The DS units may be implemented utilizing the DS unit 423 of FIG. 42A. Each DS unit may store a slice, where data is encoded using a dispersed storage error coding function to produce a set of slices that includes a slice. The encoding with the dispersed storage error coding function is performed in accordance with dispersal parameters 466. The dispersal parameters 466 includes a pillar width, a decode threshold, and a rebuild threshold. The pillar width indicates a maximum number of slices utilized in the dispersed storage error coding function. The decode threshold indicates a minimum number of slices of the set of slices that are required to recover the data. The rebuilding threshold is utilized to determine whether to rebuild one or more slices of the set of slices when at least one slice of the set of slices is associated with a slice error.

The determining includes indicating to rebuild when a number of slices without errors is substantially the same as the rebuild threshold. For example, as illustrated in FIG. 44A, data is encoded to produce a set of six slices that are stored in DS units 1-6 when the pillar width is six. As such, at least four slices of the six slices are required to recover the data when decoding a decode threshold number of retrieved slices using the dispersed storage error coding function to reproduce the data and the decode threshold is four. Rebuilding is initiated when five slices without error available within the DS unit set are detected and the rebuild threshold is five.

To improve one or more factors of availability, reliability, and performance, one or more parameters of the dispersal parameters 466 may be modified. For example, the pillar width may be increased, while maintaining a constant decode threshold, to improve retrieval reliability. As illustrated in FIG. 44B the pillar width has been increased from 6 to 7 and a seventh DS unit (e.g., DS unit 7) has been added to the DS unit set 422. Another slice may be generated from the data for storage in DS unit 7 such that a full pillar width number of 7 slices is available from the DS unit set 422. The generating of the other slice (e.g., a seventh slice) may be initiated immediately upon activation of DS unit 7 or may be initiated as a component of a next rebuilding cycle. The next rebuilding cycle may be initiated when the number of error-free slices of the set of slices is substantially the same as the rebuild threshold. For example, as illustrated in FIG. 44B, rebuilding is initiated when a slice error occurs associated with a third slice associated with DS unit 3 such that five error-free slices (e.g., rebuild threshold number) are available from the DS unit set 422. A resource utilization efficiency may occur when waiting to rebuild the seventh slice along with at least one other slice.

When rebuilding is initiated, slices associated with slice errors are rebuilt including the slice associated with the additional DS unit associated with expansion of the pillar width. For example, as illustrated in FIG. 44C, a rebuilding process is initiated that utilizes a decode number of slices of available slices from DS units 1-2, 4-6 to reproduce the slice associated with DS unit 3 and to generate the slice associated with the additional DS unit 7. When the slice has been generated and stored for the additional DS unit, the rebuild threshold may be modified in accordance with the pillar width of the DS unit set. For example, as illustrated in FIG. 44C the rebuild threshold is modified to six from five when the pillar width is seven and the slice has been stored in the additional DS unit 7.

FIG. 44D is a flowchart illustrating an example of modifying dispersal parameters. The method begins at step 472 where a processing module (e.g., of a distributed storage processing module) determines to expand pillar width (e.g., by one or more) for a dispersed storage (DS) unit set to produce an expanded pillar width. The determining may include detecting a currently unfavorable pillar width. The detecting may be based on one or more of receiving an error message, receiving a manager input, identifying a newly available DS unit, identifying a modified reliability requirement, receiving a request, and detecting an actual reliability level that compares unfavorably with a reliability threshold level. The method continues at step 474 where the processing module activates one or more DS units for the DS unit set. The activating includes at least one of indicating that the one or more DS units are available, storing slices in the one or more DS units when storing data, outputting a message, updating a table, and initiating a power control sequence to supply power to a dormant DS unit.

The method continues at step 476 where the processing module detects that less than or equal to a rebuilding threshold number of slices are available of a set of slices associated with the DS unit set. The detecting includes one or more of identifying slices associated with an error and identifying slices that are error-free. The identifying includes at least one of initiating a test, initiating a query, receiving a response, receiving an error message, and retrieving one or more slices. The detecting further includes indicating that the less than or equal to the rebuilding threshold number of slices are available when detecting that a number of available slices of the set of slices is not greater than the rebuilding threshold. The detecting further includes indicating that the less than or equal to the rebuilding threshold number of slices are available when detecting that a number of slices associated with an error is greater than or equal to a pillar width number minus the rebuilding threshold number.

The method continues at step 478 where the processing module identifies one or more slices to rebuild. The identifying includes at least one of comparing slice lists, verifying slice integrity information, and receiving an error message. The one or more slices to rebuild may include slices associated with the one or more new DS units and slices associated with other DS units of the DS unit set. The method continues at step 480 where the processing module regenerates one or more replacement slices for the identified one or more slices to rebuild. The regenerating includes rebuilding each of the one or more replacement slices based on a decode threshold number available error-free slices of the set of slices. For example, the processing module retrieves the decode threshold number of available error-free slices from the other DS units of the DS unit set, decodes the decode threshold number of available error-free slices using a dispersed storage error coding function to reproduce a data segment, encodes the data segment using the dispersed storage error coding function (e.g., using updated dispersal parameters that includes the expanded pillar width) to produce a new set of slices that includes the one or more replacement slices.

The method continues at step 482 where the processing module determines a new rebuilding threshold based on the expanded pillar width. The determining may be based on one or more of a network activity goal, a rebuilding time delay threshold, a retrieval reliability goal, the rebuilding threshold, a rebuilding threshold goal, and the expanded pillar width. For example, the processing module determines the new rebuilding threshold to be greater than the rebuilding threshold and less than the expanded pillar width.

FIGS. 45A-E are schematic block diagrams of another embodiment of a dispersed storage network (DSN) illustrating prioritizing rebuilding of stored data. The DSN includes a distributed storage and task (DST) execution unit set 490, the network 24 of FIG. 1, and DST client modules 1-2. Alternatively, the DSN may include any number of DST client modules. The DST execution unit set 490 includes a set of DST execution units 1-8. Alternatively, the DST execution unit set 490 may include any number of DST execution units. Each DST execution unit may be implemented utilizing the DST execution unit 36 of FIG. 1. Hereafter, the DST execution unit may be interchangeably referred to as a storage unit of a set of storage units. Each DST execution unit includes a plurality of memories A-B. Each memory may be implemented utilizing the memory 88 of FIG. 3. Each DST client module may be implemented utilizing the DST client module 34 of FIG. 1. Each DST client module includes the outbound dispersed storage (DS) processing module 80 and the inbound DS processing module 82 of FIG. 3.

The DSN functions to store data as stored data, retrieve the stored data, and rebuild the stored data as a consequence of detecting one or more storage errors. As a specific example of storing the data, the DST client module 1 partitions the data into a plurality of data segments, dispersed storage error encodes a data segment to produce a set of encoded data slices that includes a total of "n" encoded data slices (e.g., a width number), and issues a write threshold number of write slice requests to DST execution units 1-8, where the set of write slice requests includes the set of encoded data slices. The write threshold number is greater than or equal to a decode threshold number and less than or equal to the width number "n". For instance, the DST client module 1 partitions data A to produce the plurality of data segments, encodes a first data segment to produce a first set of encoded data slices A1-1, A1-2, A1-3, A1-4, A1-5, A1-6, A1-7, and A1-8, and issues a set of "n" write slice requests to DST execution units 1-8 such that DST execution units 1-8 store corresponding received encoded data slices of the first set of encoded data slices in a corresponding memory A (e.g., DST execution unit 3 stores encoded data slice A1-3 in a memory 3A of DST execution unit 3 etc.).

As a specific example of retrieving the stored data, the DST client module 1 issues a read threshold number of read slice requests to DST execution units 1-8, receives read slice responses, extracts "k" (e.g., the decode threshold) number of encoded data slices of each set of encoded data slices, and dispersed storage error decodes each decode threshold number of encoded data slices to reproduce each data segment of the plurality of data segments. The "k" number is a minimum number of encoded data slices that are needed to reconstruct the data segment. The read threshold number is greater than or equal to the decode threshold number and less than or equal to the width number "n".

As a specific example of the rebuilding of the stored data, the DST client module 2 detects the one or more storage errors, determines a level of rebuilding urgency, and establishes a rebuilding mode. A storage error includes at least one of a missing encoded data slice of the set of encoded data slices and a corrupted encoded data slice of the set of encoded data slices. The level of rebuilding urgency includes at least one of a critical level of rebuilding urgency and a normal level of rebuilding urgency (e.g., a normal rebuilding level). The rebuilding mode includes at least one of a normal rebuilding mode, a prioritized rebuilding mode, and a critical rebuilding mode. Each of the detecting of the storage errors, determining the level of rebuilding urgency, and establishing the rebuilding mode is discussed in greater detail with reference to FIGS. 45A-F.

Each of the outbound DS processing module 80, the inbound DS processing module 82, and the DST execution unit may include further modules. For example, the outbound DS processing module 80, the inbound DS processing module 82, and the DST execution unit provide a first module, a second module, a third module, a fourth module, etc. to facilitate the storing of the data, the retrieving of the data, and the rebuilding of the stored data.

FIG. 45A illustrates an example of the detecting of the one or more storage errors to establish the rebuilding mode and the determining of the level of rebuilding urgency. In an example of operation of the detecting of the one or more storage errors, the first module, when operable within the inbound DS processing module 82 of the DST client module 2, causes the inbound DS processing module 82 to issue a set of list slice requests 492, via the network 24, to the set of DST execution units 1-8. Each list slice request 492 includes one or more DSN address ranges associated with sets of encoded data slices stored by the set of DST execution units 1-8. For example, the inbound DS processing module 82 issues a list slice request 492 that includes a DSN address range for encoded data slices stored in memory A and another DSN address range for encoded data slices stored in memory B.

Having issued the list slice request 492, each DST execution unit issues, via the network 24, a corresponding list slice response of a set of list slice responses 494 to the inbound DS processing module 82. The DST execution unit generates the list slice response 494 to include a list of slice names of error-free encoded data slices stored within a memory of the DST execution unit. As a specific example, DST execution unit 5 generates list slice response 5 to list encoded data slices A1-5, A2-5, etc. and encoded data slices B1-5, B2-5, etc. when such encoded data slices are stored without error (e.g., a comparison of a stored integrity value of an encoded data slice to a calculated integrity value of the encoded data slice indicates no corruption error). As another example, DST execution unit 4 generates list slice response 4 to list encoded data slices A1-4, A3-4, [not A2-4] etc. and encoded data slices B1-4, B2-4, etc. when encoded data slices A1-4, A3-4 etc. and B1-4, B2-4, etc. are stored without error and encoded data slice A2-4 is associated with the storage error. The DST execution unit 4 excludes listing encoded data slice A2-4 when detecting the missing encoded data slice error or the corruption error. For instance, the DST execution unit 4 indicates the corruption error when an unfavorable comparison (e.g., not substantially the same) is detected between a stored integrity value of encoded data slice A2-4 and a calculated integrity value of encoded data slice A2-4. As yet another specific example of the DST execution unit generating the list slice response 494, the DST execution unit 7 generates list slice response 7 to list encoded data slices A1-7, A2-7, etc. stored within memory 7A, and does not list any encoded data slices associated with memory 7B (e.g., encoded data slices B1-7, B2-7, etc.) when memory 7B is unavailable (e.g., off-line), failing or has failed and encoded data slices A1-7, A2-7, etc. are available from memory 7A. Having detected a storage error, the inbound DS processing module 82 establishes the rebuilding mode.

In an example of operation of the determining of the level of rebuilding urgency, the first module, when operable within the inbound DS processing module 82 of the DST client module 2, causes the inbound DS processing module 82 to, when in the rebuilding mode, determine the level of rebuilding urgency, where the level of rebuilding urgency is based on an inversely proportional function of a level of error encoded redundancy for error encoded data giving rise to the rebuilding mode. As a specific example of determining the level of rebuilding urgency, for a set of encoded data slices of the error encoded data giving rise to the rebuilding mode, the inbound DS processing module 82 of the DST client module 2 determines a data reconstruction margin, where "a" represents a number of available and error-free encoded data slices of the "n" encoded data slices, and the data reconstruction margin is a difference between the "a" available and error-free encoded data slices and the "k" encoded data slices that are needed to reconstruct the data segment. For instance, the inbound DS processing module 82 determines the data reconstruction margin for the first set of encoded data slices stored in the set of memory devices 1A-8A to be 8−5=3, when k=5 and each of the set of encoded data slices are available. As another instance, the inbound DS processing module 82 determines the data reconstruction margin for the second set of encoded data slices stored in the set of memory devices 1A-8A to be 7−5=2, when k=5 and seven of the eight encoded data slices are available. As yet another instance, the inbound DS processing module 82 determines the data reconstruction margin for a first set of encoded data slices stored in the set of memory devices 1B-8B to be 6−5=1, when k=5 and six of the eight encoded data slices are available.

Having determined the data reconstruction margin, the inbound DS processing module 82 determines whether the data reconstruction margin is at or below a critical threshold. For example, the inbound DS processing module 82 indicates that the data reconstruction margin is at or below the critical threshold when the data reconstruction margin is 1 and the critical threshold is 1. As another example, the inbound DS processing module 82 indicates that the data reconstruction margin is not at or below the critical threshold when the data reconstruction margin is 2 or 3. When the inbound DS processing module 82 determines that the data reconstruction margin is at or below the critical threshold, the inbound DS processing module 82 determines the level of rebuilding urgency is at or above the critical level.

As another specific example of the determining of the level of rebuilding urgency, when in the rebuilding mode, the inbound DS processing module 82, for the set of encoded data slices of the error encoded data giving rise to the rebuilding mode, determines "f" number of encoded data slices of the set of encoded data slices that are inaccessible (e.g., unavailable). For instance, the inbound DS processing module 82 determines that f=2 encoded data slices of the set of encoded data slices are inaccessible for the first set of encoded data slices stored in the set of memories 1B-8B (e.g., encoded data slice B1-3 and encoded data slice B1-7). For each of the "f" number of inaccessible encoded data slices, the inbound DS processing module 82 determines a nature for the inaccessibility (e.g., encoded data slice B1-3 is corrupted and encoded data slice B1-7 is unavailable due to a failure of memory 7B based on interpreting list slice response 7 and/or interpreting an error message from DST execution unit 7).

Having determined the nature for the inaccessibility, the inbound DS processing module 82 determines the level of urgency based on a collection of the nature of inaccessibility and on quantity of the "f" number of inaccessible encoded data slices. For instance, the inbound DS processing module 82 determines the level of rebuilding urgency to be the critical level when any of the inaccessible encoded data slices is associated with a nature of inaccessibility associated with a memory failure. As another instance, the inbound DS processing module 82 determines the level of rebuilding urgency to be the normal level when the one of the inaccessible encoded data slices is associated with the nature of inaccessibility associated with the memory failure and the quantity of inaccessible encoded data slices "f" is less than a threshold number.

As yet another specific example of the determining of the level of rebuilding urgency, when in the rebuilding mode, the inbound DS processing module 82, for the set of encoded data slices of the error encoded data giving rise to the rebuilding mode, determines "f" number of encoded data slices of the set of encoded data slices that are inaccessible due to memory device failures (e.g., failed or failing). For instance, the inbound DS processing module 82 determines that f=1 encoded data slice of the set of encoded data slices are inaccessible due to memory device 7B failure for the first set of encoded data slices stored in the set of memories 1B-8B (e.g., encoded data slice B1-7). Having determined the "f" number of encoded data slices that are inaccessible due to the memory device failures, the inbound DS processing module 82 determines that the level of rebuilding urgency is the critical level when the "f" number of inaccessible encoded data slices is at or above a critical number for the set of encoded data slices. For instance, the inbound DS processing module 82 determines that the level of rebuilding urgency is the critical level when detecting 1 inaccessible encoded data slice and the critical number is 1.

FIG. 45B illustrates an example of the establishing of the rebuilding mode. As a specific example of operation of the establishing of the rebuilding mode, the second module, when operable within the inbound DS processing module 82 of the DST client module 2, causes the inbound DS processing module 82 to place the set of storage units (e.g., the DST execution unit set 490) of the DSN in the critical rebuilding mode when the level of rebuilding urgency is at or above the critical level. When in the critical rebuilding mode, the set of storage units prioritize rebuilding of the error encoded data giving rise to the rebuilding mode over other error encoded data operations (e.g., non-rebuilding operations including writing, reading, listing, and deleting for non-rebuilding operations).

As another specific example, the inbound DS processing module 82 places the set of storage units of the DSN in the normal rebuilding mode when the level of rebuilding urgency is at or below the normal rebuilding level (e.g., similar priority for rebuilding and the other error encoded data operations). As yet another specific example, the inbound DS processing module 82 places the set of storage units of the DSN in the prioritized rebuilding mode when the level of rebuilding urgency is above the normal rebuilding level and below the critical rebuilding level. When in the prioritized rebuilding mode, the set of storage units prioritize rebuilding of the error encoded data giving rise to the rebuilding mode over at least one of the other error encoded data operations.

Having placed the set of storage units in at least one of the critical rebuilding mode, the prioritized rebuilding mode, and the normal rebuilding mode, the inbound DS processing module 82 issues access priority information 496 to one or more of the DST execution unit set 490 and other modules of the DSN. As a specific example, the inbound DS processing module 82 generates the access priority information 496 to include an indication of at least one of the critical rebuilding mode, the prioritized rebuilding mode, and the normal rebuilding mode, and outputs the access priority information 496 to the outbound DS processing module 80 of the DST client module 2 and sends the access priority information 496, via the network 24, to each DST execution unit 1-8. Alternatively, or in addition to, the inbound DS processing module 82 sends the access priority information 496 to the DST client module 1. Further alternatively, or further in addition to, the inbound DS processing module 82 publishes the access priority information 496 to substantially all elements of the DSN.

FIG. 45C illustrates another example of the establishing of the rebuilding mode. In particular, as an example of the placing the set of storage units of the DSN in the critical rebuilding mode, the second module, when operable within at least one of the outbound DS processing module 80 of the DST client module 2 and the DST execution unit, causes the at least one of the outbound DS processing module 80 of the DST client module 2 and the DST execution unit to perform one or more of rejecting read requests regarding other error encoded data stored in the set of storage units, rejecting write requests regarding the other error encoded data stored in the set of storage units, and rejecting inquiry requests regarding the other error encoded data stored in the set of storage units. As a specific example, the outbound DS processing module 80 of the DST client module 2 rejects read requests, write requests, and inquiry requests with regards to the other error encoded data not associated with the error encoded data giving rise to the rebuilding mode when the set of storage units is in the critical rebuilding mode.

As another specific example, the DST client module 1 issues access slice requests 498 to the set of storage units, where the access slice requests 498 includes at least one of a read slice request, a write slice request, a delete slice request, and a list slice request (e.g., an inquiry request for a slice). The DST execution unit 5 rejects a corresponding access slice request 498 when in the critical rebuilding mode by issuing an access slice response 500 to the DST client module 1 indicating that the access slice request 498 has been rejected.

As another example of the placing the set of storage units of the DSN in the critical rebuilding mode, the second module, when operable within at least one of the outbound DS processing module 80 of the DST client module 2 and the DST execution unit, causes the at least one of the outbound DS processing module 80 of the DST client module 2 and the DST execution unit to perform one or more of identifying an address range in which the error encoded data giving rise to the rebuilding mode lies to produce an affected address range, rejecting access requests to other error encoded data stored in the affected address range, and processing normally access requests to other data stored in other address ranges. As a specific example, the outbound DS processing module 80 of the DST client module 2 identifies a slice name range associated with encoded data slices stored in the set of memory devices 1B-8B, rejects access requests to any other error encoded data associated with the identified slice name range, and proceeds with access slice requests 498 for other data stored in one or more slice name ranges associated with the set of memory devices 1A-8A.

As yet another specific example, the DST client module 1 issues the access slice request 498 to the set of storage units for data stored in the identified slice name range. The DST execution unit 5 rejects the corresponding access slice request 498 when in the critical rebuilding mode by issuing the access slice response 500 to the DST client module 1 indicating that the access slice request 498 has been rejected when a slice name of the access slice request 498 falls within the identified slice name range (e.g., for encoded data slices stored in the set of memory devices 1B-8B such as encoded data slice B2-5). As a still further specific example, the DST client module 1 issues the access slice request 498 to the set of storage units for the other data stored in another address range (e.g., for encoded data slices stored within the set of memory devices 1A-8A such as encoded data slice A1-5). The DST execution unit 5 processes the access slice request 498 normally (e.g., perform a read operation, a write operation, a delete operation, a list operation that is not associated with rebuilding) and issues a corresponding access slice response 500 to the DST client module 1 (e.g., to include a corresponding encoded data slice for a read operation such as encoded data slice A1-5, to include a write operation status for a write operation, etc.)

FIG. 45D illustrates yet another example of the establishing of the rebuilding mode. In particular, as an example of the placing the set of storage units of the DSN in the critical rebuilding mode, the second module, when operable within the inbound DS processing module 82 of the DST client module 2, causes the inbound DST processing module 82 to, for the "f" number of inaccessible encoded data slices, initiate a rebuilding process to produce "f" number of rebuilt encoded data slices.

As a specific example of the initiating of the rebuilding process, the inbound DS processing module 82, for the set of encoded data slices associated with the storage error, issues at least a decode threshold number of rebuild slice requests 502 to DST execution units associated with storage of error-free encoded data slices of the set of encoded data slices. Each rebuild slice request 502 includes an indicator for a read slice for a rebuilding request. For instance, the inbound DS processing module 82 issues a rebuild slice requests 502 to DST execution units 1, 2, 4, 5, 6, and 8 when DST execution units 1, 2, 4, 5, 6, and 8 are not associated with the storage errors. At least some of the DST execution units issue rebuild slice responses 504, where the rebuilt slice responses 504 includes other encoded data slices of the set of encoded data slices associated with the storage errors. When the inbound DS processing module 82 receives a decode threshold number of favorable rebuild slice responses 504, the inbound DS processing module 82 dispersed storage error decodes a decode threshold number of received encoded data slices of the set of encoded data slices to produce a recovered data segment 506. For instance, the inbound DS processing module 82 dispersed storage error decodes the received encoded data slices B1-1, B1-2, B1-4, B1-5, and B1-6 to produce the recovered data segment 506.

FIG. 45E illustrates a further example of the establishing of the rebuilding mode. In particular, as an example of the placing the set of storage units of the DSN in the critical rebuilding mode, the second module, when operable within the outbound DS processing module 80 of the DST client module 2, causes the outbound DST processing module 80 to complete the rebuilding process to produce the "f" number of rebuilt encoded data slices for the "f" number of inaccessible encoded data slices and to identify new storage locations for the "f" number of rebuilt encoded data slices. As a specific example, the outbound DS processing module 80 dispersed storage error encodes the recovered data segment 506 to produce a reproduced set of encoded data slices that includes the "f" number of rebuilt encoded data slices. For instance, the outbound DS processing module 80 dispersed storage error encodes the recovered data segment 506 to produce rebuilt encoded data slices B1-3 and B1-7.

Having produced the "f" number of rebuilt encoded data slices, the outbound DS processing module 80 identifies the storage locations for the "f" number of rebuilt encoded data slices. As a specific example, the outbound DS processing module 80 identifies previous storage locations for each of the "f" number of rebuilt encoded data slices when the previous storage locations are available. For instance, the outbound DS processing module 80 selects the memory 3B of the DST execution unit 3 for storage of rebuilt encoded data slice B1-3 and selects the memory 7B of the DST execution unit 7 for storage of rebuilt encoded data slice B1-7 when the memory 7B is available (e.g., online, repaired, replaced). As another specific example, the outbound DS processing module 80 identifies a different storage location for at least one of the rebuilt encoded data slices when the previous storage location is not available. For instance, the outbound DS processing module 80 selects the memory 7A of the DST execution unit 7 for storage of the rebuilt encoded data slice B1-7 when the memory 7B is not available and the memory 7A is available.

Having identified the storage locations, the outbound DS processing module 80 issues rebuild slice requests 502 to DST execution units associated with the identified storage locations. The rebuilt slice request 502 includes one or more of a write slice request for a rebuilding function indicator, a corresponding rebuilt encoded data slice, and a slice name corresponding to the rebuilt encoded data slice. For instance, the outbound DS processing module 80 issues the rebuild slice request 502 to DST execution unit 3, where the rebuilt slice request 502 includes the rebuilt encoded data slice B1-3.

Alternatively, or in addition to, when confirming storage of substantially all of the rebuilt encoded data slices, the DST client module 2 reestablishes the normal rebuilding mode. For example, the DST client module 2 issues access priority information 496 to modules of the DSN, where the access priority information 496 indicates the normal rebuilding mode.

FIG. 45F is a flowchart illustrating an example of prioritizing rebuilding of stored data. The method begins at step 510 where a processing module (e.g., a distributed storage and task (DST) client module of a dispersed storage network (DSN)) detects a storage error to establish a rebuilding mode. The detecting may be based on one or more of receiving an error message, detecting a missing encoded data slice, and detecting a corrupted encoded data slice. The method continues at step 512 where the processing module, when in the rebuilding mode, determines a level of rebuilding urgency, where the level of rebuilding urgency is based on an inversely proportional function of a level of error encoded redundancy for error encoded data giving rise to the rebuilding mode. The rebuilding urgency includes a normal level, a prioritized level, and a critical level.

As a specific example, for a set of encoded data slices of the error encoded data giving rise to the rebuilding mode, the processing module determines a data reconstruction margin, where a data segment of data is encoded to produce the set of encoded data slices that includes a total of "n" encoded data slices, where "k" is a minimum number of encoded data slices that are needed to reconstruct the data segment, where "a" represents a number of available and error-free encoded data slices of the "n" encoded data slices, and where the data reconstruction margin is a difference between the "a" available and error-free encoded data slices and the "k" encoded data slices that are needed to reconstruct the data segment. When the data reconstruction margin is at or below a critical threshold, the processing module determines the level of rebuilding urgency is at or above the critical level. When the data reconstruction margin is above the critical threshold, the processing module determines whether the level of rebuilding urgency is at the prioritized or normal urgency level. The processing module indicates the prioritized urgency level when the data reconstruction margin is above the critical threshold and at or below a normal level. The processing module indicates the normal urgency level when the data reconstruction margin is above the normal level.

As another specific example of the determining of the level of rebuilding urgency, for the set of encoded data slices of the error encoded data giving rise to the rebuilding mode, the processing module determines "f" number of encoded data slices of the set of encoded data slices that are inaccessible. For each of the "f" number of inaccessible encoded data slices, the processing module determines a nature for the inaccessibility. Based on a collection of the nature of inaccessibility and on quantity of the "f" number of inaccessible encoded data slices, the processing module determines the level of urgency.

As yet another specific example of the determining of the level of rebuilding urgency, for the set of encoded data slices of the error encoded data giving rise to the rebuilding mode, the processing module determines "f" number of encoded data slices of the set of encoded data slices that are inaccessible due to memory device failures (e.g., failed or failing). When the "f" number of inaccessible encoded data slices is at or above a critical number for the set of encoded data slices, the processing module determines that the level of rebuilding urgency is the critical level. The method branches to step 514 when the processing module determines the normal level of rebuilding urgency. The method branches to step 516 where the processing module determines the prioritized level of rebuilding urgency. The method continues to step 518 when the processing module determines the critical level.

The method continues at step 514 where the processing module places a set of storage units of the DSN in a normal rebuilding mode when the level of rebuilding urgency is at or below the normal rebuilding level. The method continues at step 516 where the processing module places the set of storage units of the DSN in a prioritized rebuilding mode when the level of rebuilding urgency is above the normal rebuilding level and below the critical rebuilding level. When in the prioritized rebuilding mode, the set of storage units prioritize rebuilding of the error encoded data giving rise to the rebuilding mode over at least one of other error encoded data operations.

The method continues at step 518 where the processing module places the set of storage units of the DSN in a critical rebuilding mode when the level of rebuilding urgency is at or above the critical level. When in the critical rebuilding mode, the set of storage units prioritize rebuilding of the error encoded data giving rise to the rebuilding mode over the other error encoded data operations. When determining the "f" number of encoded data slices of the set of encoded data slices that are inaccessible, the method continues at step 520 where the processing module, for the "f" number of inaccessible encoded data slices, initiates a rebuilding process to produce "f" number of rebuilt encoded data slices. The method continues at step 522 where the processing module stores the rebuilt encoded data slices at the identified new storage locations. The storing may include the processing module identifying new storage locations for the "f" number of rebuilt encoded data slices. The method branches to step 530 when the processing module places the set of storage units in the critical rebuilding mode by memory device. The method continues to step 524 when the processing module places the set of storage units in the critical rebuilding mode by storage unit.

When the processing module places the set of storage units in the critical rebuilding mode by storage unit, the method continues at step 524 where the processing module rejects read requests regarding other error encoded data stored in the set of storage units. The method continues at step 526 where the processing module rejects write requests regarding the other error encoded data stored in the set of storage units. The method continues at step 528 where the processing module rejects query requests regarding the other error encoded data stored in the set of storage units.

When the processing module places the set of storage units in the critical rebuilding mode by memory device, the method continues at step 530 where the processing module identifies an address range in which the error encoded data giving rise to the rebuilding mode lies to produce an affected address range (e.g., slice name range associated with storage errors). The method continues at step 532 where the processing module rejects access requests to other error encoded data stored in the affected address range. The method continues at step 534 where the processing module processes normally access requests to other data stored in other address ranges.

FIG. 46A is a schematic block diagram of an embodiment of a storage device set 540 that includes a set of storage devices. The storage device may be implemented with the distributed storage and task (DST) execution unit 36 of FIG. 1. Each storage device of the set of storage devices includes a controller and memory for storage of one or more of data blocks and error information. The controller includes at least one of a computing device, a computing core, a processing module, a computing cluster, and multiple computing cores. The memory includes one or more of a memory module and one or more memory devices. Each memory device of the one or more memory devices includes at least one of solid-state memory, optical memory, and magnetic memory.

The storage device set is operable to store a plurality of data blocks (e.g., B blocks each) on each of a subset of T storage devices and to store a plurality of corresponding error information blocks (e.g., B blocks each) on each of the remaining subset of R storage devices. For example, as illustrated, data blocks 1-1 through 1-B are stored on a storage device d1 which includes controller d1, data blocks 2-1 through 2-B are stored on a storage device d2 which includes controller d2, through data blocks T-1 through T-B are stored on a storage device dT which includes controller dT, and error information blocks 1-1 through 1-B are stored on a storage device r1 which includes controller r1, through error information blocks R-1 through R-B are stored on a storage device rR which includes controller rR.

Each storage device of the subset of storage devices generates error information based on a corresponding plurality of data blocks and outputs the error information to the remaining subset of storage devices. Each storage device of the remaining subset of storage devices processes the error information from each of the storage devices of the subset of storage devices to produce corresponding error information blocks for storage in the storage device. For example, storage device d1 generates error information 1, with regards to each data block of the plurality of data blocks 1-1 through 1-B, for each storage device of the remaining subset of storage devices. As a specific example, storage device d1 generates a partial slice based on data block 1-1 with regards to error information block 1-1 and generates partial slices based on data block 1-1 for each other remaining storage device of the subset of remaining storage devices through storage device rR.

In an example of operation, a role is determined for each storage device information of the storage device set 540 where the role includes one of a data storing device and a redundancy error information storing device. The determining may be implemented by one or more of a storage device of the storage device set, a dispersed storage (DS) processing module, and a distributed storage and task (DST) processing module. The determining may include one or more of receiving a request, initiating a query, receiving a query response, identifying storage devices that are storing data, and identifying an unmet data storage reliability requirement. When receiving a determined role, each storage device associated with a data storage device organizes a common locally stored data as a common number of data blocks of a common length. For example, each data storage device organizes data into 1000 data blocks where each data block is one megabyte. Each data storage device obtains error coding information by at least one of generating based on available storage devices, a predetermination, and receiving. The error coding information includes one or more of a pillar width, a decode threshold, an encoding matrix, a partial slice generation matrix, and a partial slice generation participant list of a decode threshold number of data storage devices of the subset of storage devices.

For each data block of the common number of data blocks, each data storage device generates, for each redundancy error information storing device, a zero information gain (ZIG) partial slice to contribute to generating an error information block of the redundancy error information storing device. The generating is based on identity of the error information block, the data block, and the error coding information. The generating the ZIG partial slice includes one or more of obtaining the encoding matrix e (e.g., extract from the error coding information), reducing the encoding matrix to produce a square matrix that exclusively includes rows identified in the error coding information (e.g., slice pillars associated with the participant list of the decode threshold number of data storage devices of the subset of storage devices), inverting the square matrix to produce an inverted matrix (e.g., alternatively, may extract the inverted matrix from the error coding information), matrix multiplying the inverted matrix by the data block to produce a vector, and matrix multiplying the vector by a row of the encoding matrix corresponding to the error information block to produce the ZIG partial slice. The data storage device outputs the ZIG partial slice to the redundancy error information storing device as error information.

For each error information block, the redundancy error information storing device extracts a decode threshold number of corresponding ZIG partial slices from error information received from each data storage device. The redundancy error information storing device decodes (e.g., performs an exclusiveOR function) the decode threshold number of corresponding ZIG partial slices to produce the error information block for storage within the redundancy error information storing device. For example, the redundancy error information storing device r1 performs the exclusiveOR function on ZIG partial slices with regards to error information block 1-1 for data blocks 1-1, 2-1, 3-1, 4-1 to produce the error information block 1-1 when the decode threshold number is 4.

The system facilitates error recovery when one or more data blocks of a corresponding set of data blocks is unavailable. To recover the one or more unavailable data blocks, a decode threshold number of data blocks of the corresponding set of data blocks is utilized to reproduce the one or more unavailable data blocks. For example, when data block 3-2 is unavailable, data blocks 1-2, 2-2, 4-2 and error information block 1-2 is decoded using a dispersed storage error coding function to reproduce a data segment that is encoded using the dispersed storage error coding function to reproduce unavailable data block 3-2.

FIG. 46B is a flowchart illustrating an example of modifying storage of previously stored data. The method begins at step 542 where a processing module (e.g., of a dispersed storage (DS) processing module of a storage device) determines to form a storage device set with regards to locally stored data, where the storage device set includes a decode threshold number of data storage devices and a pillar width minus the decode threshold number of redundancy error information storing devices. The determining may be based on one or more of receiving a request, identifying an unmet storage reliability requirement, initiating a query to other storage devices, and receiving responses from the other storage devices. The method continues at step 544 where the processing module partitions the locally stored data to produce a plurality of data blocks. The partitioning may include partitioning each data block to be a common data block length and partitioning a common number of data blocks as utilized by the decode threshold number of data storage devices. The partitioning may further include obtaining (e.g., receive, generate) a source name (e.g., a dispersed storage network address) associated with a common set of data blocks of the decode threshold number of data storage devices, associating the source name with a data block of a common set of data blocks, and updating one or more of a directory and a dispersed hierarchical index to associate one or more data names associated with the locally stored data with the source name.

The method continues at step 546 where the processing module obtains error coding information. The obtaining includes at least one of receiving and generating based on one or more of the storage device set and storage requirements. For each redundancy error information storing device, for each data block, the method continues at step 548 where the processing module generates a zero information gain (ZIG) partial slice with regards to the error information to be stored in the redundancy error information storing device using the data block and based on the error coding information. For each redundancy error information storing device, for each data block, the method continues at step 550 where the processing module outputs a corresponding ZIG partial slice to the redundancy error information storing device. For each error information block of a plurality of error information blocks, the method continues at step 552 where each redundancy error information storing device receives a decode threshold number of corresponding ZIG partial slices from the decode threshold number of data storage devices. The receiving includes receiving in an unsolicited fashion and initiating a request for one or more of the corresponding ZIG partial slices.

The method continues at step 554 where each redundancy error information storing device decodes the decode threshold number of corresponding ZIG partial slices to produce the error information block. The decoding includes at least one of performing a deterministic mathematical function and performing an exclusiveOr function. The method continues at step 556 where each redundancy error information storing device stores the error information block.

FIG. 47A is a schematic block diagram of another embodiment of a dispersed storage network (DSN) 560 that includes a managing unit 562 and a plurality of computing devices 1-n. The managing unit may be implemented utilizing one or more of the distributed storage and task network (DSTN) managing unit 18 of FIG. 1, a dispersed storage (DS) managing unit, a management server, and a computing device of the plurality of computing devices. Each computing device of the plurality computing devices may be implemented utilizing one or more of a computing server, a computer, a computing module, a DS unit, a DS processing unit, a user device, the DST processing unit 16 of FIG. 1, and the DST execution unit 36 of FIG. 1. Each computing device of the plurality of computing devices 1-n utilizes registry information when accessing one or more other computing devices of the plurality of computing devices 1-n.

The registry information includes one or more registry documents 568. A registry document 568 of the one or more registry documents includes a universally unique identifier (UUID) field 570, a timestamp field 572, a revision field 574, a content field 576, and a signature field 578. The UUID field 570 includes a UUID entry that identifies the registry information. The timestamp field 572 includes a timestamp entry corresponding to when the registry document was created. The revision field 574 includes a revision entry corresponding to a revision of associated content of the registry document. The content field 576 includes registry content including one or more of a vault identifiers, vault descriptions, encoding and decoding information of a vault, identifiers of storage units of a storage pool, network addresses of storage units, network addresses of one or more computing devices of the plurality of computing devices 1-n, an access control list, trusted digital certificates, certificate revocation lists, and authentication service information. The signature field 578 includes a signature entry where a signature is generated over the registry document to support subsequent validation.

The managing unit 562 generates the registry information and may provide the registry information directly to one or more computing devices of the plurality of computing devices 1-n. A computing device may issue a fetch registry information request 564 to the managing unit 562 and receive a fetch registry information response 566 that includes requested registry information. Alternatively, the computing device may issue the fetch registry information request 564 to another computing device of the plurality of computing devices 1-n and receive the fetch registry information response 566 from the other computing device.

In an example of operation, a computing device determines to refresh locally stored registry information. The determining may be based on one or more of detecting an expiration of a time frame since a last registry information update, receiving a request, and receiving an error message in response to an access request. The computing device identifies a start timestamp corresponding to last received registry information. The computing device identifies an end timestamp to include at least one of a current time and a future time within a time threshold. The computing device issues a fetch registry information request 564 to one or more of another computing device and the managing unit 562, where the fetch registry information request 564 includes the start timestamp and the end timestamp. Alternatively, the computing device issues a fetch registry information digest request, where the fetch registry information digest request includes the start timestamp and the end timestamp. The computing device receives the fetch registry information digest response 566 and issues the fetch registry information request 564 when the comparison of the fetch registry information digest response and a calculated digest of the locally stored registry information compares unfavorably (e.g., the locally stored registry information is out of date).

When issuing the fetch registry information request 564, the other computing device identifies registry information (e.g., stored in a local memory of the other computing device) associated with the start and end timestamps of the request to produce updated registry information. For example, the other computing device identifies registry information associated with a timestamp that falls between the start and end timestamps. The other computing device outputs the updated registry information to the computing device. A computing device updates the locally stored registry information using the updated registry information when a signature of each registry document of one or more registry documents of the registry information has been validated. The updating includes at least one of appending the updated registry information to the locally stored registry information to produce updated locally stored registry information and overwriting at least a portion of the locally stored registry information with the updated registry information to produce the updated locally stored registry information. The computing device utilizes the updated locally stored registry information when accessing one or more other computing devices of the plurality of computing devices 1-n.

FIG. 47B is a flowchart illustrating an example of updating dispersed storage network (DSN) registry information. The method begins at step 580 where a processing module (e.g., of a computing device) determines to refresh locally stored registry information. The determining may include one or more of detecting that a time frame has expired since a last update, receiving an error message, receiving a request, and identifying a predetermination. The method continues at step 582 where the processing module identifies a timestamp range to include a start timestamp and an end timestamp. The method continues at step 584 where the processing module issues a fetch registry information request to another computing device of a dispersed storage network (DSN), where the fetch registry information request includes the timestamp range. The issuing includes identifying the other computing device based on one or more of a registry information historical record, a registry information publisher list, and a request. Alternatively, the processing module issues a fetch registry information digest request, receives a fetch registry information digest response, and issues the fetch registry information request when a comparison of the fetch registry information digest response and a calculated digest of the locally stored registry information compares unfavorably.

The method continues at step 586 where the other computing device identifies registry information associated with the timestamp range to produce updated registry information. The identifying includes selecting a registry document when a timestamp of the registry document falls within the timestamp range. The method continues at step 588 where the processing module receives the updated registry information from the other computing device. The method continues at step 590 where the processing module authenticates the updated registry information based on validating a signature of one or more registry information documents of the registry information. When authenticated, the method continues at step 592 where the processing module updates the locally stored registry information using the authenticated updated registry information.

FIG. 48A is a schematic block diagram of another embodiment of the dispersed storage network (DSN) 560 of FIG. 47A that includes the managing unit 562 of FIG. 47A and a computing device 594. Alternatively, the DSN 560 may include a plurality of computing devices 594. The computing device may be implemented utilizing one or more of a computing server, a computer, a computing module, a dispersed storage (DS) unit, a DS processing unit, a user device, the distributed storage and task (DST) processing unit 16 of FIG. 1, and the DST execution unit 36 of FIG. 1. The computing device 594 utilizes registry information when accessing one or more other computing devices of the plurality of computing devices 594. The registry information includes one or more registry documents.

The computing device 594 identifies one or more registry documents of a plurality of registry documents corresponding to registry information for the DSN to produce one or more registry document identifiers. The identifying may be based on one or more of a registry document identifier list, an index lookup, a vault affiliation, a local affiliation, a computing device identifier, a computing device role type, an access type, and a predetermination. The computing device issues a registry information subscription request 596 to at least one of the managing unit 562 and another computing device. The registry information subscription request 596 includes the one or more registry document identifiers.

The at least one of the managing unit 562 and the other computing device detects a new version of a registry document associated with a registry document identifier that is included in the one or more registry document identifiers. The detecting includes one or more of detecting a new revision of a registry document since a last registry information update, receiving a revision message, a lookup, initiating a query, and receiving a response. The at least one of the managing unit 562 and the other computing device outputs the new version of the registry document to the computing device 594 as registry information 598. The computing device 594 receives the new version of the registry document and updates locally stored registry information using the received new version of the registry document. The registry information subscription request 596 may further include an unsubscribe indicator with regards to the one or more registry document identifiers such that the at least one of the managing unit 562 and the other computing device discontinues issuing the registry information 598 with regards to the one or more registry document identifiers to the computing device 594.

FIG. 48B is a flowchart illustrating another example of updating dispersed storage network (DSN) registry information. The method begins at step 600 where a processing module (e.g., of a computing device) selects one or more registry documents to produce one or more registry document identifiers. The selecting may be based on one or more of identifying one or more affiliations (e.g., vault, location, storage set, assignment type, access type, a list, etc.) and identifying the one or more registry documents based on the identified one or more affiliations. The method continues at step 602 where the processing module issues a registry information subscription request to another computing device that includes the one or more registry document identifiers. The issuing includes identifying the other computing device based on one or more of registry information historical records, a registry information publication list, a predetermination, a lookup, initiating a query, receiving a query response, and a request.

When detecting, by the other computing device, a new revision of a registry document associated with a registry document identifier of the one or more registry document identifiers, the method continues at step 604 where the other computing device outputs the new version of the registry document to the computing device. The method continues at step 606 where the processing module updates (e.g., appends, overwrites) locally stored registry information using the new version of the registry document (e.g., registry documents matching universally unique identifiers).

FIG. 49A is a schematic block diagram of another embodiment of the dispersed storage network (DSN) 560 of FIG. 47A that includes the managing unit 562 of FIG. 47A and the computing device 594 of FIG. 48A. Alternatively, the DSN may include a plurality of computing devices 1-n. The managing unit may be implemented utilizing one or more of a distributed storage and task (DST) managing unit, a dispersed storage (DS) managing unit, a management server, and another computing device. The computing device 594 utilizes registry information when accessing one or more other computing devices of the plurality of computing devices 1-n. The registry information includes one or more registry documents 568 of FIG. 47A.

The content field 576 includes a recipient identifiers (IDs) field 610, a keys field 612, and an encrypted content field 614. The recipient identifiers field 610 includes one or more recipient identifiers associated with intended recipients of the content 576. A recipient identifier includes at least one of a subject name and certificate serial numbers of certificates of the intended recipients. The keys field 612 includes one or more encryption keys corresponding to the one or more intended recipient identifiers. Each encryption key is generated by encrypting a common key utilized to encrypt unencrypted registry content to produce encrypted content for the encrypted content field 614 using a public key associated with the corresponding recipient ID. The unencrypted registry content includes one or more of a vault identifiers, vault descriptions, encoding and decoding information of a vault, identifiers of storage units of a storage pool, network addresses of storage units, network addresses of one or more computing devices of the plurality of computing devices 1-n, an access control list, trusted digital certificates, certificate revocation lists, and authentication service information.

The computing device 594 issues a fetch registry information request 564 to the managing unit (e.g., or another computing device) where the fetch registry information request 564 includes one or more desired registry document identifiers. Alternatively, this operation is skipped. The computing device 594 receives a fetch registry information response 566 from the managing unit 562 where the fetch registry information response 566 includes one or more registry documents 568. When a registry document identifier of a registry document 568 of the one or more registry documents matches a desired registry document identifier, the computing device 594 determines whether a recipient identifier of the registry document substantially matches an identifier of the computing device. When the recipient identifier matches, the computing device 594 extracts an encrypted key from the registry document 568. The extracting includes identifying that the encrypted key is associated with the recipient ID. The computing device 594 decrypts the encrypted key using a private key of the computing device 594 to produce an unencrypted key. The computing device 594 decrypts the encrypted content 614 of the registry document 568 using the unencrypted key to reproduce the unencrypted registry document content. The computing device 594 updates a local registry information using the unencrypted registry document content.

FIG. 49B is a flowchart illustrating another example of updating dispersed storage network (DSN) registry information. The method begins at step 616 where a processing module (e.g., of a computing device) receives a registry document. The receiving may include one or more of identifying desired registry information, issuing a fetch registry information request with regards to the identified desired registry information, and receiving a fetch registry information response that includes the desired registry information. When a registry document identifier matches a desired registry document identifier, the method continues at step 618 where the processing module determines whether a recipient identifier of the registry document matches a recipient identifier of the computing device.

When the recipient identifier of the registry document matches the recipient identifier of the computing device, the method continues at step 620 where the processing module extracts an encrypted key from the registry document. The encrypted key was generated by an encrypting of a key using a public key of a public-private key pair associated with the computing device. The extracting includes identifying the encrypted key of a plurality of encrypted keys, where the encrypted key is associated with the recipient identifier of the computing device. The method continues at step 622 where the processing module decrypts the encrypted key using a private key of a public-private key pair of the computing device to produce a key. The method continues at step 624 where the processing module decrypts encrypted content of the registry document using the key to produce registry document content. The decrypting includes extracting the encrypt content from the registry document. The method continues at step 626 where the processing module updates (e.g., append, overwrite) registry information using the registry document content.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A method for execution by one or more processing modules of one or more computing devices of a dispersed storage network (DSN), the method comprises:
when in a rebuilding mode, determining a data reconstruction margin for a set of encoded slices of error encoded data to determine a level of rebuilding urgency, wherein the set of encoded slices is associated with one or more detected storage errors, wherein a data segment of data is encoded to produce the set of encoded data slices that includes a total of "n" encoded data slices, wherein "k" is a minimum number of encoded data slices that are needed to reconstruct the data segment, wherein "a" represents a number of available and error-free encoded data slices of the "n" encoded data slices, and wherein the data reconstruction margin is a difference between the "a" available and error-free encoded data slices and the "k" encoded data slices that are needed to reconstruct the data segment; and
when the level of rebuilding urgency is at or above a critical level, placing a set of storage units of the DSN in a critical rebuilding mode, wherein, when in the critical rebuilding mode, the set of storage units prioritize rebuilding of the error encoded data associated with the one or more detected storage errors over other error encoded data operations, and wherein the level of rebuilding urgency is determined to be at or above the critical level when the data reconstruction margin is at or below a critical threshold.

2. The method of claim 1, wherein the determining the level of rebuilding urgency further comprises:
for the set of encoded data slices of the error encoded data:
determining "f" number of encoded data slices of the set of encoded data slices that are inaccessible;
for each of the "f" number of inaccessible encoded data slices, determining a nature for the inaccessibility; and
based on a collection of the nature of the inaccessibility and on quantity of the "f" number of inaccessible encoded data slices, determining the level of rebuilding urgency.

3. The method of claim 1 further comprises:
the determining the level of rebuilding urgency further including:
for the set of encoded data slices of the error encoded data:
determining "f" number of encoded data slices of the set of encoded data slices that are inaccessible due to memory device failures;
when the "f" number of inaccessible encoded data slices is at or above a critical number for the set of encoded data slices, determining that the level of rebuilding urgency is the critical level; and
the placing the set of storage units of the DSN in the critical rebuilding mode including:
for the "f" number of inaccessible encoded data slices, initiating a rebuilding process to produce "f" number of rebuilt encoded data slices; and
identifying new storage locations for the "f" number of rebuilt encoded data slices.

4. The method of claim 1 further comprises:
when the level of rebuilding urgency is at or below a normal rebuilding level, placing the set of storage units of the DSN in a normal rebuilding mode.

5. The method of claim 4 further comprises:
when the level of rebuilding urgency is above the normal rebuilding level and below the critical level, placing the set of storage units of the DSN in a prioritized rebuilding mode, wherein, when in the prioritized rebuilding mode, the set of storage units prioritize the rebuilding of the error encoded data over at least one of the other error encoded data operations.

6. The method of claim 1, wherein the placing the set of storage units of the DSN in the critical rebuilding mode comprises:
rejecting read requests regarding other error encoded data stored in the set of storage units;
rejecting write requests regarding the other error encoded data stored in the set of storage units; and
rejecting inquiry requests regarding the other error encoded data stored in the set of storage units.

7. The method of claim 1, wherein the placing the set of storage units of the DSN in the critical rebuilding mode comprises:

identifying an address range in which the error encoded data lies to produce an affected address range;
rejecting access requests to other error encoded data stored in the affected address range; and
processing normally access requests to other data stored in other address ranges.

8. A dispersed storage (DS) module of a dispersed storage network (DSN), the DS module comprises:
a first module, when operable within a computing device, causes the computing device to:
when in a rebuilding mode, determining a data reconstruction margin for a set of encoded slices of error encoded data to determine a level of rebuilding urgency, wherein the set of encoded slices is associated with one or more detected storage errors, wherein the set of encoded slices is associated with one or more detected storage errors, wherein a data segment of data is encoded to produce the set of encoded data slices that includes a total of "n" encoded data slices, wherein "k" is a minimum number of encoded data slices that are needed to reconstruct the data segment, wherein "a" represents a number of available and error-free encoded data slices of the "n" encoded data slices, wherein the data reconstruction margin is a difference between the "a" available and error-free encoded data slices and the "k" encoded data slices that are needed to reconstruct the data segment; and
a second module, when operable within the computing device, causes the computing device to:
when the level of rebuilding urgency is at or above a critical level, place a set of storage units of the DSN in a critical rebuilding mode, wherein, when in the critical rebuilding mode, the set of storage units prioritize rebuilding of the error encoded data associated with the one or more detected storage errors over other error encoded data operations, and wherein the level of rebuilding urgency is determined to be at or above the critical level when the data reconstruction margin is at or below a critical threshold.

9. The DS module of claim 8, wherein the first module functions to cause the computing device to further determine the level of rebuilding urgency by:
for the set of encoded data slices of the error encoded data:
determining "f" number of encoded data slices of the set of encoded data slices that are inaccessible;
for each of the "f" number of inaccessible encoded data slices, determining a nature for the inaccessibility; and
based on a collection of the nature of the inaccessibility and on quantity of the "f" number of inaccessible encoded data slices, determining the level of rebuilding urgency.

10. The DS module of claim 8 further comprises:
the first module functions to cause the computing device to further determine the level of rebuilding urgency by:
for the set of encoded data slices of the error encoded data:
determining "f" number of encoded data slices of the set of encoded data slices that are inaccessible due to memory device failures;
when the "f" number of inaccessible encoded data slices is at or above a critical number for the set of encoded data slices, determining that the level of rebuilding urgency is the critical level; and
the second module further functions to cause the computing device to place the set of storage units of the DSN in the critical rebuilding mode by:
for the "f" number of inaccessible encoded data slices, initiating a rebuilding process to produce "f" number of rebuilt encoded data slices; and
identifying new storage locations for the "f" number of rebuilt encoded data slices.

11. The DS module of claim 8 further comprises:
the second module further functions to cause the computing device to:
when the level of rebuilding urgency is at or below a normal rebuilding level, place the set of storage units of the DSN in a normal rebuilding mode.

12. The DS module of claim 11 further comprises:
the second module further functions to cause the computing device to:
when the level of rebuilding urgency is above the normal rebuilding level and below the critical level, place the set of storage units of the DSN in a prioritized rebuilding mode, wherein, when in the prioritized rebuilding mode, the set of storage units prioritize the rebuilding of the error encoded data over at least one of the other error encoded data operations.

13. The DS module of claim 8, wherein the second module functions to cause the computing device to place the set of storage units of the DSN in the critical rebuilding mode by:
rejecting read requests regarding other error encoded data stored in the set of storage units;
rejecting write requests regarding the other error encoded data stored in the set of storage units; and
rejecting inquiry requests regarding the other error encoded data stored in the set of storage units.

14. The DS module of claim 8, wherein the second module functions to cause the computing device to place the set of storage units of the DSN in the critical rebuilding mode by:
identifying an address range in which the error encoded data lies to produce an affected address range;
rejecting access requests to other error encoded data stored in the affected address range; and
processing normally access requests to other data stored in other address ranges.

* * * * *